US011639413B2

(12) United States Patent
Ribeiro et al.

(10) Patent No.: US 11,639,413 B2
(45) Date of Patent: May 2, 2023

(54) POLYMERIZABLE COMPOSITION FOR OPTICAL MATERIALS AND APPLICATION OF SAME

(71) Applicant: Mitsui Chemicals, Inc., Tokyo (JP)

(72) Inventors: Nigel Ribeiro, Singapore (SG); Jie An Yang, Singapore (SG); Hongbo Wang, Singapore (SG); Yixi Lin, Singapore (SG); Masakazu Murakami, Ichihara (JP); Takashi Unezaki, Ichihara (JP); Haruyuki Makio, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 38 days.

(21) Appl. No.: 16/339,672

(22) PCT Filed: Oct. 10, 2017

(86) PCT No.: PCT/JP2017/036687
§ 371 (c)(1),
(2) Date: Apr. 4, 2019

(87) PCT Pub. No.: WO2018/070383
PCT Pub. Date: Apr. 19, 2018

(65) Prior Publication Data

US 2019/0284324 A1 Sep. 19, 2019

(30) Foreign Application Priority Data

| | | |
|---|---|---|
| Oct. 11, 2016 | (JP) | JP2016-200259 |
| Jan. 5, 2017 | (JP) | JP2017-000368 |
| Apr. 26, 2017 | (JP) | JP2017-086907 |
| May 24, 2017 | (JP) | JP2017-102427 |

(51) Int. Cl.

| | |
|---|---|
| ***C08G 18/08*** | (2006.01) |
| ***C08G 18/48*** | (2006.01) |
| ***C08G 18/62*** | (2006.01) |
| ***C08G 75/02*** | (2016.01) |
| ***C08K 5/1545*** | (2006.01) |
| ***G02B 1/04*** | (2006.01) |
| ***C08G 18/40*** | (2006.01) |
| ***G02C 7/10*** | (2006.01) |
| ***G02C 7/00*** | (2006.01) |

(52) U.S. Cl.
CPC ............. *C08G 18/08* (2013.01); *C08G 18/40* (2013.01); *C08G 18/4833* (2013.01); *C08G 18/6204* (2013.01); *C08G 18/6225* (2013.01); *C08G 75/02* (2013.01); *C08K 5/1545* (2013.01); *G02B 1/04* (2013.01); *G02B 1/041* (2013.01); *G02C 7/00* (2013.01); *G02C 7/10* (2013.01)

(58) Field of Classification Search
CPC ...................................................... C08G 18/40
See application file for complete search history.

(56) References Cited

U.S. PATENT DOCUMENTS

| | | | |
|---|---|---|---|
| 4,929,693 | A | 5/1990 | Akashi et al. |
| 5,166,345 | A | 11/1992 | Akashi et al. |
| 8,153,344 | B2 | 4/2012 | Faler et al. |
| 8,563,212 | B2 | 10/2013 | Bowles et al. |
| 8,563,213 | B2 | 10/2013 | Bowles et al. |
| 9,605,103 | B2 | 3/2017 | Ryu |

(Continued)

FOREIGN PATENT DOCUMENTS

| | | | |
|---|---|---|---|
| DE | 102009052986 | A1 | 5/2010 |
| EP | 3 521 907 | A1 | 8/2019 |

(Continued)

OTHER PUBLICATIONS

Machine translation of JP2016169363 (Year: 2016).*

(Continued)

*Primary Examiner* — Wenwen Cai

(74) *Attorney, Agent, or Firm* — Buchanan, Ingersoll & Rooney PC

(57) ABSTRACT

A polymerizable composition for optical materials of the present invention includes a polymer (a) comprised of one or more compounds selected from compounds represented by the following General Formulas (1) to (4), a compound (b) of which light absorption characteristics vary by sensing changes in environment; and a polymerization reactive compound (c) (except for the polymer (a)).

(1)

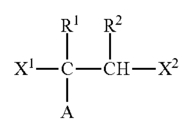

(2)

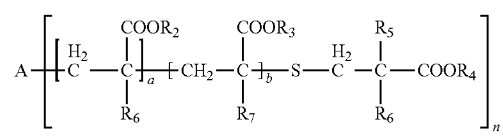

(3)

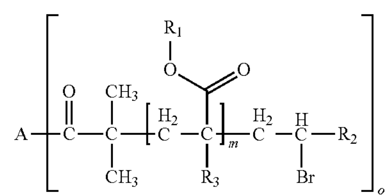

(4)

$$R_1 \{ A_1 - R_2 - A_2 - R_3 ]_n$$

17 Claims, 6 Drawing Sheets

(56) References Cited

U.S. PATENT DOCUMENTS

| | | | | |
|---|---|---|---|---|
| 9,778,396 | B2 | 10/2017 | Ryu | |
| 9,845,373 | B2 | 12/2017 | Ryu | |
| 2004/0021133 | A1 | 2/2004 | Nagpal et al. | |
| 2006/0014099 | A1 | 1/2006 | Faler et al. | |
| 2006/0241273 | A1 | 10/2006 | Bojkova et al. | |
| 2010/0048852 | A1 | 2/2010 | Bojkova et al. | |
| 2010/0209697 | A1 | 8/2010 | Zezinka et al. | |
| 2010/0221661 | A1 | 9/2010 | Zezinka et al. | |
| 2013/0108858 | A1 | 5/2013 | Biteau et al. | |
| 2015/0070743 | A1 * | 3/2015 | Branda | G02F 1/15165 252/500 |
| 2015/0152322 | A1 | 6/2015 | Nakayama et al. | |
| 2015/0177416 | A1 | 6/2015 | Ryu | |
| 2016/0170107 | A1 | 6/2016 | Ryu | |
| 2016/0194429 | A1 | 7/2016 | Ryu | |
| 2017/0002176 | A1 | 1/2017 | Kadowaki | |

FOREIGN PATENT DOCUMENTS

| | | | | |
|---|---|---|---|---|
| JP | S58136685 | A | 8/1983 | |
| JP | S64029489 | A | 1/1989 | |
| JP | H01152182 | A | 6/1989 | |
| JP | H03269507 | A | 12/1991 | |
| JP | H04151142 | A | 5/1992 | |
| JP | 2008506031 | A | 2/2008 | |
| JP | 2009524725 | A | 7/2009 | |
| JP | 2016-150961 | A | 8/2016 | |
| JP | 2016169363 | A | 9/2016 | |
| WO | 01/61382 | A1 | 8/2001 | |
| WO | 2004011506 | A1 | 2/2004 | |
| WO | 2008/031879 | A1 | 3/2008 | |
| WO | 2011/071794 | A1 | 6/2011 | |
| WO | 2012/071237 | A2 | 5/2012 | |
| WO | 2014002844 | A1 | 1/2014 | |
| WO | 2014007154 | A1 | 1/2014 | |
| WO | 2015016363 | A1 | 2/2015 | |
| WO | 2015016364 | A1 | 2/2015 | |
| WO | 2015115648 | A1 | 8/2015 | |
| WO | WO-2017001902 | A1 * | 1/2017 | G02B 1/116 |

OTHER PUBLICATIONS

Alexandridis, P. et al., "Poly(ethylene oxide)-poly(propylene oxide)-poly(ethylene oxide) block copolymer surfactants in aqueous solutions and at interfaces: thermodynamics, structure, dynamics, and modeling," Elsevier Science B.V., Physicochemical and Engineering Aspects 96 (1995) 1-46.

International Search Report (with English translation) and Written Opinion issued in corresponding International Patent Application No. PCT/ PCT/JP2017/036687, 10 pages (dated Dec. 18, 2017).

Lam, Yeng-Ming, et al., "Direct visualisation of micelles of Pluronic block copolymers in aqueous solution by cryo-TEM," Phys. Chem. Chem. Phys., (1999), 1, 3331-3334.

The Extended European Search Report dated May 25, 2020, by the European Patent Office in corresponding European Patent Application No. 17860039.1. (12 pages).

Dow: "Technical Data Sheet DPWSIL(TM) L-7001 Polydimethylsiloxane", 2019, XP055688017, Retrieved from the Internet: URL:https://www.dow.com/content/dam/dcc/documents/en-us/productdatasheet/26/26-19/26-1919-01-dowsil-1-7001-polydimethylsiloxane.pdf?iframe=true [retrieved on Apr. 21, 2020].

Momentive: "Silwet Copolymers Chameleon Solutions", Apr. 22, 2020, XP055688213, Retrieved from the Internet: URL:https://www.obermeier.de/fileadmin/content/produkte/Silikone/Silwet_Broschuere.pdf [retrieved on Apr. 22, 2020] (20 pages).

Anonymous: "PEG in cosmetics, WILBRIDE S-753 | Refreshing & Emollient Agent", Apr. 22, 2020, Retrieved from the Internet: URL:https://nofeurope.com/index.php?dispatch=categories.view&category_id=129 [Retrieved on Apr. 22, 2020] (4 pages).

Heo et al., "Patternable solution process for fabrication of flexible polymer solar cells using PDMS," Solar Energy Materials & Solar Cells, Sep. 2011, vol. 95, No. 12, pp. 3564-3572.

* cited by examiner

POLYMERIZABLE COMPOSITION FOR OPTICAL MATERIALS AND APPLICATION OF SAME

TECHNICAL FIELD

The present invention relates to a polymerizable composition for optical materials including a photochromic compound, and an optical material and a plastic lens obtained from the composition.

BACKGROUND ART

Since plastic lenses are light, not easily cracked, and can be stained, plastic lenses have been rapidly distributed as optical materials such as eyeglass lenses and camera lenses, and hitherto, molded products for lenses using a variety of plastic materials have been developed and used.

Representative examples include an allyl resin obtained from diethylene glycol bisallyl carbonate and diallyl isophthalate, a (meth)acrylic resin obtained from (meth)acrylate, and a polythiourethane resin obtained from isocyanate and thiol.

In addition, in recent years, high-performance plastic lenses to which various functions were imparted have been developed, and for example, a lens in which light having a harmful wavelength is blocked, a lens in which scratches on the surface are suppressed, and a lens in which cloudiness on the lens surface caused by a temperature difference is suppressed have been known. Plastic lenses having photochromic performance also is one of such high-performance plastic lenses, and development thereof has been progressing. By using the plastic lenses having such photochromic performance, it is possible to obtain eyeglasses which functions as typical eyeglasses having a transparent color indoors, and by the lenses being colored gray or brown in response to sunlight (ultraviolet rays) outdoors, exhibits a function to protect the eyes from glare. The eyeglasses are high-performance eyeglasses which do not need to be worn outdoors and taken off indoors as sunglasses are worn outdoors and taken off indoors and capable of being used both indoors and outdoors, and in recent years, the demand therefor has been expanding globally.

The plastic lens having such photochromic performance is required to be fast responsive for coloring and decoloring and exhibit good coloring performance.

For example, by using a specific aliphatic isocyanate or a specific alicyclic isocyanate, it is possible to obtain a urethane resin-based optical material or a thiourethane resin-based optical material and a plastic lens including a photochromic compound without causing deterioration in performance of the photochromic compound (Patent Document 1).

According to the polymerizable composition for optical materials including a specific polyol compound, it is possible to obtain a polyurethane-based optical material or a polythiourethane-based optical material including a photochromic compound, which exhibits excellent photochromic performance without causing deterioration in performance of the photochromic compound, and is also excellent in physical properties such as mechanical strength (Patent Document 2).

In addition, by improving dispersibility by suppressing aggregation of a photochromic compound in a polymerizable composition for optical materials or a resin for optical materials, a technology for improving the photochromic performance of a resin has been proposed. As such a technique, for example, polymer fine particles containing a photochromic compound in a polymer has been proposed (Patent Documents 3 to 7). In addition, a resin for optical materials including nanoparticles containing a photochromic compound and having a refractive index of 1.595 to 1.695 has been also proposed (Patent Document 8).

RELATED DOCUMENT

Patent Document

[Patent Document 1] WO 2014/002844
[Patent Document 2] WO 2015/115648
[Patent Document 3] WO 2014/007154
[Patent Document 4] JP2008-506031
[Patent Document 5] JPS64-29489
[Patent Document 6] JPH1-152182
[Patent Document 7] DE102009052986
[Patent Document 8] WO 2004/011506

Non-Patent Document

[Non-Patent Document 1] P. Alexandridis, T. A. Hatton/ Colloids Surfaces A: Physicochem. Eng. Aspects 96 (1995) 1-46
[Non-Patent Document 2] Phys. Chem. Chem. Phys., 1999, 1, 3331-3334

SUMMARY OF THE INVENTION

Technical Problem

In Patent Document 3, a method of producing a photochromic dye-containing polythiourethane resin from a polymerizable composition including a polyolefin-based terminal branched copolymer, a naphthopyran-based photochromic dye, and as a polymerizable monomer, 1,2-bis(2-mercaptoethyl)thio-3-mercaptopropane, pentaerythritoltetra (3-mercaptopropionate), and norbornene diisocyanate is disclosed. However, it is necessary that after polymer particles containing a photochromic dye are prepared from a polyolefin-based terminal branched copolymer and a naphthopyran-based photochromic dye in advance, a resin is produced by mixing the polymer particles with a polymerizable monomer, and thus, there are problems that the production process becomes long, and the production efficiency of the resin is significantly reduced.

In addition, since in a case where the polymer particles and the polymerizable monomer are mixed, the reactivity between the polymer particles and the polymerizable monomer is high, the viscosity of the polymerizable composition is easily increased, and due to this, the pot life of the polymerizable composition is shortened, and a resin molded product cannot be efficiently produced in some cases, and therefore, there is room for improvement.

As a result of thorough studies, the present inventors found that by using a specific polymer, it is possible to obtain a polymerizable composition which has excellent handling properties by suppression of viscosity increase, and it is possible to provide an optical material which has excellent photochromic characteristics, excellent heat resistance, and excellent mechanical properties, and completed the present invention.

That is, the present invention can be described as follows.

[1] A polymerizable composition for optical materials, including:

a polymer (a) comprised of one or more compounds selected from compounds represented by the following General Formulas (1) to (4);

a compound (b) of which light absorption characteristics vary by sensing changes in environment; and a polymerization reactive compound (c) (except for the polymer (a)),

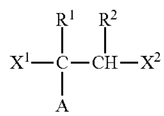

(1)

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are the same as or different from each other, and represented by any one of General Formula (1a) or (1c), $$\text{-E-}X^3 \quad (1a)$$

wherein, in General Formula (1a), E represents an oxygen atom or a sulfur atom, and $X^3$ represents a polyalkylene glycol group or a group represented by General Formula (1b), $$—R^3\text{-}(G)_m \quad (1b)$$

wherein, in General Formula (1b), $R^3$ represents an m+1 valent hydrocarbon group, G's are the same as or different from each other, and are groups represented by $—OX^4$ or $—N^+R^4X^5X^6Q^{1-}$, wherein $X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion, m is the number of bonds between $R^3$ and G, and represents an integer of 1 to 10,

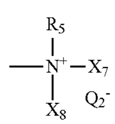

(1c)

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid,

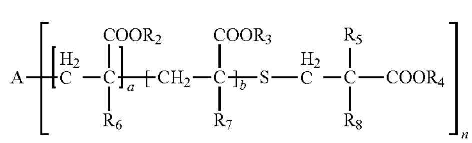

(2)

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other,

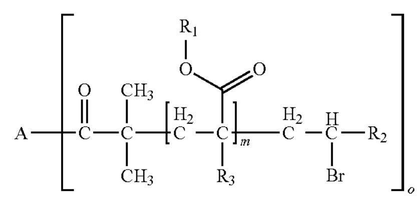

(3)

wherein, in General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, $$R_1[\text{-}A_1\text{-}R_2\text{-}A_2\text{-}R_3]_n \quad (4)$$

wherein, in General Formula (4), $A_1$ and $A_2$ represent polymer chains each different from each other, $R_1$ is an n-valent organic group, $R_2$ is a linking group that links two kinds of polymer chains, and $R_3$ is an organic group, n is an integer of 1 to 6.

[2] The polymerizable composition for optical materials according to [1], in which the compound (b) is a chromic compound.

[3] The polymerizable composition for optical materials according to [2], in which the chromic compound is a photochromic compound.

[4] The polymerizable composition for optical materials according to [3], in which the photochromic compound is a naphthopyran derivative.

[5] The polymerizable composition for optical materials according to any one of [1] to [4], in which the polymerization reactive compound (c) includes one or two or more compounds selected from a polyiso (thio) cyanate compound, a (thio) epoxy compound, an oxetanyl compound, a thietanyl compound, a (meth)acryloyl compound, a (meth) allyl compound, an alkene compound, an alkyne compound, a di- or higher functional active hydrogen compound, and an acid anhydride.

[6] The polymerizable composition for optical materials according to [5], in which the polymerization reactive compound (c) includes the polyiso(thio)cyanate compound and the di- or higher functional active hydrogen compound, and the polyiso(thio)cyanate compound is an aliphatic polyiso(thio)cyanate compound, an alicyclic polyiso(thio)cyanate compound, or an aromatic polyiso(thio)cyanate compound.

[7] The polymerizable composition for optical materials according to [1] to [6], further including a microphase-separated structural body of a polymer (a).

[8] A cured body, including:

a microphase-separated structural body of a polymer (a) comprised of one or more compounds selected from compounds represented by the following General Formulas (1) to (4);

a compound (b) of which light absorption characteristics vary by sensing changes in environment; and a resin obtained by polymerization of a polymerization reactive compound (c) (except for the polymer (a));

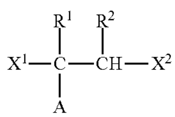

(1)

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are the same as or different from each other, and represented by any one of General Formula (1a) or (1c), $$-E-X^3 \quad (1a)$$

wherein, in General Formula (1a), E represents an oxygen atom or a sulfur atom, and $X^3$ represents a polyalkylene glycol group or a group represented by General Formula (1b), $$—R^3\text{-}(G)_m \quad (b)$$

wherein, in General Formula (1b), $R^3$ represents an m+1 valent hydrocarbon group, G's are the same as or different from each other, and are groups represented by $—OX^4$ or $—N^+R^4X^5X^6Q^{1-}$, wherein $X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion, m is the number of bonds between $R^3$ and G, and represents an integer of 1 to 10,

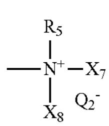

(1c)

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid,

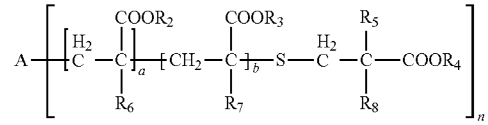

(2)

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other,

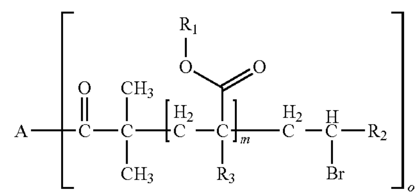

(3)

wherein, in General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, $$R_1 [A_1\text{-}R_2\text{-}A_2\text{-}R_3]_n \quad (4)$$

wherein, in General Formula (4), $A_1$ and $A_2$ represent polymer chains each different from each other, $R_1$ is an n-valent organic group, $R_2$ is a linking group that links two kinds of polymer chains, and $R_3$ is an organic group, n is an integer of 1 to 6.

[9] A molded product obtained by curing the polymerizable composition for optical materials according to any one of [1] to [7].

[10] The molded product according to [9], including a microphase-separated structural body of a polymer (a).

[11] An optical material comprised of the molded product according to [9] or [10].

[12] A plastic lens comprised of the molded product according to [9] or [10].

[13] A production method of a polymerizable composition for optical materials, including:

a step of mixing a polymer (a) comprised of one or more compounds selected from compounds represented by the following General Formulas (1) to (4), a compound (b) of which light absorption characteristics vary by changes in environment, and a polymerization reactive compound (c) (except for the polymer (a)),

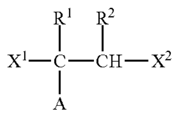

(1)

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are the same as or different from each other, and represented by any one of General Formula (1a) or (1c), $$\text{-E-X}^3 \quad (1a)$$

wherein, in General Formula (1a), E represents an oxygen atom or a sulfur atom, and $X^3$ represents a polyalkylene glycol group or a group represented by General Formula (1b), $$\text{—R}^3\text{-(G)}_m \quad (b)$$

wherein, in General Formula (1b), $R^3$ represents an m+1 valent hydrocarbon group, G's are the same as or different from each other, and are groups represented by $—OX^4$ or $—N^+R^4X^5X^6Q^{1-}$, wherein $X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion, m is the number of bonds between $R^3$ and G, and represents an integer of 1 to 10,

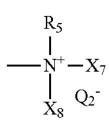

(1c)

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2$ represents a halogen ion, a carboxylate anion, or an anion of an inorganic acid,

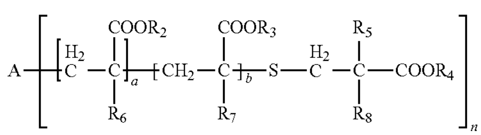

(2)

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other,

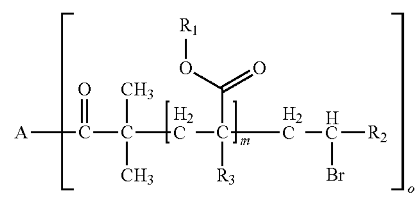

(3)

wherein, in General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, $$R_1\text{-}[\text{-}A_1\text{-}R_2\text{-}A_2\text{-}R_3]_n \quad (4)$$

wherein, in General Formula (4), $A_1$ and $A_2$ represent polymer chains each different from each other, $R_1$ is an n-valent organic group, $R_2$ is a linking group that links two kinds of polymer chains, and $R_3$ is an organic group, n is an integer of 1 to 6.

[14] The production method of a polymerizable composition for optical materials according to [13], in which the step of mixing the polymer (a), the compound (b), and the polymerization reactive compound (c) includes a step of forming polymer particles including the polymer (a) and the compound (b), and a step of mixing the polymerization reactive compound (c) with the polymer particles.

[15] The production method of a polymerizable composition for optical materials according to [13], in which the polymerization reactive compound (c) contains two or more compounds, the step of mixing the polymer (a), the compound (b), and the polymerization reactive compound (c) includes a step of mixing the polymer (a), the compound (b), and some of the polymerization reactive compound (c), and a step of mixing the remaining polymerization reactive compound (c) with the mixture obtained in the above step.

[16] The production method of a polymerizable composition for optical materials according to any one of [13] to [15], in which the compound (b) is a chromic compound.

[17] The production method of a polymerizable composition for optical materials according to [16], in which the chromic compound is a photochromic compound.

[18] The production method of a polymerizable composition for optical materials according to [17], in which the photochromic compound is a naphthopyran derivative.

[19] A production method of a cured body, including a step of polymerizing and curing the polymerizable composition for optical materials according to any one of [1] to [7], in which the step includes a step of forming a resin by polymerization of the polymerization reactive compound (c), and forming a microphase-separated structural body by the polymer (a) to form a cured body comprised of the resin, the microphase-separated structural body, and a compound (b).

[20] Aproduction method of a plastic lens, including a step of forming a lens substrate by cast-polymerizing the polymerizable composition for optical materials according to any one of [1] to [7].

[21] The production method of a plastic lens according to [20], in which the step of forming a lens substrate includes a step of forming a resin by polymerization of a polymerization reactive compound (c), and forming a microphase-separated structural body by a polymer (a) to form a lens substrate comprised of the resin, the microphase-separated structural body, and a compound (b).

Advantageous Effects of Invention

The polymerizable composition for optical materials of the present invention has excellent handling properties by suppression of viscosity increase, and can provide an optical material which has excellent photochromic characteristics, excellent heat resistance, and excellent mechanical properties.

BRIEF DESCRIPTION OF THE DRAWINGS

The above-described purpose and the other purposes, features and advantages become apparent with the suitable embodiments and drawings accompanied therewith described below.

DESCRIPTION OF EMBODIMENTS

Figure 1:
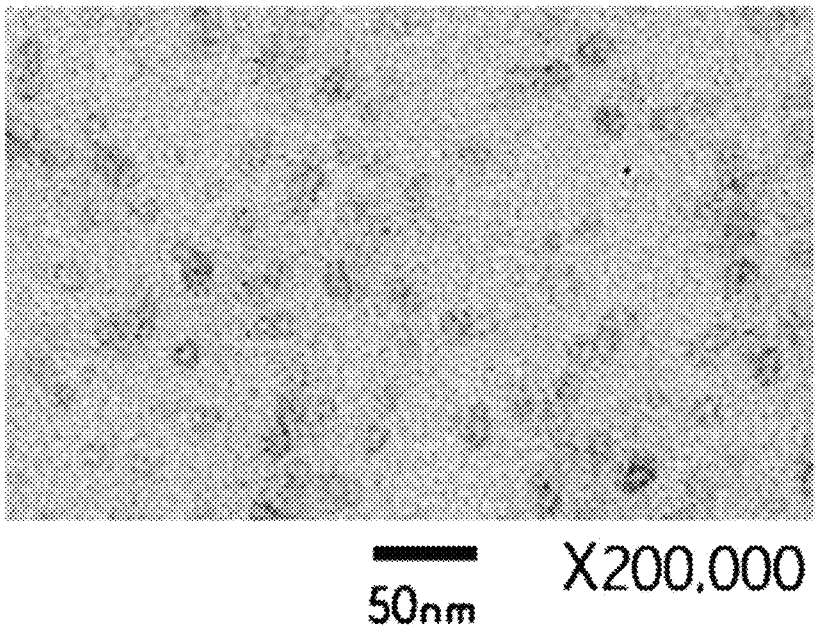
FIG. 1 is a TEM photograph of a molded product manufactured in Example a11.

The polymerizable composition for optical materials of the present invention includes a polymer (a), a compound (b) of which light absorption characteristics vary by sensing changes in environment, and a polymerization reactive compound (c).

Hereinafter, the present invention will be described with reference to embodiments.

[Polymer (a)]

In the present embodiment, the polymer (a) is comprised of one or more compounds selected from compounds represented by the following General Formulas (1) to (4).

(Compound Represented by General Formula (1))

In the present embodiment, as the polymer (a), a compound represented by the following General Formula (1) can be used.

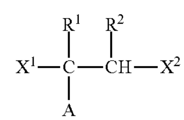

(1)

In General Formula (1), A represents a polyolefin chain.

The polyolefin chain is obtained by polymerizing olefin having 2 to 20 carbon atoms. As the olefin having 2 to 20 carbon atoms, α-olefins such as ethylene, propylene, 1-butene, and 1-hexene are exemplified. The olefin in the present embodiment may be a homopolymer or a copolymer of these olefins, or may be olefins obtained by copolymerization with other polymerizable unsaturated compounds within a range not impairing the characteristics. Among these olefins, in particular, ethylene, propylene, or 1-butene is preferable.

$R^1$ and $R^2$ each represent a hydrogen atom or an alkyl group having 1 to 18 carbon atoms, and at least one of $R^1$ and $R^2$ is a hydrogen atom. As the alkyl group having 1 to 18 carbon atoms, a methyl group, an ethyl group, or a propyl group is preferable.

$X^1$ and $X^2$ are the same as or different from each other, and represented by any one of General Formula (1a) or (1c).

$$\text{-E-}X^3 \tag{1a}$$

In General Formula (1a), E represents an oxygen atom or a sulfur atom, and $X^3$ represents a polyalkylene glycol group or a group represented by General Formula (1b).

$$—R^3\text{-}(G)_m \tag{b}$$

In General Formula (1b), $R^3$ represents an m+1 valent hydrocarbon group. G's are the same as or different from each other, and are groups represented by $—OX^4$ or $—N^+R^4X^5X^6Q^{1-}$ ($X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion). m is the number of bonds between $R^3$ and G, and represents an integer of 1 to 10.

In General formula (1a), from the viewpoint of the effects of the present invention, E is preferably an oxygen atom, and $X^3$ is preferably a polyethylene glycol group.

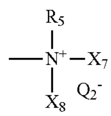

(1c)

In General Formula (1c), $X_7$ and $X_8$ represent the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid.

In General Formula (1c), from the viewpoint of the effects of the present invention, $R_5$ is preferably an aromatic alkyl group, and both $X_7$ and $X_8$ are preferably polyalkylene glycol groups.

In the present embodiment, the compound represented by General Formula (1) is preferably a compound in which $R^1$ and $R^2$ are hydrogen atoms, and $X^1$ and $X^2$ are combination of the group represented by General Formula (1a) and the group represented by General Formula (1c).

As the compound represented by General Formula (1), specifically, a compound represented by the following General Formula (1-1) can be used.

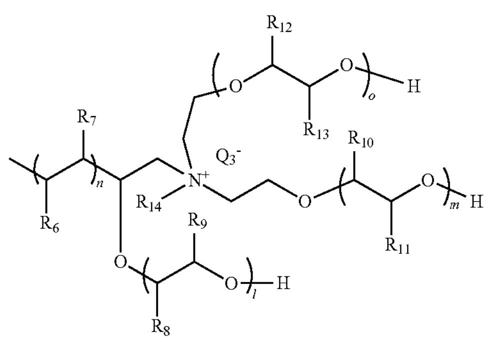

(1-1)

In General Formula (1-1), $R_6$ and $R_7$ each represent a hydrogen atom or an alkyl group having 1 to 18 carbon atoms, and at least one of $R_6$ and $R_7$ is a hydrogen atom. $R_8$ and $R_9$ each represent a hydrogen atom or a methyl group, at least one of $R_8$ and $R_9$ is a hydrogen atom, $R_{10}$ and $R_{11}$ each represent a hydrogen atom or a methyl group, at least one of $R_{10}$ and $R_{11}$ represents a hydrogen atom, $R_{12}$ and $R_{13}$ each represent a hydrogen atom or a methyl group, at least one of $R_{12}$ and $R_{13}$ represents a hydrogen atom, $R_{14}$ represents a hydrogen atom, an alkyl group having 1 to 18 carbon atoms which optionally be substituted with an alkylene glycol group, or an aromatic alkyl group, and $Q_3^-$ represents a halogen ion, a carboxylate anion, or an anion of an inorganic acid. l+m+o each represent an integer of 3 to 450. n represents an integer of 20 to 300.

In the present embodiment, as the polymer (a), at least one from the compounds represented by the following General Formula (1) can be used.

(Compound Represented by General Formula (2))

In the present embodiment, as the polymer (a), a compound represented by the following General Formula (2) can be used.

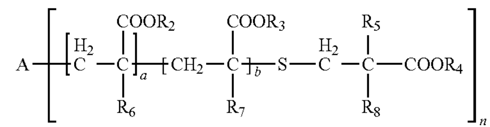

(2)

In General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200. A plurality of $R_2$'s to $R_8$'s may be the same as or different from each other.

In $R_2$, examples of the substituent of "a substituted alkyl group having 1 to 20 carbon atoms, a substituted aralkyl group having 7 to 20 carbon atoms, or a substituted aryl group having 6 to 20 carbon atoms" includes a halogen atom, a hydroxyl group, a cyano group, a nitro group, a sulfonyl group, an alkyl group having 1 to 6 carbon atoms, a haloalkyl group having 1 to 6 carbon atoms, an alkoxy group having 1 to 6 carbon atoms, and a haloalkoxy group having 1 to 6 carbon atoms.

As the compound represented by General Formula (2), specifically, a compound in which n is 1 and the structure A in the block copolymer is represented by any one of the following General Formulas (2a) and (2b) can be used.

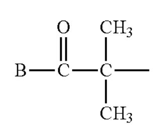

(2a)

In General Formula (2a), B represents a structure having a monoalkoxy group.

Specific examples of B in General Formula (2a) include monoalkoxy structures derived from a terminal branched copolymer and monoalkoxy structures derived from pentaerythritol, dipentaerythritol, glycerol, diglycerol, polyglycerol, or saccharides.

As the terminal branched copolymer, it is possible to use the compounds described in Pamphlet of International Publication No. WO 2014/007154, and a polymer represented by the following General Formula (2c) or (2d) is preferably used.

(2c)

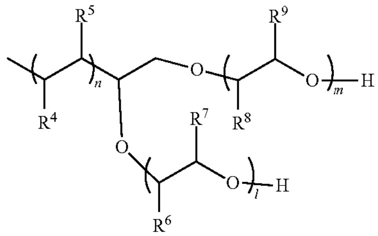

In General Formula (2c), $R^4$ and $R^5$ each represent a hydrogen atom or an alkyl group having 1 to 18 carbon atoms, and at least one of $R^4$ and $R^5$ is a hydrogen atom. As the alkyl group, an alkyl group having 1 to 9 carbon atoms is preferable, and an alkyl group having 1 to 3 carbon atoms is more preferable.

$R^6$ and $R^7$ each represent a hydrogen atom or a methyl group, and at least one of $R^6$ and $R^7$ is a hydrogen atom. $R^8$ and $R^9$ each represent a hydrogen atom or a methyl group, and at least one of $R^8$ and $R^9$ is a hydrogen atom. A plurality of $R_4$'s to $R_9$'s may be the same as or different from each other.

l+m represents an integer of 2 to 450, and preferably an integer of 5 to 200.

n represents an integer of 20 to 300, and preferably an integer of 25 to 200.

(2d)

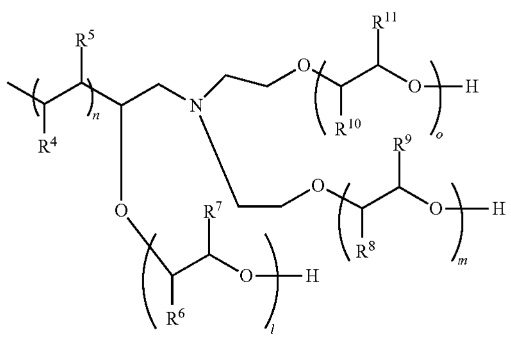

In General Formula (2d), $R^4$ and $R^5$ each represent a hydrogen atom or an alkyl group having 1 to 18 carbon atoms, and at least one of $R^4$ and $R^5$ is a hydrogen atom. As the alkyl group, an alkyl group having 1 to 9 carbon atoms is preferable, and an alkyl group having 1 to 3 carbon atoms is more preferable.

$R^6$ and $R^7$ each represent a hydrogen atom or a methyl group, and at least one of $R^6$ and $R^7$ is a hydrogen atom. $R^8$ and $R^9$ each represent a hydrogen atom or a methyl group, and at least one of $R^8$ and $R^9$ is a hydrogen atom. $R^{10}$ and $R^{11}$ each represent a hydrogen atom or a methyl group, and at least one of $R^{10}$ and $R^{11}$ is a hydrogen atom. A plurality of $R_4$'s to $R_{11}$'s may be the same as or different from each other.

l+m+o represents an integer of 3 to 450, and preferably an integer of 5 to 200.

n represents an integer of 20 to 300, and preferably an integer of 25 to 200.

As the polymer represented by General Formula (2d), a polymer represented by the following General Formula (2e) is more preferably used.

(2e)

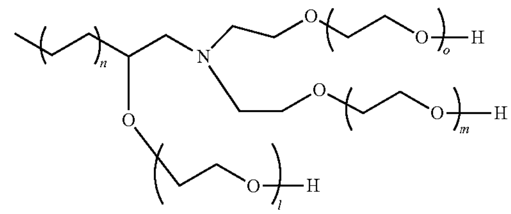

In General Formula (2e), l+m+o and n has the same meaning as those in General Formula (2d).

$$—R_6 \tag{2b}$$

In General Formula (2b), $R_6$ represents an organic group having 1 to 20 carbon atoms, which optionally be substituted. Examples of the organic group can include a benzyl group.

In the present embodiment, from the viewpoint of the effects of the present invention, the compound represented by General Formula (2) is preferably a compound in which n is 1, A is General Formula (2a) or (2b), $R_2$ is an aryl group having 6 to 20 carbon atoms, which optionally be substituted, $R_3$ is a hydrocarbon group having 1 to 20 carbon atoms having a hydroxyl group, $R_4$ is an organic group having 1 to 20 carbon atoms, which optionally have a hydroxyl group, and $R_5$ is a hydrogen atom.

In the present embodiment, as the polymer (a), at least one from the compounds represented by the following General Formula (2) can be used.

(Compound Represented by General Formula (3))

In the present embodiment, as the polymer (a), a compound represented by the following General Formula (3) can be used.

(3)

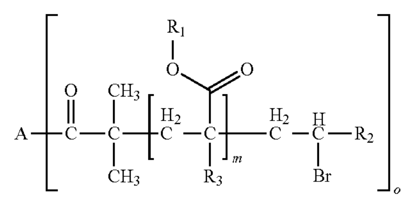

In General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A. A plurality of $R_1$'s to $R_3$'s may be the same as or different from each other.

In $R_1$, examples of the substituent of "a substituted alkyl group having 1 to 20 carbon atoms, a substituted aralkyl group having 7 to 20 carbon atoms, or a substituted aryl group having 6 to 20 carbon atoms" includes a halogen atom, a hydroxyl group, a cyano group, a nitro group, a sulfonyl group, an alkyl group having 1 to 6 carbon atoms, a haloalkyl group having 1 to 6 carbon atoms, an alkoxy group having 1 to 6 carbon atoms, and a haloalkoxy group having 1 to 6 carbon atoms.

In the present embodiment, from the viewpoint of the effects of the present invention, it is preferable that A is a group derived from pentaerythritol, dipentaerythritol, glycerol, diglycerol, polyglycerol, or saccharides, o is 1, m is an integer of 1 to 1000, $R_1$ is an aryl group having 6 to 20 carbon atoms which optionally be substituted, and $R_2$ is a hydrocarbon group having 1 to 20 carbon atoms having a hydroxyl group.

In the present embodiment, as the polymer (a), at least one from the compounds represented by the following General Formula (3) can be used.

(Compound Represented by General Formula (4))

In the present embodiment, as the polymer (a), a compound represented by the following General Formula (4) can be used.

$$R_1\!\left[\!-A_1\text{-}R_2\text{-}A_2\text{-}R_3\right]_n \quad (4)$$

In General Formula (4), $A_1$ and $A_2$ represent polymer chains each different from each other. $R_1$ is an n-valent organic group, $R_2$ is a linking group that links two kinds of polymer chains, and $R_3$ is an organic group. n is an integer of 1 to 6.

Examples of the polymer chains include a polyalkylene chain, a polyester chain, a polysiloxane chain, a polyethyleneimine chain, and a polyalkylene oxide chain. As the polymer chain, a polyalkylene oxide chain is preferable.

Examples of the polyalkylene chain as the polymer chain include a polyethylene chain, a polypropylene chain, a polystyrene chain, a poly(meth)acrylic acid ester chain, a poly(meth)acrylic acid chain, and a polymethylene indane chain.

Examples of the polyester chain as the polymer chain include a poly α-acetolactone chain, a poly β-propiolactone chain, a poly γ-butyrolactone chain, a poly δ-valerolactone chain, a poly ε-caprolactone chain, a polylactic acid chain, a polyglycolic acid chain, a polylactic acid-glycolic acid copolymer chain, and a polyethylene terephthalate chain.

Examples of the polysiloxane chain as the polymer chain include a polydimethylsiloxane chain and polymethylphenylsiloxane chain.

Examples of the polyethyleneimine chain as the polymer chain include a polyethyleneimine chain, a polypropionylaziridine chain, a polyacetylaziridine chain, and a polyformylaziridine chain.

Examples of the polyalkylene oxide chain as the polymer chain include a polyethylene glycol chain, a polypropylene glycol chain, polybutylene glycol chain, a polypentene glycol chain, a polyhexene glycol chain, and a polyheptene glycol chain. In a case where n is 2 or more, a plurality of $A_1$'s and $A_2$'s may have polyalkyleneoxide chains each different from each other.

$R_1$ is a mono- to hexavalent organic group.

Examples of the monovalent organic group include an alkoxy group such as a methoxy group, an ethoxy group, a 1-propanoxy group, a 2-propanoxy group, and a methoxyethoxy group, an alkylthio group such as a methylmercapto group, and an ethylmercapto group, and an acetyl group.

Examples of the divalent organic group include a bifunctional alkoxy group such as an ethylene glycolate group, a propylene glycolate group, and a butylene glycolate group, and a bifunctional thiolate group such as an ethanedithiolate group and a propanedithiolate group.

Examples of the trifunctional organic group include a trifunctional alkoxy group such as glycerolate group, a trioxyethylamine group, and a trioxyethyl (alkyl)ammonium salt.

Examples of the tetrafunctional organic group include a tetravalent amino group such as an ethylenediamino group and an alkylammonium salt thereof, and a tetrahydric alkoxy group such as a tetraoxyethylene diamine group and an oxy form of pentaerythritol.

Examples of the hexafunctional organic group include an oxy form of dipentaerythritol.

$R_2$ is a divalent linking group having 1 to 10 carbon atoms linking two kinds of polymer chains.

Examples of the divalent linking group include an ether linking group such as an ethylene glycol group and a propylene glycol group, a biscarboxylate linking group such as Michael adducts of β-mercaptopropionic acid and a (meth)acrylic acid group, and an ether carboxylate linking group such as a glycol acid group; and any of these or another linking group may be used according to the synthesis method of the block copolymer.

$R_3$ is a terminal functional group and affects the dispersibility of the compound (a). From the viewpoint of maintaining the dispersion state of the nano-domain after polymerization of the composition, $R_3$ is preferably a polymerizable organic group having reactivity with the polymerizable functional group (c).

Examples of such a polymerizable organic group include an organic group having a hydroxyl group such as a hydroxyethyl group, a hydroxypropyl group, a hydroxybutyl group, and a dihydroxypropyl group; an organic group having an amino group such as an aminoethyl group and an aminopropyl group; an organic group having a mercapto group such as a mercaptoethyl group, a mercaptopropionic acid group, a mercaptoethylcarbonyl group, a mercaptopropylcarbonyl group, and a thioglycolic acid group; an organic group having an epoxy group such as a glycidyl ether group; an organic group having a thioepoxy group such as thioglycidyl ether group; an organic group having a carboxylic acid such as glycolic acid ether; an organic group having an unsaturated double bond at a terminal such as a vinyl group, an allyl group, an acrylate group, and a methacrylate group; and an organic group having an unsaturated triple bond at a terminal such as propargyl group.

Depending on the kind of the block copolymer to be used, there are cases in which $R_3$ do not necessarily have to be reactive with the polymerizable functional group (c).

Examples of the organic group having no reactivity with the polymerizable functional group (c) include a methoxymethyl group, a methoxyethyl group, a methoxypropyl group, a methoxybutyl group, an ethoxymethyl group, an ethoxyethyl group, an ethoxypropyl group, an ethoxybutyl group, a propoxymethyl group, a propoxyethyl group, a propoxypropyl group, a propoxybutyl group, a butyroxymethyl group, a butyroxyethyl group, a butyroxypropyl group, and a butyloxybutyl group.

Specific examples of the compound represented by General Formula (4) include a compound represented by the following General Formula (4a), and compounds (a) to (v).

<Compound Represented by General Formula (4a)>

In the present embodiment, as the compound represented by General Formula (4), a compound represented by the following General Formula (4a) can be used.

(4a)

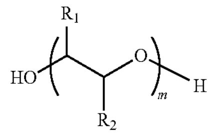

In General Formula (4a), $R_1$ and $R_2$ each represent a hydrogen atom or an alkyl group having 1 to 18 carbon atoms, and at least one of $R_1$ and $R_2$ is a hydrogen atom. A plurality of $R_1$'s may be the same as or different from each other, and a plurality of $R_2$'s may be the same as or different from each other. m represents an integer of 15 to 500, and preferably an integer of 30 to 500.

As the compound represented by General Formula (4a), a compound having a number average molecular weight of 150 or greater, and preferably 200 or greater can be used.

As the compound represented by General Formula (4a), specifically, a compound represented by the following General Formula (4a-1) can be used. Specifically, in General Formula (4), in a case where $R_1$ is an alkylene (C2 to C20) glycolate group, $A_1$ is a polyalkylene (C2 to C20) glycol chain, $R_2$ is an oxypropylene group, $A_2$ is a polyethylene glycol chain, $R_3$ is a hydroxyethylene group, and n is 2 as the valence of a propylene glycolate group, the compound is represented by the following General Formula (4a-1)

(4a-1)

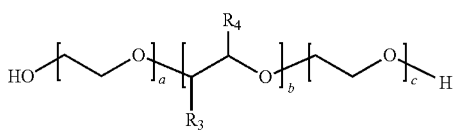

In General Formula (4a-1), $R_3$ and $R_4$ each represent a hydrogen atom or an alkyl group having 1 to 18 carbon atoms, and at least one of $R_3$ and $R_4$ is a hydrogen atom. a+c is an integer of 2 to 600, and preferably an integer of 2 to 400, and b represents an integer of 1 to 300, and preferably an integer of 1 to 100. A plurality of $R_3$'s and $R_4$'s may be the same as or different from each other.

Examples of such a compound include the Pluronic series manufactured by BASF Corp. The structures the Pluronic series compounds in Pluronic have are shown in Non-Patent Document 1.

The terminal hydroxide group represented by General Formula (4a) may react with the polymerizable compound (c) such as isocyanates.

The percentage of the compounds to be mixed is not particularly limited, but in the case of using the compound (pluronic L64) and the compound (pluronic P65) among the compounds represented by General Formula (4a), the percentage of the compound (Pluronic L64) included with respected to a total of 100% of these compounds may be 0.1% to 99.9% by weight, preferably 5% to 95% by weight, more preferably 10% to 90% by weight, and particularly preferably 20% to 80% by weight.

In a case where a plurality of compounds are mixed to be used as the polymer (a), an increase in discoloration density, an improvement in decoloring rate, and the like are observed, and thus a plastic lens having excellent photochromic properties can be provided, and more enhanced resin properties such as improved transparency can be obtained.

<Compounds (a) to (v)>

In the present embodiment, as the compound represented by General Formula (4), compounds represented by the following General Formulas (a) to (v) can be used.

(a) Bifunctional Block Polyol

In General Formula (4), in a case where $R_1$ is a propylene glycolate group, $A_1$ is a polypropylene glycol chain, $R_2$ is an oxypropylene group, $A_2$ is a polyethylene glycol chain, $R_3$ is a hydroxyethylene group, and n is 2 as the valence of a propylene glycolate group, the compound is represented by the following General Formula (a-1).

(a-1)

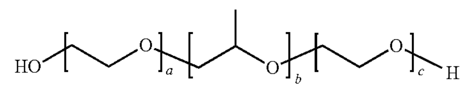

In General Formula (a-1), a, b, and c each represent a unit number, and each independently are an integer of 3 to 300.

Examples of such a compound include the Pluronic series (manufactured by BASF Corp.).

As similar compounds, in General Formula (4), in a case where $R_1$ is an ethylene glycolate group, $A_1$ is a polyethylene glycol chain, $R_2$ is an oxyethylene group, $A_2$ is a polypropylene glycol chain, $R_3$ is a hydroxypropylene group, and n is 2 as the valence of the propylene glycolate group, the compound is represented by the following General Formula (a-2).

(a-2)

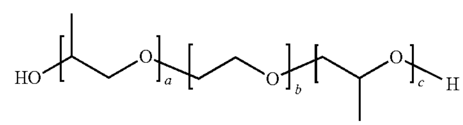

In General Formula (a-2), a, b, and c each represent a unit number, and each independently are an integer of 3 to 300.

Examples of such a compound include the Pluronic R series (manufactured by BASF Corp.).

(b) Trifunctional Block Polyol

In General Formula (4), in a case where $R_1$ is a glycerolate group, $A_1$ is a polypropylene glycol chain, $R_2$ is an oxypropylene group, $A_2$ is a polyethylene glycol chain, $R_3$ is a hydroxyethylene group, and n is 3 as the valence of the glycerol group, the compound is represented by the following General Formula (b-1).

(b-1)

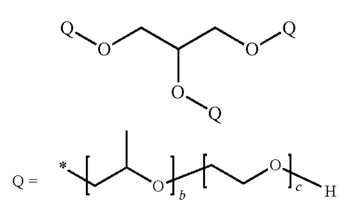

In General Formula (b-1), b and c each represent a unit number and each independently are an integer of 3 to 300. The mark * represents a bonding hand.

Examples of such a compound include glycerol polypropylene oxide-block-polyethylene oxide (manufactured by Aldrich).

In addition, a compound represented by the following General Formula (b-2) in which the positions of the propylene oxide chain and the ethylene oxide chain are exchanged in Q may also be exemplified.

(b-2)

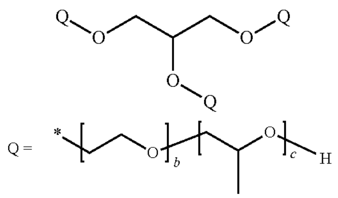

(c) Tetrafunctional Block Polyol

In General Formula (4), in a case where $R_1$ is an ethylenediamino group, $A_1$ is a polypropylene glycol chain, $R_2$ is an oxypropylene group, $A_2$ is a polyethylene glycol chain, $R_3$ is a hydroxyethylene group, and n is 4 as the valence of the ethylenediamino group, the compound is represented by the following General Formula (c-1).

(c-1)

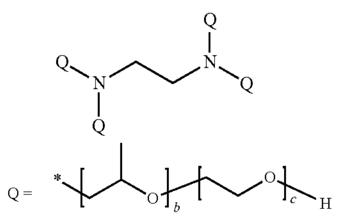

In General Formula (c-1), b and c each represent a unit number and each independently are an integer of 3 to 300. The mark * represents a bonding hand.

Examples of such a compound include the Tetronic series (manufactured by BASF Corp.). In addition, the Tetronic R series (manufactured by BASF Corp.) in which the propyleneoxy group and the ethyleneoxy group are exchanged in Q may also be exemplified.

A neutral tetrafunctional polyol having reduced catalytic activity which results from conversion of $R_1$ into a quaternary ammonium salt using benzyl halide or the like may also be used. In that case, General Formula (4) is represented by the following General Formula (c-2).

(c-2)

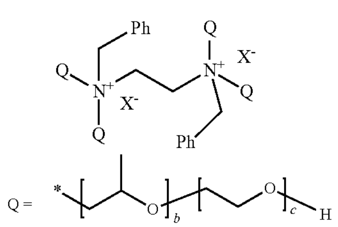

In General Formula (c-2), b and c each represent a unit number and each independently are an integer of 3 to 300. X represents a halogen ion, a carboxylate anion, or an inorganic acid anion, and the mark * represents a bonding hand.

(d) Bifunctional Block Polyamine

In General Formula (4), in a case where $R_1$ is an ethylene glycolate group, $A_1$ is a polyethylene glycol chain, $R_2$ is an oxypropylene group, $A_2$ is a polypropylene glycol chain, $R_3$ is an aminopropylene group, and n is 2 as the valence of the ethylene glycol group, the compound is represented by the following General Formula (d).

(d)

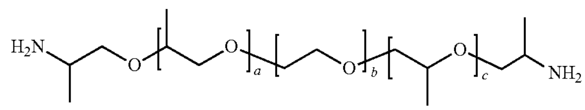

In General Formula (d), a, b and c each represent a unit number and each independently are an integer of 3 to 300.

Examples of such a compound include Jeffamine ED series (manufactured by Huntsman).

(e) Monofunctional Block Polyamine

In General Formula (4), in a case where $R_1$ is a methoxy group, $A_1$ is a polyethylene glycol chain, $R_2$ is an oxypropylene group, $A_2$ is a polypropylene glycol chain, $R_3$ is an aminopropylene group, and n is 1 as the valence of the methoxy group, the compound is represented by the following General Formula (e).

(e)

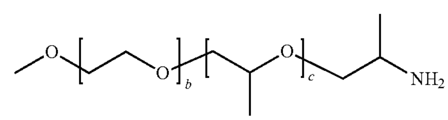

In General Formula (e), b and c each represent a unit number and each independently are an integer of 3 to 300.

Examples of such a compound include the Jeffamine M series (manufactured by Huntsman).

(f) Bifunctional Block Polythiol

In General Formula (4), in a case where $R_1$ is a propylene glycolate group, $A_1$ is a polyethylene glycol chain, $R_2$ is an oxyethylene group, $A_2$ is a polyethylene glycol chain, $R_3$ is a mercaptoethylcarbonyl group, and n is 2 as the valence of the propylene glycol group, the compound is represented by the following General Formula (f-1).

(f-1)

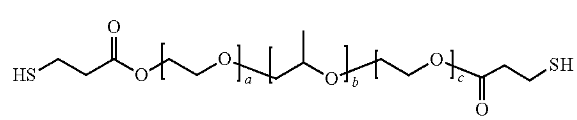

In General Formula (f-1), a, b and c each represent a unit number and each independently are an integer of 3 to 300.

In a case where $R_3$ is a mercaptoethyl group, General Formula (1) is represented by the following General Formula (f-2).

(f-2)

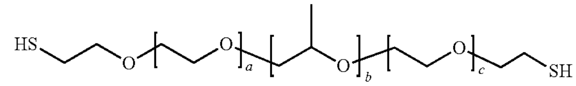

In General Formula (f-2), a, b, and c each represent a unit number and each independently are an integer of 3 to 300.

(g) Bifunctional Block Poly(Thio)Epoxide

In General Formula (4), in a case where $R_1$ is a propylene glycolate group, $A_1$ is a polypropylene glycol chain, $R_2$ is an oxyethylene group, $A_2$ is a polyethylene glycol chain, $R_3$ is a 2,3-epoxypropyl group, and n is 2 as the valence of the propylene glycol group, the compound is represented by the following General Formula (g-1).

(g-1)

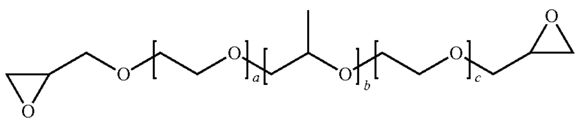

In General Formula (g-1), a, b, and c each represent a unit number and each independently are an integer of 3 to 300.

In a case where $R_3$ is a 2,3-epithiopropyl group, General Formula (1) is represented by the following General Formula (g-2)

(g-2)

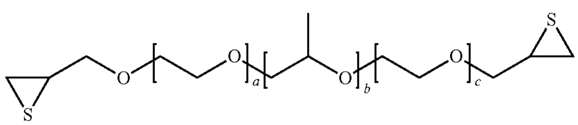

In General Formula (g-2), a, b, and c each represent a unit number and each independently are an integer of 3 to 300.

(h) Bifunctional Block Polycarboxylic Acid

In General Formula (4), in a case where $R_1$ is a propylene glycolate group, $A_1$ is a polypropylene glycol chain, $R_2$ is an oxyethylene group, $A_2$ is a polyethylene glycol chain, $R_3$ is a carboxymethyl group, and n is 2 as the valence of the propylene glycol group, the compound is represented by the following General Formula (h).

(h)

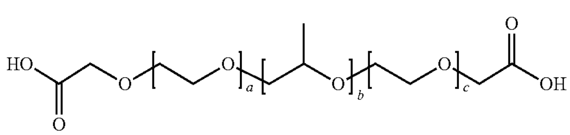

In General Formula (h), a, b, and c each represent a unit number and each independently are an integer of 3 to 300.

(i) Bifunctional Block Poly(meth)acrylic Acid Ester

In General Formula (4), in a case where $R_1$ is a propylene glycolate group, $A_1$ is a polypropylene glycol chain, $R_2$ is an oxyethylene group, $A_2$ is a polyethylene glycol chain, $R_3$ is an acryloyl group, and n is 2 as the valence of the propylene glycol group, the compound is represented by the following General Formula (i-1).

(i-1)

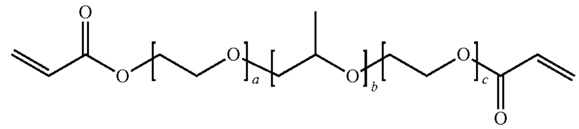

In General Formula (i-1), a, b, and c each represent a unit number and each independently are an integer of 3 to 300.

In a case where $R_3$ is a methacryloyl group, General Formula (1) is represented by the following General Formula (i-2).

(i-2)

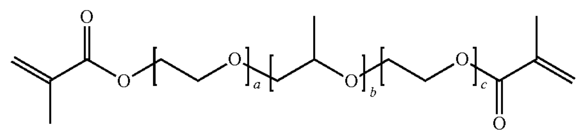

In General Formula (i-2), a, b, and c each represent a unit number and each independently are an integer of 3 to 300.

(j) Bifunctional Block Polyol Containing Connecting Group

In General Formula (4), in a case where $R_1$ is a propylene glycol group, $A_1$ is a polypropylene glycol chain, $R_2$ is a Michael adduct of β-mercaptopropionic acid and a methacrylic acid group, $A_2$ is a polyethylene glycol chain, $R_3$ is a hydroxyethylene group, and n is 2 as the valence of the propylene glycol group, the compound is represented by the following General Formula (j).

(j)

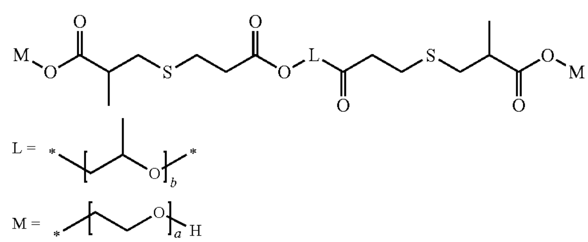

In General Formula (j), a and b each represent a unit number and each independently are an integer of 3 to 300. The mark * represents a bonding hand.

Also, the block copolymer may contain the respective elements described in (a) to (j) at the same time, and any polyalkylene oxide groups can be employed as the block copolymers $A_1$ and $A_2$. The properties of the block copolymer may be improved by using a mixture of a plurality of block copolymers.

(k) Polyalkylene Oxide-Block-Polycaprolactone Alcohol

In General Formula (4), in a case where $R_1$ is a methoxy group, $A_1$ is a polyethylene glycol chain, $R_2$ is an oxyethylene group, $A_2$ is a polycaprolactone chain, $R_3$ is a hydroxyhexanoic acid group, and n is 1 as the valence of the methoxy group, the compound is represented by the following General Formula (k-1).

(k-1)

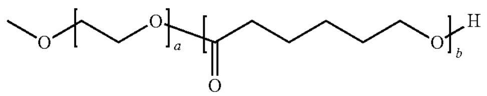

In General Formula (k-1), a and b each represent a unit number and each independently are an integer of 3 to 500.

In General Formula (4), in a case where $R_1$ is an aminoethoxy group, $A_1$ is a polyethylene glycol chain, $R_2$ is an oxyethylene group, $A_2$ is a polycaprolactone chain, $R_3$ is a hydroxyhexanoic acid group, and n is 1 as the valence of the methoxy group, the compound is represented by the following General Formula (k-2).

(k-2)

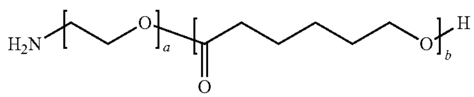

In General Formula (k-2), a and b each represent a unit number and each independently are an integer of 3 to 500.

In General Formula (4), in a case where $R_1$ is a mercaptoethoxy group, $A_1$ is a polyethylene glycol chain, $R_2$ is an oxyethylene group, $A_2$ is a polycaprolactone chain, $R_3$ is a hydroxyhexanoic acid group, and n is 1 as the valence of the methoxy group, the compound is represented by the following General Formula (k-3).

(k-3)

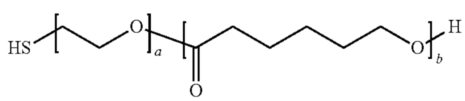

In General Formula (k-3), a and b each represent a unit number and each independently are an integer of 3 to 500.

(l) Polyalkylene Oxide-Block-(Polylactic Acid Polyglycolic Acid Copolymer) Alcohol In General Formula (4), in a case where $R_1$ is a methoxy group, $A_1$ is a polyethylene glycol chain, $R_2$ is an oxyethylene group, $A_2$ is a polylactic acid-polyglycolic acid random copolymer chain, $R_3$ is a hydroxyacetyl acid group or 2-hydroxypropionic acid group, and n is 1 as the valence of the methoxy group, the compound is represented by the following General Formula (l).

(l)

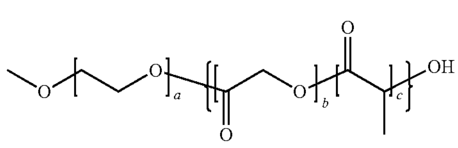

In General Formula (l), a, b, and c each represent a unit number and each independently are an integer of 3 to 300.

Examples of such a compound include a commercially available methoxy polyethylene glycol (polylactic acid polyglycolic acid random copolymer) block copolymer (manufactured by Aldrich).

(m) Polyalkylene Oxide-Block-Polybenzyl Acrylate Thiol

In General Formula (4), in a case where $R_1$ is a methoxy group, $A_1$ is a polyethylene glycol chain, $R_2$ is a 4-cyanopentanoic acid group, $A_2$ is a polybenzyl acrylate chain, $R_3$ is a benzyl-2-mercaptopropionate ester group, and n is 1 as the valence of the methoxy group, the compound is represented by the following General Formula (m).

(m)

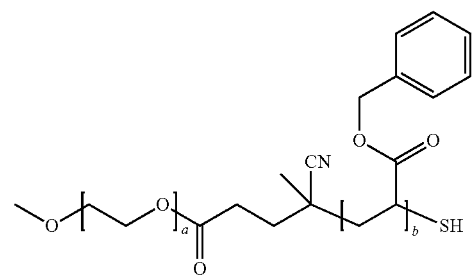

In General Formula (m), b and c each represent a unit number, and each independently are an integer of 3 to 300.

(n) Polyalkylene Oxide Polycaprolactone Triblock Polymer

In General Formula (4), in a case where $R_1$ is a hydroxyhexanoic acid group, $A_1$ is a caprolactone chain, $R_2$ is an oxyethylene group, $A_2$ is a polyethylene glycol chain, $R_3$ is a hydroxyethyl group, and n is 2 as the valence of the hydroxyhexanoic acid group, the compound is represented by the following General Formula (n-1).

(n-1)

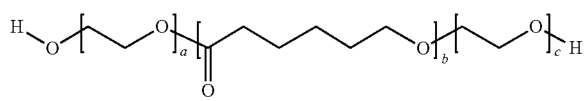

In General Formula (n-1), a, b, and c each represent a unit number, and each independently are an integer of 3 to 300.

In a case where $R_3$ is a methoxy ethyl group, General Formula (4) is represented by the following General Formula (n-2).

(n-2)

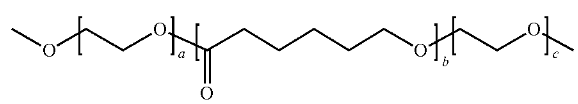

In General Formula (n-2), a, b, and c each represent a unit number, and each independently are an integer of 3 to 300.

(o) Polystyrene Polyacrylic Acid Block Copolymer

In General Formula (4), in a case where $R_1$ is a phenylethyl group, $A_1$ is a polystyrene chain, $R_2$ is a phenylethylene group, $A_2$ is a polyacrylic acid chain, $R_3$ is a propanoic acid group, and n is 1 as the valence of the phenylethyl group, the compound is represented by the following General Formula (o).

(o)

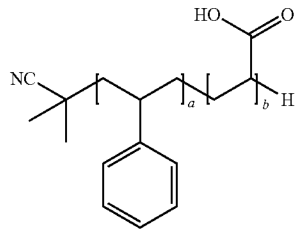

In General Formula (o), a and b each represent a unit number, and each independently are an integer of 3 to 500.

Examples of such a compound include a polystyrene polyacrylic acid block copolymer (manufactured by Aldrich).

(p) Polyethylene Oxide Polyalkylene Oxide Diblock Polymer

In General Formula (4), in a case where $R_1$ is a methoxy group, $A_1$ is a polyethylene glycol chain, $R_2$ is an oxyethylene group, $A_2$ is a polypropylene glycol chain, $R_3$ is a hydroxypropyl group, and n is 1 as the valence of the methoxy group, the compound is represented by the following General Formula (p-1).

(p-1)

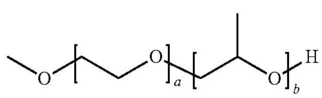

In General Formula (p-1), a and b each represent a unit number, and each independently are an integer of 3 to 300.

In a case where $A_2$ is a polybutylene glycol group, General Formula (4) is represented by the following General Formula (p-2).

(p-2)

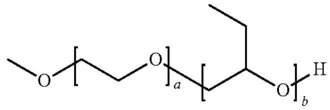

In General Formula (p-2), a and b each represent a unit number, and each independently are an integer of 3 to 300.

(q) Polyalkylene Polyethylene Oxide Di- or Triblock Polymer

In General Formula (4), in a case where $R_1$ is a dimethylbenzyl group, $A_1$ is a polymethylindane chain, $R_2$ is an oxyethylene group, $A_2$ is a polyethylene glycol chain, $R_3$ is a hydroxyethyl group, and n is 1 as the valence of the dimethylbenzyl group, the compound is represented by the following General Formula (q-1).

(q-1)

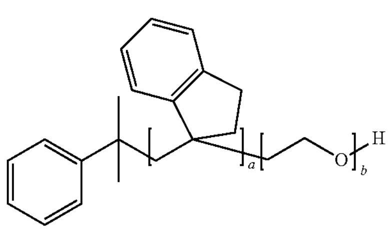

In General Formula (q-1), a and b each represent a unit number, and each independently are an integer of 3 to 300.

In a case where $R_1$ is an isobutyl group, and $A_1$ is a polystyrene chain, General Formula (4) is represented by the following General Formula (q-2).

(q-2)

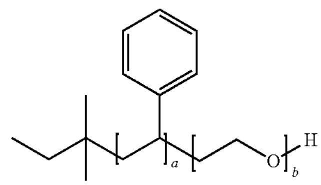

In General Formula (q-2), a, b, and c each represent a unit number, and each independently are an integer of 3 to 300.

In a case where $R_1$ is a methylstyrene dimer, $A_1$ is a polystyrene chain, and n is 2 as the valence of the methylstyrene dimer, General Formula (4) is represented by the following General Formula (q-3)

(q-3)

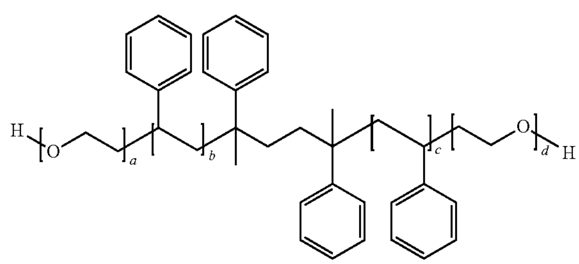

In General Formula (q-3), a, b, c, and d each represent a unit number, and each independently are an integer of 3 to 300.

(r) Polyethylene Oxide Polyaziridine Diblock Polymer

In General Formula (4), in a case where $R_1$ is a methoxy group, $A_1$ is a polyethylene oxide chain, $R_2$ is an oxyethylene group, $A_2$ is a poly-protected aziridine chain, $R_3$ is a hydroxyethyl group, and n is 1 as the valence of the methoxy group, the compound is represented by the following General Formula (r).

(r)

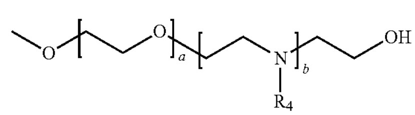

In General Formula (r), a, b, and c each represent a unit number, and each independently are an integer of 3 to 300.

Examples of such a compound include a compound represented by the following General Formula (r-1) in which $R_4$ is a propionic acid group.

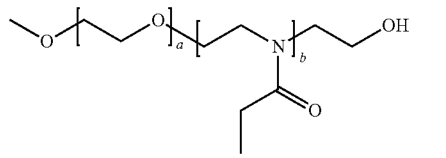

(r-1)

In General Formula (r-1), a, b, and c each represent a unit number, and each independently are an integer of 3 to 300.

(s) Polyalkylene Oxide Polydimethylsiloxane Di- or Triblock Polymer

In General Formula (4), in a case where $R_1$ is an isobutyl group, $A_1$ is a polydimethylsiloxane chain, $R_2$ is an oxyethylene group, $A_2$ is a polyethylene glycol chain, $R_3$ is a methyl group, and n is 1 as the valence of the isobutyl group, the compound is represented by the following General Formula (s-1).

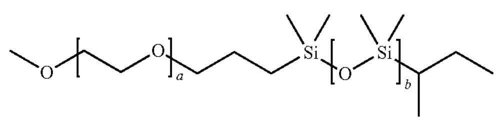

(s-1)

In General Formula (s-1), a and b each represent a unit number, and each independently are an integer of 3 to 300.

In a case where $R_1$ is a dimethylsiloxy group, and $R_2$ is a propylene group, General Formula (4) is represented by the following General Formula (s-2).

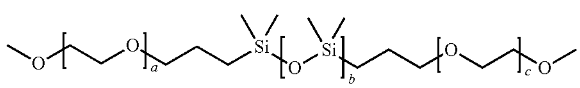

(s-2)

In General Formula (s-2), a, b, and c each represent a unit number, and each independently are an integer of 3 to 300.

(t) Asymmetrical Terminal Polyalkylene Oxide Triblock Polymer

In General Formula (4), in a case where $R_1$ is a propylene glycolate group, $A_1$ is a polypropylene glycol chain, $R_2$ is an oxyethylene group, $A_2$ is a polyethylene glycol chain, one of $R_3$'s is a hydroxyethyl group, the other $R_3$ is a methoxyethyl, and n is 2 as the valence of the propylene glycolate group, the compound is represented by the following General Formula (t).

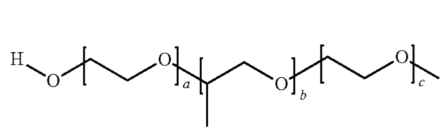

(t)

In General Formula (t), a, b, and c each represent a unit number, and each independently are an integer of 3 to 300.

(u) Asymmetrical Polyalkylene Oxide Triblock Polymer Glycidyl Ether

In General Formula (4), in a case where $R_1$ is a propylene glycolate group, $A_1$ is a polypropylene glycol chain, $R_2$ is an oxyethylene group, $A_2$ is a polyethylene glycol chain, R is a 2,3-epoxypropyl group, and n is 2 as the valence of the propylene glycolate group, the compound is represented by the following General Formula (u).

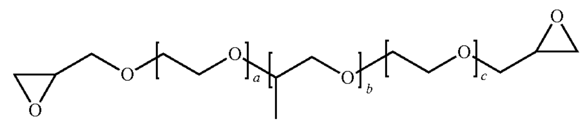

(u)

In General Formula (u), a, b, and c each represent a unit number, and each independently each independently are an integer of 3 to 300.

(v) Polyalkylene Oxide Triblock Polymer Lactic Acid Ester

In General Formula (4), in a case where $R_1$ is a propylene glycolate group, $A_1$ is a polypropylene glycol chain, $R_2$ is an oxyethylene group, $A_2$ is a polyethylene glycol chain, $R_3$ is a lactic acid group, and n is 2 as the valence of the propylene glycolate group, the compound is represented by the following General Formula (v).

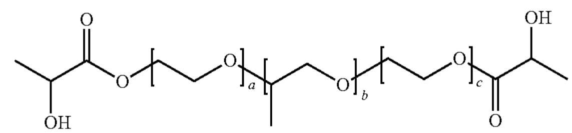

(v)

In General Formula (v), a, b, and c each represent a unit number, and each independently are an integer of 3 to 300.

In the present embodiment, as the polymer (a), at least one from the compounds represented by the following General Formula (4) can be used.

The compounds represented by General Formula (1), (2), and (4) are amphiphilic polymers having a hydrophilic site and a hydrophobic site.

In the present embodiment, as the polymer (a), one or two or more kinds selected from the compounds represented by General Formulas (1) to (4) may be used in combination, or one or two or more kinds selected from the compounds represented by any one of the general formulas (1) to (4) can be used in combination. In the present specification, it is preferable to use two compounds selected from the compounds represented by the general formula (4) in combination. Although there are no particular limitations on the two kinds of compounds selected in the present embodiment, in a case where a liquid compound of which the length of the hydrophilic block is short and a compound in the form of a solid or a paste of which the hydrophilic block are long are mixed and used, improved photochromic properties are likely to be observed.

[Compound (b)]

In the present embodiment, a compound (b) of which light absorption characteristics vary by sensing changes in environment is used. Examples of the changes in environment include wavelength changes of light, temperature changes, application of electricity, and types of solvents. Examples of light absorption characteristics include an absorption spectrum, an intensity change ratio in absorbance at a specific wavelength, and an intensity change rate in absorbance at a specific wavelength.

Examples of the compound (b) include a chromic compound (hereinafter, also referred to as a chromic material or a chromic dye), and the following compounds can be used.

(Photochromic Compound)

The molecular structure of the photochromic compound is changed reversibly by irradiation with light having a specific wavelength, and due to this, the light absorption characteristics (absorption spectrum) changes. Examples of the photochromic compound used in the present embodiment include a compound of which the light absorption characteristics (absorption spectrum) changes with respect to light having a specific wavelength. As the photochromic compound, known photochromic compounds can be used, and examples thereof include compounds derived from compounds such as naphthopyran, chromene, spiropyran, spirooxazine and thiospiropyran, benzopyran, stilbene, azobenzene, thioindigo, bisimidazole, spirodihydroindolizine, quinine, perimidinespirocyclohexadienone, viologen, fulgide, fulgimide, diarylethene, hydrazine, aniline, aryl disulfide, arylthioether sulfonate, spiroperimidine, and triarylmethane.

In the present embodiment, as the photochromic compound, a naphthopyran derivative is preferably used.

(Thermochromic Compound)

The light absorption characteristics (absorption spectrum) of the thermochromic compound changes depending on the temperature. Examples of the thermochromic compound include leuco compounds, and specific examples include phthalide, phthalan, an acyl-leucomethylene compound, fluoran, spiropyran, and coumarin. Specific examples of the fluoran include 3,3'-dimethoxyfluoran, 3,6-dimethoxyfluoran, 3,6-di-butoxyfluoran, 3-chloro-6-phenylamino-fluoran, 3-diethylamino-6-dimethyl fluoran, 3-diethylamino-6-methyl-7-chlorofluoran, 3-diethyl-7,8-benzofluoran, 3,3'-bis-(p-dimethyl-aminophenyl)-7-phenylaminofluoran, 3-diethylamino-6-methyl-7-phenylamino-fluoran, 3-diethylamino-7-phenyl-aminofluoran, and 2-anilino-3-methyl-6-diethylamino-fluoran. Similarly, examples of the phthalide include 3,3',3"-tris(p-dimethylamino-phenyl) phthalide, 3,3-bis(p-dimethyl-aminophenyl)phthalide, 3,3-bis(p-diethylamino-phenyl)-6-dimethylamino-phthalide, and 3-(4-diethylamino)phenyl.

Since these changes in the absorption spectrum are derived from the molecular structure changes due to an acid-base reaction (protonation-deprotonation) of the molecule, a proton donating agent (also referred to as a "developer") which generates an acid depending on the temperature can also be included.

Examples of the proton donating agent include phenol, azole, organic acids, esters of organic acids, and salts of organic acids.

Examples of the phenol include phenylphenol, bisphenol A, cresol, resorcinol, chlororesorcinol, R-naphthol, 1,5-dihydroxynaphthalene, pyrocatechol, pyrogallol, and a trimer of a p-chlorophenol-formaldehyde condensate. Examples of the azole include benzotriazoles (for example, 5-chlorobenzotriazole, 4-laurylaminosulfobenzotriazole, 5-butylbenzotriazole, dibenzotriazole, 2-oxybenzotriazole, and 5-ethoxycarbonylbenzotriazole), imidazole (for example, oxybenzimidazole), and tetrazole.

Examples of the organic acid include aromatic carboxylic acids (for example, salicylic acid, resorcylic acid, and benzoic acid) and aliphatic carboxylic acids (for example, stearic acid, 1,2-hydroxystearic acid, tartaric acid, citric acid, oxalic acid, and lauric acid).

To control the reaction by a thermochromic compound and a developer, a proton accepting agent (also referred to as a "desensitizer") which receives an acid depending on the temperature can also be included. Examples of the proton accepting agent include polyhydric alcohols, fatty acid esters, glycol ethers, and polyethylene glycol type nonionic active agents.

(Other Chromic Compounds)

Examples of other chromic compounds include an electrochromic compound of which light absorption characteristics vary by electricity (application of a voltage) and a solvatochromic compound of which light absorption characteristics vary depending on the type of solvent which is in contact.

The mass ratio of the polymer (a) to the chromic compound (b) is not particularly limited, but is preferably (b) 0.01 to 100 parts by weight to (a) 100 parts by weight, and more preferably (b) 1 to 10 parts by weight to (a) 100 parts by weight.

[Polymerization Reactive Compound (c)]

In the polymerization reactive compound (c), even in the presence or absence of the additives such as an initiator and a catalyst added as necessary, a polymerization reactive compound having at least one or more polymerizable functional groups which are capable of being self-polymerized, copolymerized, or addition-polymerized is included. The polymerization reactive compound (c) does not include the polymer (a).

Examples of the polymerization reactive compound include a polyiso (thio) cyanate compound having two or more isocyanate groups or isothiocyanate group, a (thio) epoxy compound having one or more epoxy groups or thioepoxy groups, an oxetanyl compound having one or more oxetanyl groups, a thietanyl compound having one or more thietanyl groups or having an oxetanyl group and a thietanyl group, a (meth)acryloyl compound having one or more methacryloyloxy groups, acryloyloxy groups, methacryloylthio groups, acryloylthio groups, methacrylamide groups, or acrylamide groups, a (meth)allyl compound having one or more methallyl groups or allyl groups, an alkene compound having one or more polymerizable carbon-carbon double bond groups other than a methacryloyloxy group, an acryloyloxy group, a methacryloylthio group, an acryloylthio group, a methacrylamide group, or an acrylamide group, an alkyne compound having one or more polymerizable carbon-carbon triple bond groups, a di- or higher functional active hydrogen compound, and an acid anhydride having one or more acid anhydride groups, and one or two or more compounds selected from these can be used.

Examples of the polyiso(thio)cyanate compound include aliphatic polyisocyanate compound such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysinediisocyanato methyl ester, lysine triisocyanate, and xylylene diisocyanate; alicyclic polyisocyanate compounds such as isophorone diisocyanate, bis(isocyanatomethyl) cyclohexane, bis(isocyanatocyclohexyl) methane, dicyclohexyldimethylmethane isocyanate, 2,5-bis(isocyanatomethyl) bicyclo-[2.2.1]-heptane, 2,6-bis(isocyanatomethyl) bicyclo-[2.2.1]-heptane, 3,8-bis(isocyanatomethyl) tricyclodecane, 3,9-bis (isocyanatomethyl) tricyclodecane, 4,8-bis (isocyanatomethyl) ticyclodecane, and 4,9-bis (isocyanatomethyl) tricyclodecane; aromatic polyisocyanate compounds such as tolylene diisocyanate, 4,4'-diphenylmethane diisocyanate, diphenylsulfide-4,4-diisocyanate, and phenylene diisocyanate; heterocyclic polyisocyanate compounds such as 2,5-diisocyanatothiophene, 2,5-bis(isocyanatomethyl) thiophene, 2,5-diisocyanatotetrahydrothiophene, 2,5-bis(isocyanatomethyl) tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane; aliphatic polyisothiocyanate compounds such as hexamethylene diisothiocyanate, lysine diisothiocyanate methyl ester, lysine triisothiocyanate, m-xylylene isothiocyanate, bis(isothiocyanatomethyl) sulfide, bis(isothiocyanatoethyl) sulfide, and bis(isothiocyanatoethyl) disulfide; alicyclic polyisocyanate compounds such as isophorone diisothiocyanate, bis(isothiocyanatomethyl) cyclohexane, bis(diisothiocyanatocyclohexyl) methane, cyclohexane diisothiocyanate, methylcyclohexane diisothiocyanate, 2,5-bis(isothiocyanatomethyl) bicyclo-[2.2.1]-heptane, 2,6-bis(isothiocyanatomethyl) bicyclo-[2.2.1]-heptane, 3,8-bis(isothiocyanatomethyl) tricyclodecane, 3,9-bis (isothiocyanatomethyl) tricyclodecane, 4,8-bis (isothiocyanatomethyl) ticyclodecane, and 4,9-bis (isothiocyanatomethyl) tricyclodecane; aromatic polyisothiocyanate compounds such as tolylene diisothiocyanate, 4,4-diphenylmethane diisothiocyanate, and diphenyldisulfide-4,4-diisothiocyanate; and sulfur-containing heterocyclic polyisothiocyanate compounds such as 2,5-diisothiocyanatothiophene, 2,5-bis(isothiocyanatomethyl) thiophene, 2,5-diisothiocyanatotetrahydrothiophene, 2,5-bis (isothiocyanatomethyl) tetrahydrothiophene, 3,4-bis(isothiocyanatomethyl) tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis (isothiocyanatomethyl)-1,3-dithiolane.

Examples of the (thio)epoxy compound include polyepoxy compounds such as bisphenol A diglycidyl ether; Examples of the linear aliphatic 2,3-epoxypropylthio compounds such as bis(2,3-epoxypropyl) sulfide, bis(2,3-epoxypropyl) disulfide, bis(2,3-epoxypropylthio) methane, 1,2-bis (2,3-epoxypropyl) ethane, 1,2-bis(2,3-epoxypropylthio) propane, 1,3-bis(2,3-epoxypropylthio) propane, 1,3-bis(2,3-epoxypropylthio)-2-methyl propane, 1,4-bis(2,3-epoxypropylthio) butane, 1,4-bis(2,3-epoxypropylthio)-2-methyl butane, 1,3-bis(2,3-epoxypropylthio) butane, 1,5-bis(2,3-epoxypropylthio) pentane, 1,5-bis(2,3-epoxypropylthio)-2-methyl pentane, 1,5-bis(2,3-epoxypropylthio)-3-thiapentane, 1,6-bis(2,3-epoxypropylthio) hexane, 1,6-bis(2,3-epoxypropylthio)-2-methyl hexane, 3,8-bis(2,3-epoxypropylthio)-3,6-dithiaoctane, 1,2,3-tris(2,3-epoxypropylthio) propane, 2,2-bis(2,3-epoxypropylthio)-1, 3-bis(2,3-epoxypropylthiomethyl) propane, 2,2-bis(2,3-epoxypropylthiomethyl)-1-(2,3-epoxypropylthio) butane, 1,5-bis(2,3-epoxypropylthio)-2-(2,3-epoxypropylthiomethyl)-3-thiapentane, 1,5-bis(2,3-epoxypropylthio)-2,4-bis (2,3-epoxypropythiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropythiomethyl)-3,6-dithiaoctane, 1,8-bis(2,3-epoxypropylthio)-4,4-bis(2,3-epoxypropythiomethyl)-3,6-dithiaoctane, 1,8-bis(2,3-epoxypropylthio)-2,5-bis(2,3-epoxypropythiomethyl)-3,6-dithiaoctane, 1,8-bis(2,3-epoxypropylthio)-2,4,5-tris(2,3-epoxypropythiometh yl)-3, 6-dithiaoctane, 1,1,1-tris[[2-(2,3-epoxypropylthio)ethyl] thiomethyl]-2-(2,3-epo xypropylthio) ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, and 1,11-bis(2,3-epoxypropylthio)-5,7-bis(2,3-epoxypropylthiomethyl)-3,6,9-trithiaundecane; cyclic aliphatic 2,3-epoxypropylthio compounds such as 1,3-bis(2, 3-epoxypropylthio) cyclohexane, 1,4-bis(2,3-epoxypropylthio) cyclohexane, 1,3-bis(2,3-epoxypropylthiomethyl) cyclohexane, 1,4-bis(2,3-epoxypropylthiomethyl) cyclohexane, 2,5-bis(2,3-epoxypropylthiomethyl)-1,4-dithiane, 2,5-bis[[2-(2,3-epoxypropylthio)ethyl]thiomethyl]-1,4-dithiane, and 2,5-bis(2,3-epoxypropylthiomethyl)-2,5-dimethyl-1,4-dithiane; and aromatic 2,3-epoxypropylthio compounds such as 1,2-bis(2,3-epoxypropylthio) benzene, 1,3-bis(2,3-epoxypropylthio) benzene, 1,4-bis(2,3-epoxypropylthio) benzene, 1,2-bis(2,3-epoxypropylthiomethyl) benzene, 1,3-bis(2,3-epoxypropylthiomethyl) benzene, 1,4-bis(2,3-epoxypropylthiomethyl) benzene, bis[4-(2,3-epoxypropylthio)phenyl]methane, 2,2-bis[4-(2,3-epoxypropylthio)phenyl] propane, bis[4-(2,3-epoxypropylthio)phenyl] sulfide, bis[4-(2,3-epoxypropylthio)phenyl] sulfone, and 4,4'-bis(2,3-epoxypropylthio) biphenyl.

Examples of the oxetanyl compound include 3-ethyl-3-hydroxymethyl oxetane, 1,4-bis{[(3-ethyl-3-oxetanyl) methoxy]methyl} benzene, 3-ethyl-3-(phenoxymethyl) oxetane, di[1-ethyl-(3-oxetanyl)]methyl ether, 3-ethyl-3-(2-ethylhexyloxymethyl) oxetane, and phenol novolac oxetane.

Examples of the thietanyl compound include 1-{4-(6-mercaptomethylthio)-1,3-dithianylthio}-3-{2-(1,3-dithietanyl)}methyl-7,9-bis(mercaptomethylthio) 2,4,6,10-tetrathiaundecane, 1,5-bis{4-(6-mercaptomethylthio)-1,3-dithianylthio}-3-{2-(1,3-d ithietanyl)}methyl-2,4-dithiapentane, 4,6-bis[3-{2-(1,3-dithietanyl)}methyl-5-mercapto-2,4-dithiapentylthio]-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethyl thio)-1,17-dimercapto-2,6,8,10,12,16-hexathiaheptadecane, 3-{2-(1,3-dithietanyl)}methyl-7,9,13,15-tetrakis(mercaptomethyl thio)-1,17-dimercapto-2,4,6,10,12,16-hexathiaheptadecane, 3,7-bis{2-(1,3-dithietanyl)}methyl-1,9-dimercapto-2,4,6,8-tetra thianonane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiol ane, and 4-{4-(5-mercaptomethylthio-1,3-dithiolanyl)thio}-5-[1-{2-(1,3-d ithietanyl)}-3-mercapto-2-thiapropylthio]-1,3-dithiolane.

Examples of the (meth)acryloyl compound include diacryloyl compounds such as ethylene glycol diacrylate, 1,3-butylene glycol diacrylate, 1,4-butanediol diacrylate, 1,6-hexanediol diacrylate, cyclohexanedimethanol diacrylate, alkoxylated hexanediol diacrylate, neopentyl glycol diacrylate, caprolactone modified neopentyl glycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecane dimethanol diacrylate, triethylene glycol diacrylate, and tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris(2-hydroxyethyl) isocyanurate triacrylate; and tetraacryloyl compounds such as ditrimethylolpropane tetraacrylate, dipentaerythritol pentaacrylate, ethoxylated pentaerythritol tetraacrylate, pentaerythritol tetraacrylate, and caprolactone-modified dipentaerythritol hexaacrylate.

Examples of the (meth)allyl compound include allyl carbonate compounds such as diethylene glycol bisallyl carbonate, dipropylene glycol bisallyl carbonate, triethylene glycol bisallyl carbonate, tetraethylene glycol bisallyl carbonate, neopentyl glycol bisallyl carbonate, 1,3-propanediol bisallyl carbonate, 1,4-butanediol bisallyl carbonate, 1,5-pentanediol bisallyl carbonate, 1,6-hexanediol bisallyl carbonate, and neopentyl glycol bisallyl carbonate, allyl carbonate bodies such as trimethylolpropane, pentaerythritol, diglycerol, ditrimethylolpropane, and dipentaerythritol, (meth)allyl ether compounds such as trimethylolpropane di(meth)allyl ether, pentaerythritol tri(meth)allyl ether, and glycerine mono(meth)allyl ether, (meth)allyl ester compounds such as (meth)allyl acrylate, di(meth)allyl maleate, di(meth)allyl fumarate, and diallyl phthalate, and triallyl isocyanurate.

Examples of the alkene compound include ethylene, propylene, isobutylene, styrene, and divinylbenzene.

Examples of the alkyne compound include hydrocarbon-based alkynes such as 2-butyne, 2-pentyne, 2-hexyne, 3-hexyne, 2-heptyne, 3-heptyne, 2-octyne, 3-octyne, 4-octyne, diisopropyl acetylene, 2-nonyne, 3-nonyne, 4-nonyne, 5-nonyne, 2-decyne, 3-decyne, 4-decyne, 5-decyne, di-tert-butyl acetylene, diphenyl acetylene, dibenzyl acetylene, methyl-iso-propyl acetylene, methyl-tert-butyl acetylene, ethyl-iso-propyl acetylene, ethyl-tert-butyl acetylene, n-propyl-iso-propyl acetylene, n-propyl-tert-butyl acetylene, phenyl methyl acetylene, phenyl ethyl acetylene, phenyl-n-propyl acetylene, phenyl-iso-propyl acetylene, phenyl-n-butyl acetylene, and phenyl-tert-butylacetylene; and alkynyl alcohols such as acetylene diol, propinol, butynol, pentynol, hexynol, hexynediol, heptynol, heptynediol, octynol, and octynediol, and alkynyl amines in which some or all OH groups of the alkynyl alcohols have been substituted with $NH_2$ groups.

Examples of the di- or higher functional active hydrogen compound include a poly(thi)ol compound having two or more hydroxyl groups or mercapto groups, a polyamine compound having two or more amino groups or secondary amino groups, and a polycarboxylic acid compound having two or more carboxyl groups. In addition, a compound having two or more active hydrogen groups selected from a hydroxyl group, a mercapto group, an amino group, a secondary amino group, and a carboxyl group in one molecule can also be exemplified. Two or more active hydrogen groups may be the same as or different from each other.

Among the poly(thi)ol compounds (here, alcohol used as a solvent is not included), examples of the polyol compound include aliphatic polyols such as ethylene glycol, diethylene glycol, propylene glycol, dipropylene glycol, tripropylene glycol, butylene glycol, neopentyl glycol, glycerin, trimethylol ethane, trimethylol propane, ditrimethylol propane, butanetriol, 1,2-methyl glucoside, pentaerythritol, dipentaerythritol, tripentaerythritol, sorbitol, erythritol, threitol, ribitol, arabinitol, xylitol, allitol, mannitol, dulcitol, iditol, glycol, inositol, hexanetriol, triglycerose, diglylperol, triethylene glycol, polyethylene glycol, tris(2-hydroxyethyl) isocyanurate, cyclobutanediol, cyclopentane diol, cyclohexane diol, cycloheptane diol, cyclooctane diol, cyclohexane dimethanol, hydroxypropyl cyclohexanol, tricyclo[5.2.1.0$^{2}$'6]decane-dimethanol, bicyclo[4.3.0]-nonanediol, dicyclohexanediol, tricyclo[5.3.1.1]dodecanediol, bicyclo[4.3.0] nonanedimethanol, tricyclo[5.3.1.1]dodecane-diethanol, hydroxypropyl tricyclo[5.3.1.1]dodecanol, spiro[3.4]octanediol, butyl cyclohexanediol, 1,1'-bicyclohexylidenediol, cyclohexanetriol, maltitol, and lactose; aromatic polyols such as dihydroxynaphthalene, trihydroxynaphthalene, tetrahydroxynaphthalene, dihydroxybenzene, benzenetriol, biphenyl tetraol, pyrogallol, (hydroxynaphthyl) pyrogallol, trihydroxyphenanthrene, bisphenol A, bisphenol F, xylylene glycol, di(2-hydroxyethoxy) benzene, bisphenol A-bis-(2-hydroxyethylether), tetrabromobisphenol A, and tetrabromobisphenol A-bis-(2-hydroxyethylether); halogenated polyols such as dibromoneopentyl glycol; and polymeric polyols such as an epoxy resin. In the present embodiment, at least one type selected from these can be used in combination.

Additionally, examples of the polyol compound include fused reaction products of an organic acid such as oxalic acid, glutamic acid, adipic acid, acetic acid, propionic acid, cyclohexanecarboxylic acid, R-oxocyclohexanepropionic acid, dimer acid, phthalic acid, isophthalic acid, salicylic acid, 3-bromopropionic acid, 2-bromoglycol, dicarboxycyclohexane, pyromellitic acid, butanetetracarboxylic acid, or bromophthalic acid with the above-described polyols;

addition reaction products of the above-described polyols with an alkylene oxide such as ethylene oxide or propylene oxide; addition reaction product of an alkylenepolyamine with an alkylene oxide such as ethylene oxide or propylene oxide; bis-[4-(hydroxymethyl)phenyl] sulfide, bis-[4-(2-hydroxypropoxy)phenyl] sulfide, bis-[4-(2,3-dihydroxypropoxy)phenyl] sulfide, bis-[4-(4-hydroxycyclohexyloxy) phenyl] sulfide, bis-[2-methyl-4-(hydroxyethoxy)-6-butylphenyl] sulfide, and compounds obtained by adding three or less molecules on average of ethylene oxide and/or propylene oxide per hydroxyl group to these compounds; and polyols containing a sulfur atom such as di-(2-hydroxyethyl) sulfide, 1,2-bis-(2-hydroxyethylmercapto) ethane, bis (2-hydroxyethyl) disulfide, 1,4-dithiane-2,5-diol, bis(2,3-dihydroxypropyl) sulfide, tetrakis(4-hydroxy-2-thiabutyl) methane, bis(4-hydroxyphenyl) sulfone (bisphenol S), tetrabromobisphenol S, tetramethyl bisphenol S, 4,4'-thiobis (6-tert-butyl-3-methylphenol), and 1,3-bis(2-hydroxyethylthioethyl)-cyclohexane. In the present embodiment, at least one type selected from these can be used in combination.

Examples of the polythiol compound include aliphatic polythiol compounds such as methanedithiol, 1,2-ethanedithiol, 1,2,3-propanetrithiol, 1,2-cyclohexanedithiol, bis(2-mercaptoethyl) ether, tetrakis(mercaptomethyl) methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(2-mercaptoethylthio) ethane, 1,2-bis(3-mercaptopropylthio) ethane, 1,2,3-tris(mercaptomethylthio) propane, 1,2,3-tris (2-mercaptoethylthio) propane, 1,2,3-tris(3-mercaptopropylthio) propane, 4-mercaptomethyl-1,8-dimercapto-3,6-dithiaoctane, 5,7-mercaptomethyl-1,11-dimercapto-3,6,9-trithiaundecane, 4,7-dimercaptomethyl-1,11-dimercapto-3,6,9-trithiaundecane, 4,8-dimercaptomethyl-1,11- dimercapto-3,6,9-trithiaundecane, tetrakis (mercaptomethylthiomethyl) methane, tetrakis(2-mercaptoethylthiomethyl) methane, tetrakis(3-mercaptopropylthiomethyl) methane, bis(2,3-mercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, and ester obtained by reacting these thiol compounds with a thioglycolic acid and a mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethyl ester), dithiodipropionic acid bis(2-mercaptoethylester), 1,1,3,3-tetrakis (mercaptomethylthio) propane, 1,1,2,2-tetrakis(mercaptomethylthio) ethane, 4,6-bis(mercaptomethylthio)-1,3-dithiane, tris(mercaptomethylthio) methane, and tris(mercaptoethylthio) methane; aromatic polythiol compounds such as 1,2-dimercaptobenzene, 1,3-dimercaptobenzene, 1,4-dimercaptobenzene, 1,2-bis(mercaptomethyl) benzene, 1,3-bis (mercaptomethyl) benzene, 1,4-bis(mercaptomethyl) benzene, 1,2-bis(mercaptoethyl) benzene, 1,3-bis(mercaptoethyl) benzene, 1,4-bis(mercaptoethyl) benzene, 1,3,5-trimercaptobenzene, 1,3,5-tris(mercaptomethyl) benzene, 1,3,5-tris(mercaptomethyleneoxy) benzene, 1,3,5-tris (mercaptoethyleneoxy) benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophene dithiol, bismuthiol, 4,6-bis(mercaptomethylthio)-1,3-dithiane, and 2-(2,2-bis(mercaptomethylthio)ethyl)-1,3-dithietane.

Examples of the polyamine compound include primary polyamine compounds such as ethylene diamine, 1,2-, or 1,3-diaminopropane, 1,2-, 1,3-, or 1,4-diaminobutane, 1,5-diaminopentane, 1,6-diaminohexane, 1,7-diaminoheptane, 1,8-aminooctane, 1,10-diaminodecane, 1,2-, 1,3-, or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenylmethane, 4,4'-diaminodiphenylsulfide, 3,3'- or 4,4'-diaminodiphenylsulfone, 2,7-aminofluorene, 1,5-, 1,8-, or 2,3-diaminonaphthalene, 2,3-, 2,6-, or 3,4-diaminopyridine, 2,4- or 2,6-diaminotoluene, m-, or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine; monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diamino-pentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine.

Examples of the polycarboxylic acid compound include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalene dicarboxylic acid, biphenyl dicarboxylic acid, dimer acid, trimellitic acid, pyromellitic acid, and ε-caprolactone.

Examples of the acid anhydride include succinic anhydride, phthalic anhydride, maleic anhydride, tetrabromophthalic anhydride, tetrahydrophthalic anhydride, trimellitic anhydride, and dodecylsuccinic anhydride.

The above polymerization reactive compounds may be used alone or two or more types thereof may be used in combination.

The polymerization reactive compound included in the composition of the present embodiment will be described in more detail below. The polymerization reactive compound can be classified into (Group A) and (Group B) according to reactivity.

(Group A): a polyiso(thio)cyanate compound, a (thio) epoxy compound, an oxetanyl compound, a thietanyl compound, a (meth)acryloyl compound, an alkene compound, or an alkyne compound can be classified into (Group A) as a self-polymerizable or copolymerizable compound. Here, the following (Group B) is not included in (Group A).

(Group B): a di- or higher functional active hydrogen compound which is a poly(thi)ol compound, a polyamine compound, or a polycarboxylic acid compound, or an acid anhydride can be classified into (Group B) as an addition-polymerizable compound. Here, the above (Group A) is not included in (Group B).

In a case where the polymerization reactive compound is used alone, any one type selected from (Group A) or (Group B) is selected. In a case where the polymerization reactive compound is used alone (one type), one type selected from (Group A) which is a self-polymerizable or copolymerizable compound is more easily cured than one type selected from (Group B) which is an addition-polymerizable compound, and thus this is preferable.

In a case where two or more polymerization reactive compounds are used, a method of mixing two or more types selected from only (Group A), two or more types selected from only (Group B), or one or more types selected from (Group A) and one or more types selected from (Group B) can be exemplified.

In the present embodiment, as a polymerization reactive compound, a polyiso (thio) cyanate compound in (Group A), and a di- or higher functional active hydrogen compound in (Group B) can be used.

The polyiso(thio)cyanate compound classified into a self-polymerizable or copolymerizable compound tends to have lower self-polymerizability than other compounds classified into (Group A) or lower reactivity of copolymerization with (Group A) compounds, and if selecting conditions, a self-polymerization reaction type polymer such as a 1-nylon type polymer or an isocyanurate type polymer is obtained in some cases. Also in the copolymerization with a (thio)epoxy compound, an ethylene carbonate type copolymerization polymer is obtained in some cases.

Even in the case of selecting two or more types from only the addition-polymerizable (Group B), in general, polymerization is difficult, but in a case where an acid anhydride and a poly(thi)ol compound are used in combination, in a case where an acid anhydride and a polyamine compound are used in combination, or in a case where three types of acid anhydride, poly(thi)ol compound, and polyamine compound are used in combination, there is a tendency that polymerization reaction is likely to proceed, and a curable resin is obtained. The blending ratio between acid anhydride and poly(thi)ol or polyamine is within a range of about 8/2 to 2/8, preferably within a range of 6/4 to 4/6, and more preferably within a range of range of 55/45 to 45/55, in the functional group molar ratio of the acid anhydride group of an acid anhydride/the mercapto group of poly(thi)ol (or amino group of polyamine).

The blending ratio in a case where both (Group A) and (Group B) are used is within a range of about 999/1 to 1/9, preferably within a range of 99/1 to 10/90, more preferably within a range of 9/1 to 3/7, and most preferably within a range of 7/3 to 4/6, when expressed in the functional group molar ratio of the polymerizable functional group of (Group A)/the polymerizable functional group of (Group B)

With respect to 100 parts by weight of the polymerization reactive compound (c), the polymerizable composition for optical materials of the present embodiment may contain 0.01 to 50 parts by weight of the polymer (a), preferably 0.05 to 20 parts by weight, and more preferably 0.1 to 10 parts by weight of the polymer (a), and may contain 0.0001 to 5 parts by weight of the compound (b), preferably 0.001 to 1 part by weight, and more preferably 0.005 to 0.5 parts by weight. These numerical ranges may be appropriately combined.

[Other Components Such as Additives]

The polymerizable composition of the present embodiment may include components other than the polymerization reactive compound described above. Examples thereof include a monofunctional iso(thio)cyanate compound, a monofunctional (thio)epoxy compound, a monofunctional oxetanyl compound, a monofunctional thietanyl compound, a monofunctional (meth)acryloyl compound having one functional group arbitrarily selected from a methacryloyloxy group, an acryloyloxy group, a methacryloylthio group, an acryloylthio group, a methacrylamide group, and an acrylamide group, a monofunctional alkene compound having one polymerizable carbon-carbon double bond other than a methacryloyloxy group, an acryloyloxy group, a methacryloyloxythio group, an acryloylthio group, a methacrylamide group, and an acrylamide group, a monofunctional alcohol compound other than alcohols used as a solvent, a monofunctional thiol compound, a monofunctional amine compound having one functional group arbitrarily selected from an amino group and a secondary amino group, a monofunctional carboxylic acid compound having one carboxyl group, a solvent, and water.

In the process for producing a molded product by cast-polymerizing the composition of the present embodiment, as necessary, in the case of being cured by heat, a polymerization catalyst or a thermal polymerization initiator is added, and in the case of being cured by radiation other than infrared rays (heat), such as ultraviolet rays, a photopolymerization initiator is added.

Examples of the polymerization catalyst include Lewis acid, amine, a tertiary amine compound and an inorganic acid salt or an organic acid salt thereof, a metal compound, a quaternary ammonium salt, and an organic sulfonic acid.

The amount of polymerization catalyst used is preferably within a range of 5 ppm to 15% by weight, more preferably within a range of 10 ppm to 10% by weight, and still more preferably within a range of 50 ppm to 3% by weight, with respect to the polymerizable composition.

Examples of the metal compound used as a polymerization catalyst include dimethyl tin chloride, dibutyl tin chloride, and dibutyl tin laurate.

Examples of the thermal polymerization initiator used include ketone peroxide compounds such as methyl isobutyl ketone peroxide and cyclohexanone peroxide;

diacyl peroxide compounds such as isobutyryl peroxide, o-chlorobenzoyl peroxide, and benzoyl peroxide;

dialkyl peroxide compounds such as tris(t-butylperoxy) triazine and t-butyl cumyl peroxide;

peroxyketal compounds such as 1,1-di(t-hexylperoxy) cyclohexane, 2,2-bis(4,4-di-t-butylperoxycyclohexyl) propane, and 2,2-di(t-butylperoxy) butane;

alkyl perester compounds such as α-cumylperoxyneodecanoate, t-butylperoxypivalate, 2,4,4-trimethylphenylperoxy-2-ethyl hexanoate, t-butylperoxy-2-ethyl hexanoate, and t-butylperoxy-3,5,5-trimethyl hexanoate; and peroxycarbonate compounds such as di-3-methoxybutyl peroxydicarbonate, bis(4-t-butylcyclohexyl) peroxydicarbonate, t-butyl peroxyisopropyl carbonate, and diethylene glycol bis(t-butylperoxycarbonate).

Examples of the photopolymerization initiator used include a photoradical polymerization initiator, a photocationic polymerization initiator, and a photoanionic polymerization initiator, and among these photopolymerization initiators, a photoradical polymerization initiator is preferable.

Examples of the photoradical polymerization initiator include Irgacure 127 (manufactured by BASF Corp.), Irgacure 651 (manufactured by BASF Corp.), Irgacure 184 (manufactured by BASF Corp.), Darocure 1173 (manufactured by BASF Corp.), benzophenone, 4-phenyl benzophenone, Irgacure 500 (manufactured by BASF Corp.), Irgacure 2959 (manufactured by BASF Corp.), Irgacure 907 (manufactured by BASF Corp.), Irgacure 369 (manufactured by BASF Corp.), Irgacure 1300 (manufactured by BASF Corp.), Irgacure 819 (manufactured by BASF Corp.), Irgacure 1800 (manufactured by BASF Corp.), Darocure TPO (manufactured by BASF Corp.), Darocure 4265 (manufactured by BASF Corp.), Irgacure OXEO1 (manufactured by BASF Corp.), Irgacure OXE02 (manufactured by BASF Corp.), Esacure KT55 (manufactured by Lamberti S.p.A.), Esacure ONE (manufactured by Lamberti S.p.A.), Esacure KIP150 (manufactured by Lamberti S.p.A.), Esacure KIP100F (manufactured by Lamberti S.p.A.), Esacure KT37 (manufactured by Lamberti S.p.A.), Esacure KTO46 (manufactured by Lamberti S.p.A.), Esacure 1001M (manufactured by Lamberti S.p.A.), Esacure KIP/EM (manufactured by Lamberti S.p.A.), Esacure DP250 (manufactured by Lamberti S.p.A.), Esacure KB1 (manufactured by Lamberti S.p.A.), and 2,4-diethyl thioxanthone.

Among these photoradical polymerization initiators, Irgacure 127 (manufactured by BASF Corp.), Irgacure 184 (manufactured by BASF Corp.), Darocur 1173 (manufactured by BASF Corp.), Irgacure 500 (manufactured by BASF Corp.), Irgacure 819 (manufactured by BASF Corp.), Darocur TPO (manufactured by BASF Corp.), Esacure ONE (manufactured by Lamberti S.p.A.), Esacure KIP100F (manufactured by Lamberti S.p.A.), Esacure KT37 (manufactured by Lamberti S.p.A.), or Esacure KTO46 (manufactured by Lamberti S.p.A.) is preferable.

Examples of the photocationic polymerization initiator include Irgacure 250 (manufactured by BASF Corp.), Irgacure 784 (manufactured by BASF Corp.), Esacure 1064 (manufactured by Lamberti S.p.A.), CYRAURE UVI6990 (manufactured by Union Carbide Corporation Japan), ADEKA OPTOMER SP-172 (manufactured by ADEKA CORPORATION), ADEKA OPTOMER SP-170 (manufactured by ADEKA CORPORATION), ADEKA OPTOMER SP-152 (manufactured by ADEKA CORPORATION), and ADEKA OPTOMER SP-150 (manufactured by ADEKA CORPORATION).

In a case where the above-described photopolymerization initiator is used, a photopolymerization accelerator may be used in combination. Examples of the photopolymerization accelerator include 2,2-bis(2-chlorophenyl)-4,5'-tetraphenyl-2'H-<1,2'>biimidazolyl, tris(4-dimethylaminophenyl) methane, 4,4'-bis(dimethylamino) benzophenone, 2-ethylanthraquinone, and camphorquinone.

The amount of the photopolymerization initiator and the thermal polymerization initiator used is preferably within a range of 0.1% to 20% by weight, more preferably within a range of 0.5% to 10% by weight, and still more preferably within a range of 1% to 5% by weight, in the polymerizable composition.

In the process for producing a molded product by cast-polymerizing the composition of the present embodiment, as necessary, an internal mold release agent may be added.

An acidic phosphoric ester can be used as the internal mold release agent. Examples of the acidic phosphoric ester include a phosphoric monoester and a phosphoric diester, and the acidic phosphoric ester can be used alone or in a mixture of two or more types thereof.

The acidic phosphoric ester used as the internal mold release agent can be represented by General Formula (5).

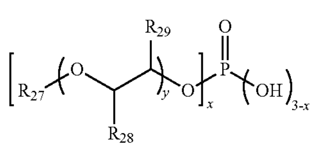

(5)

In General Formula (5), x represents an integer of 1 or 2, y represents an integer of 0 to 18, $R_{27}$ represents an alkyl group having 1 to 20 carbon atoms, and $R_{28}$ and $R_{29}$ each independently represent a hydrogen atom, a methyl group, or an ethyl group. The number of carbon atoms in [ ]x is preferably 4 to 20. A plurality of $R_{27}$'s may be the same as or different from each other, a plurality of $R_{28}$'s may be the same as or different from each other, or a plurality of $R_{29}$'s may be the same as or different from each other.

As $R_{27}$ in General Formula (5), an organic residue derived from a linear aliphatic compound such as methane, ethane, propane, butane, pentane, hexane, heptane, octane, nonane, decane, undecane, dodecane, tetradecane, or hexadecane, an organic residue derived from a branched aliphatic compound such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, or 4-propyloctane, and an organic residue derived from an alicyclic compound such as cyclopentane, cyclohexane, 1,2-dimethyl cyclohexane, 1,3-dimethyl cyclohexane, and 1,4-dimethyl cyclohexane can be exemplified, and at least one type selected from these can be used. Moreover, the present invention is not limited to these exemplary compounds. As the acidic phosphoric ester, at least one type or a mixture of two or more types can be used.

In General Formula (5), y is preferably 0 or 1.

In a case where y is 0, $R_{27}$ is preferably a linear or branched alkyl group having 4 to 12 carbon atoms, and more preferably a linear alkyl group having 4 to 12 carbon atoms.

In a case where y is 1, $R_{27}$ is preferably a linear or branched alkyl group having 1 to 20 carbon atoms, and preferably a linear or branched alkyl group having 3 to 12 carbon atoms.

The acidic phosphoric ester can be used as one type or a mixture of two or more types selected from these.

As the acidic phosphoric ester, ZelecUN (manufactured by STEPAN Company), an internal mold release agent for MR (manufactured by Mitsui Chemicals, Inc.), JP series manufactured by JOHOKU CHEMICAL CO., LTD., Phosphanol series manufactured by TOHO Chemical Industry Co., Ltd., or AP and DP Series manufactured by DAIHACHI CHEMICAL INDUSTRY CO., LTD. can be used, and ZelecUN (manufactured by Stepan Company) or an internal mold release agent for MR (manufactured by Mitsui Chemicals, Inc.) is more preferable.

To prevent changing in quality even in a case where a molded product comprised of the curable resin of the present embodiment is exposed to the outside for a long period of time, it is desirable that by further adding an ultraviolet absorbent and a hindered amine-based stabilizer to the composition of the present embodiment, a composition at which weather resistance is imparted is obtained.

The ultraviolet absorbent is not particularly limited, and for example, various ultraviolet absorbents such as a benzotriazole-based ultraviolet absorbent, a triazine-based ultraviolet absorbent, a benzophenone-based ultraviolet absorbent, a benzoate-based ultraviolet absorbent, a propanedioic acid ester-based ultraviolet absorbent, and an oxanilide-based ultraviolet absorbent can be used.

Specific examples thereof include benzotriazole-based ultraviolet absorbents such as 2-(2H-benzotriazol-2-yl)-4-methyl-6-{3,4,5,6-tetrahydrophthalibizylmethyl}phenol, 2-(2H-benzotriazol-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(l-methyl-1-phenylethyl)phenol, 2-(2H-benzotriazol-2-yl)-4-(1,1,3,3-tetramethylbutyl)-6-(1-meth yl-1-phenylethyl)phenol, 2-(2H-benzotriazol-2-yl)-4-(3-one-4-oxa-dodecyl)-6-tert-butyl-phenol, 2-{5-chloro(2H)-benzotriazol-2-yl}-4-(3-one-4-oxa-dodecyl)-6-tert-butyl-phenol, 2-{5-chloro (2H)-benzotriazol-2-yl}-4-methyl-6-tert-butyl-phenol, 2-(2H-benzotriazol-2-yl)-4,6-di-tert-pentyl phenol, 2-{5-chloro (2H)-benzotriazol-2-yl}-4,6-di-tert-butylphenol, 2-(2H-benzotriazol-2-yl)-4-tert-octylphenol, 2-(2H-benzotriazole-2-yl)-4-methyl-6-n-dodecylphenol, octyl 3-[3-tert-butyl-5-(5-chloro-2H-benzotriazol-2-yl)-4-hydroxyphenyl] propionate, 2-ethylhexyl 3-[3-tert-butyl-5-(5-chloro-2H-benzotriazol-2-yl)-4-hydroxyphenyl] propionate, methyl-3-{3-(2H-benzotriazol-2-yl)-5-tert-butyl-4-hydroxyphenyl}propionate, a reaction product of polyethylene glycol 300, product name Viosorb583 (manufactured by KYODO CHEMICAL CO., LTD.), product name Tinuvin 326 (manufactured by BASF Corp.), product name Tinuvin 384-2 (manufactured by BASF Corp.), product name Tinuvin PS (manufactured by BASF Corp.), product name Seesorb706 (manufactured by SHIPRO KASE KAISHA LTD.), and product name EVERSORB109 (manufactured by Everlight Chemical Industrial Corp.); triazine-based ultraviolet absorbents such as 2-(4-phenoxy-2-hydroxy-phenyl)-4,6-diphenyl-1,3,5-triazine, 2-(2-hydroxy-4-oxa-hexadesiloxy)-4,6-di(2,4-dimethyl-phenyl)-1,3,5-triazine, 2-(2-hydroxy-4-oxa-heptadesiloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, product name Tinuvin 400 (manufactured by BASF Corp.), product name Tinuvin 405 (manufactured by BASF Corp.), product name Tinuvin 460 (manufactured by BASF Corp.), and product name Tinuvin 479 (manufactured by BASF Corp.); benzophenone-based ultraviolet absorbents such as 2-hydroxy-4-n-methoxybenzophenone and 2-hydroxy-4-n-octoxybenzophenone; benzoate-based ultraviolet absorbents such as 2,4-di-tert-butylphenyl-3,5-di-tert-butyl-4-hydroxybenzoate; propanedioic acid ester-based ultraviolet absorbents such as propanedioic acid-{(4-methoxyphenyl)-methylene}-dimethyl ester, product name Hostavin PR-25 (manufactured by Clariant Japan K.K.), and product Name Hostavin B-CAP (manufactured by Clariant Japan K.K.); and oxanilide-based ultraviolet absorbents such as 2-ethyl-2'-ethoxy-oxanilide and product Name Sanduvor VSU (manufactured by Clariant Japan K.K.). Among these ultraviolet absorbents, benzotriazole-based ultraviolet absorbents or triazole-based ultraviolet absorbents are preferable.

In addition to the compound (b) that will be described below, materials contained inside the microphase-separated structural body constituted from the polymer (a) may be added to the composition of the present embodiment. Examples of such materials include metal fine particles.

The microphase-separated structural body can also act as a dispersant for a substance which is likely to be aggregated in a composition.

In some cases, the polymerizable composition for optical materials of the present embodiment includes a partially formed microphase-separated structural body of the polymer (a) depending on the preparation condition.

<Production Method of Polymerizable Composition for Optical Materials>

Specifically, the polymerizable composition for optical materials of the present embodiment can be produced by mixing and stirring the polymer (a), the compound (b) of which light absorption characteristics vary by sensing changes in environment, the polymerization reactive compound (c), and a catalyst, an internal mold release agent, and other additives used as necessary. Depressurization and defoaming may be performed as necessary. The temperature at the time of mixing is typically 25° C. or lower. There are cases in which the temperature is preferably a lower temperature from the viewpoint of a pot life of the polymerizable composition for optical materials. Here, in a case where the solubility of the catalyst, the internal mold release agent, and the additives in the polymerization reactive compound (c) is not good, it is also possible to dissolve by heating in advance.

Polymer particles containing the compound (b) are prepared from the polymer (a) and the compound (b) of which light absorption characteristics vary by sensing changes in specific environment factors in a predetermined solvent in advance, and after the polymerization reactive compound (c) is mixed therewith, by distilling off the solvent under reduced pressure, a polymerizable composition for optical materials may be prepared.

In addition, it is also possible that two or more compounds are used as the polymerization reactive compound (c), some of the polymer (a), the compound (b), and the polymerization reactive compound (c) is mixed, and then, the remaining polymerization reactive compound (c) is mixed with the obtained mixture.

In some cases, the polymerizable composition for optical materials of the present embodiment includes a partially formed microphase-separated structural body of the polymer (a) depending on the preparation condition.

<Cured Body>

A cured body can be obtained by polymerizing and curing the polymerizable composition for optical materials of the present embodiment. The cured body of the present embodiment includes the microphase-separated structural body of the polymer (a) comprised of one or more compounds selected from compounds represented by General Formulas (1) to (4), the compound (b) of which light absorption characteristics vary by sensing changes in environment; and the resin formed by polymerization of the polymerization reactive compound (c). As the microphase-separated structural body, polymer particles (micelle-like particles) having a microphase separation structure configured of the component (a) are exemplified. A cured body including a microphase-separated structural body can provide an optical material which is excellent in photochromic characteristics, heat resistance, and mechanical properties.

At least some of the compound (b) may be contained inside the microphase-separated structural body configured of the polymer (a), and in this case, the above-described effects are particularly excellent.

The volume 50% average particle diameter of the polymer particles which are microphase separation structural bodies 1 nm to 1000 nm. The structure can be confirmed by a transmission electron microscope.

(Microphase Separation Structure)

The microphase separation structure is described as follows. A block copolymer is a polymer comprised of a plurality of different copolymer portions linked through a covalent bond. This copolymer portions have physical properties and affinities different with each other. For example, for amphiphilic block copolymers, the copolymer portions tend to separate respectively, due to strong repulsive force, and the copolymers are not mixed as water and oil, and as a result, phase separation occurs. However, since respective copolymer portions are chemically bonded, as in a case where simply two homopolymers are mixed, macroscopic phase separation does not completely occur. On the other hand, in the microphase separation of a block copolymer comprised of portions of different copolymers A and B, a microaggregate having a portion in which the copolymer A is rich and a portion in which the copolymer B is rich is formed. As a result, depending on the structure of the block copolymer, some of morphology such as a nano-size spherical polymer micelle can be observed. Details of the microphase separation of such a block copolymer, for example, are described in reference (Chem. Soc. Rev., 2012, 41, 5969-5985). By including the microphase-separated structural body such as polymer particles having a microphase separation structure, it is possible to obtain a transparent cured body with low turbidity.

The production method of the cured body of the present embodiment includes a step of polymerizing and curing the above-described polymerizable composition for optical materials. By the step, specifically, a resin is formed by polymerization of the polymerization reactive compound (c), the polymer (a) forms a microphase-separated structural body, and a cured body comprised of the resin, the microphase-separated structural body, and the compound (b) is formed.

In the step, by heating or irradiating with radiation such as ultraviolet rays or the like other than infrared rays, and the polymerizable composition for optical materials is polymerized and cured, whereby a cured body can be obtained. The polymerization conditions are suitably selected.

<Molded Product>

The resin obtained by heat-polymerizing the composition of the present embodiment and the molded product comprised of the resin are produced by adding a polymerization reactive compound and as necessary, various additives described above. In addition, a polymerization reactive compound and an additive which are not described in the present application may be added to the composition of the present embodiment may be added within a range not impairing the effects of the present embodiment. The molded product of the present embodiment includes the microphase-separated structural body of the polymer (a), similarly to the cured body.

As the resin configuring the molded product of the present embodiment, resins obtained from a liquid polymerizable composition of which casting work is easy are preferable, and among these resins, resins described as the following (a) to (z) are preferable.

(a) a poly(thio)urethane resin obtained by polymerization of a polyiso(thio)cyanate compound and a poly(thi)ol compound In the present application, a poly(thio)urethane resin means a polyurethane resin, a polythiourethane resin, or a polydithiourethane resin.

(b) a poly(thio)urethane resin obtained by polymerization of a polyisocyanate compound or a polyisothiocyanate compound and a polyamine compound In the present application, a poly(thio)urea resin means a polyurea resin or a polythiourea resin.

(c) a poly(thio)epoxy resin obtained by polymerization of a (thio)epoxy compound (d) a poly(thio) epoxy-poly(thi)ol resin obtained by polymerization of a (thio)epoxy compound and a poly(thi)ol compound (e) a poly(thio)epoxy-polyamine resin obtained by polymerization of a (thio)epoxy compound and a polyamine compound (f) a poly(thio)epoxy-acid anhydride resin obtained by polymerization of a (thio)epoxy compound and an acid anhydride (g) a poly(meth)acryloyl resin obtained by polymerization of a (meth)acryloyl compound (h) a poly(meth)acryloyl-poly(thi)ol resin obtained by polymerization of a (meth)acryloyl compound and a poly (thi)ol compound (i) a poly(meth)acryl-polyalkene resin obtained by polymerization of a (meth)acryloyl compound and an alkene compound (j) a poly(meth)acryl-polyalkyne resin obtained by polymerization of a (meth)acryloyl compound and an alkyne compound (k) a poly(meth)acryl-polyamine resin obtained by polymerization of a (meth)acryloyl compound and a polyamine compound (l) a polyalkene resin obtained by polymerization of an alkene compound (m) a polyalkene-poly(thi)ol resin obtained by polymerization of an alkene compound and a poly(thi)ol compound (n) a polyalkene-polyamine resin obtained by polymerization of an alkene compound and a polyamine compound (o) a polyalkyne resin obtained by polymerization of an alkyne compound (p) a polyalkyne-poly(thi)ol resin obtained by polymerization of an alkyne compound and a poly(thi)ol compound (q) a polyalkyne-polyamine resin obtained by polymerization of an alkyne compound and a polyamine compound (r) a polyalkyne-polyalkene resin obtained by polymerization of an alkyne compound and an alkene compound (s) a polyoxetanyl resin obtained by polymerization of an oxetanyl compound (t) a polyoxetanyl-poly(thi)ol resin obtained by polymerization of an oxetanyl compound and a poly(thi)ol compound (u) a polyoxetanyl-polyamine resin obtained by polymerization of an oxetanyl compound and a polyamine compound (v) a polyoxetanyl-acid anhydride resin obtained by polymerization of an oxetanyl compound and an acid anhydride (w) a polythietanyl-poly(thi)ol resin obtained by polymerization of a thietanyl compound and a poly(thi)ol compound (x) a polythietanyl-polyamine resin obtained by polymerization of a thietanyl compound and a polyamine compound (y) a polythietanyl-acid anhydride resin obtained by polymerization of a thietanyl compound and an acid anhydride (z) mixed resins obtained by copolymerization of two or more selected from (a) to (y)

Among the resins of the above-described (a) to (z), as more preferable resins, the resins described in (a) to (i) and (s) to (z) and mixed resins thereof (a mixture of a copolymer and a resin) are exemplified, and as still more preferable resins, the resins described in (a) to (f), (s) to (v), and (z) and mixed resins thereof are exemplified.

<Molded Product and Application Thereof>

In the present embodiment, by changing the mold shape when polymerizing the polymerizable composition for optical materials as described above, molded products having various shapes and optical materials comprised of the molded products can be obtained. The molded product of the present embodiment can be molded in a desired shape, and can be used as various optical materials by providing a coating layer formed as necessary, other members, or the like.

Examples of the optical materials include a plastic lens, a light emitting diode (LED), a prism, an optical fiber, an information recording substrate, and a filter. A plastic lens is particularly suitable.

The plastic lens comprised of the molded product of the present embodiment will be described below. The plastic lens can be produced in the following manner.

<Production Method of Plastic Lens>

The plastic lens of the present embodiment is typically produced by a cast polymerization method using the polymerizable composition for optical materials described above. The production method of the plastic lens of the present embodiment includes, specifically, a step of forming a lens substrate by cast-polymerizing the polymerizable composition for optical materials.

In the step, by injecting the obtained composition of the present embodiment into a cavity comprised of a glass mold and a gasket or a tape and by heating or irradiating with radiation such as ultraviolet rays or the like other than infrared rays to polymerize and cure the composition, a resin of the present embodiment and a plastic lens substrate comprised of the resin are produced. By the step, a resin is formed by polymerization of the polymerization reactive compound (c), the polymer (a) forms a microphase-separated structural body, and it is possible to obtain a plastic lens substrate comprised of the resin, the microphase-separated structural body, and the compound (b).

In a case where a curable resin of the present embodiment and a plastic lens comprised of the resin are produced by heating, for the purpose of preventing polymerization uniformity (striae) by convection, typically, polymerization is conducted by slowly heating from a low temperature.

Since polymerization conditions significantly vary depending on the types and amounts of polymerizable composition for optical materials and the catalyst used, the shape of the mold, and the like, the polymerization conditions are not limited, but, approximately, polymerization is performed at a temperature of −50° C. to 150° C. for 1 hour to 50 hours. Depending on cases, the polymerizable composition is preferably held in a temperature range of 10° C. to 150° C. or slowly heated, and cured for 1 to 25 hours.

Similarly, even in a case where polymerization is performed by radiation such as UV, to prevent polymerization uniformity (striae) by convection, typically, polymerization is slowly conducted by dividing irradiation of radiation or reducing illuminance. For the purpose of making convection not further occur, a dual cure system in which by cooling overnight after a uniform polymerizable reactive composition is injected into a cavity, a state in which convection is less likely to occur is formed, and the semi-cured composition which has become a uniform gel state by irradiation with a weak radiation is completely cured by heating is taken in some cases.

For the purpose of removing the distortion due to polymerization completion or residual stress, the plastic lens obtained by releasing from the mold may be subjected to a re-heat treatment (annealing) as required. Typically, the heat treatment is performed within a range of 1 to 24 hours at Tg of the obtained plastic lens to Tg×2 times the temperature. A heat treatment condition of 1 to 16 hours at Tg to Tg×1.5 times the temperature is more preferable, and a heat treatment condition of 1 to 4 hours at Tg to Tg×1.2 times the temperature is still more preferable.

In a case where a curable resin of the present embodiment and a plastic lens comprised of the resin are produced by radiation, as the radiation used, energy rays having a wavelength range within a range of 0.0001 to 800 nm are typically used. The radiation is classified into α rays, β rays, γ rays, X-rays, electron beams, ultraviolet rays, visible light, and the like, and can be suitably selected according to the composition of the mixture and used. Among the radiation, ultraviolet rays is preferable, and the output peak of ultraviolet rays is preferably within a range of 200 to 450 nm, more preferably within a range of 230 to 445 nm, still more preferably within a range of 240 to 430 nm, and still more preferably within a range of 250 to 400 nm. By using ultraviolet rays within the range of the output peak, defects such as yellowing and thermal deformation at the time of polymerization are small, and it is possible to complete the polymerization in a relatively short period of time even in a case where an ultraviolet absorbent is added.

In addition, in a case where an ultraviolet absorbent and a hindered amine-based stabilizer are added in the composition, there is a tendency that ultraviolet rays having an energy output peak of ultraviolet rays within a range of 250 to 280 nm or within a range 370 to 430 nm is preferably used.

The curable resin of the present embodiment and the plastic lens comprised of the resin obtained in the above manner may be subjected to processing of imparting various functionalities by providing a functional coat layer such as a hard coat, an anti-reflection coat, a dimming coat, a slipperiness-imparting coat or a slipperiness-imparting treatment, or an antistatic coat to the surface, by performing a dyeing treatment for imparting fashionability, by performing a treatment of the surface, the edge, or the like, and by putting a polarizing film in the interior for the purpose of imparting polarizability or attaching a polarizing film to the surface.

For the purpose of improving adhesion between the functional coat layer and the substrate, the surface of the obtained curable resin of the present embodiment or the plastic lens comprised of the resin can also be subjected to a corona treatment, an ozone treatment, a low-temperature plasma treatment using oxygen gas or nitrogen gas, a glow discharge treatment, an oxidation treatment by chemicals, or a physical or chemical treatment such as a flame treatment.

Instead of these treatments or in addition to these treatments, a primer layer formed by a primer treatment, an undercoat treatment, or an anchor coat treatment may be provided between the surface of the curable resin of the present embodiment or the plastic lens comprised of the resin and the outermost layer (air contact surface) formed by the physical or chemical treatment.

As the coating agent used in the primer layer, for example, a coating agent which has a resin such as a polyester-based resin, a polyamide-based resin, a polyurethane-based resin, an epoxy-based resin, a phenol-based resin, a (meth)acrylic resin, a polyvinyl acetate resin, a polyolefin-based resin of polyethlene or polypropylene or a copolymer thereof or a modified resin, or a cellulose-based resin as the main component of vehicle can be used. The coating agent may be any one of a solvent type coating agent and an aqueous type coating agent.

Among these coating agents, a modified polyolefin-based coating agent, an ethyl vinyl alcohol-based coating agent, a polyethylene imine-based coating agent, a polybutadiene-based coating agent, or a polyurethane-based coating agent; a polyester-based polyurethane emulsion coating agent, a polyvinyl chloride emulsion coating agent, a urethane acryl emulsion coating agent, a silicon acryl emulsion coating agent, a vinyl acetate acryl emulsion coating agent, or an acryl emulsion coating agent; or a styrene-butadiene copolymer latex coating agent, an acrylonitrile-butadiene copolymer latex coating agent, a methyl methacrylate-butadiene copolymer latex coating agent, a chloroprene latex coating agent, a rubber-based latex coating agent of polybutadiene latex, a polyacrylic acid ester latex coating agent, a polyvinylidene chloride latex coating agent, a polybutadiene latex coating agent, or a coating agent comprised of carboxylic acid-modified product latex or dispersion of a resin included in these latex coating agents is preferable.

These coating agents can be applied, for example, by a dip coating method, a spin coating method, or a spray coating method, and the coating amount to a substrate is typically 0.05 $g/m^2$ to 10 $g/m^2$ in the dry state.

Among these coating agents, a polyurethane-based coating agent is more preferable. The polyurethane-based coating agent is a coating agent having a urethane bond in the main chain or the side chain of the resin included in the coating agent. The polyurethane-based coating agent is, for example, a coating agent including polyurethane obtained by reacting polyol such as polyester polyol, polyether polyol, or acrylic polyol with an isocyanate compound.

Among these polyurethane-based coating agents, a polyurethane-based coating agent obtained by mixing polyester polyol such as condensed polyester polyol or lactone-based polyester polyol and an isocyanate compound such as tolylene diisocyanate, hexamethylene diisocyanate, or xylylene diisocyanate is preferable from the viewpoint of excellent adhesion.

The method of mixing a polyol compound and an isocyanate compound is not particularly limited. In addition, the blending ratio is also not particularly limited, but if the isocyanate compound is too small, curing defects occur in some cases, and thus, the OH groups of the polyol compound and the NCO groups of the isocyanate compound are preferably within a range of 2/1 to 1.40 in terms of equivalent.

The curable resin of the present embodiment may be applied to those other than plastic lenses, and as applications other than plastic lenses, a sheet, a film, and the like produced in the same manner as in plastic lenses using a flat mold are exemplified. The surface of the sheet, the film, or the like comprised of the curable resin of the present embodiment may be physically or chemically treated in the same manner as in plastic lenses, and the primer layer described above and the functional outermost layer (air contact surface) formed by a physical or chemical treatment may be laminated.

The plastic lens comprised of the curable resin of the present embodiment may be a laminate including the primer layer between the functional outermost layer (air contact surface) formed by a physical or chemical treatment described above and the curable resin surface.

The plastic lens of the present embodiment obtained in the above manner can be used in various lens applications such as an eyeglass lens, a camera lens, a pickup lens, a Fresnel lens, a prism lens, and a lenticular lens. Examples of a particularly preferable application among these include an eyeglass lens, a camera lens, and a pickup lens, having a smooth surface.

The sheet and the film of the present embodiment obtained in the same manner can be used in various planar member applications requiring high transparency, such as display members including a flat panel and a smart phone panel, film members including a scatterproof film, a specific wavelength-cutting film, and a decorative film, and glass alternative members including building window glass, vehicle window glass, and a mirror.

EXAMPLES

Hereinafter, the present invention will be described in more detail based on Examples, but the invention is not intended to be limited to these.

[Example a Using Polymer (Block Copolymer) of General Formula (1)]

(Analysis Method)

The number average molecular weight (Mn), the weight average molecular weight (Mw), and the molecular weight distribution (Mw/Mn) were measured using GPC by the method described in the text. In addition, as the melting point (Tm), a peak top temperature obtained by measurement using differential scanning calorimetry (DSC) was adopted. The melting point of the polyalkylene glycol portion is also confirmed by the measurement conditions, and unless specified otherwise here, the melting point refers to the melting point of the polyolefin portion. $^1$H-NMR was measured at 120° C. after the polymer in the measurement sample tube was completely dissolved in deuterated-1,1,2,2-tetrachloroethane which also serves as a lock solvent and a solvent. As the chemical shift, the peak of deuterated-1,1,2,2-tetrachloroethane was set to 5.92 ppm as a reference value, and chemical shift values of other peaks were determined. As the particle diameter of the particles in the dispersion, the volume 50% average particle diameter was measured using Microtrac UPA (manufactured by Honeywell International Inc.). Shape observation of the particles in the dispersion was performed under the condition of 100 kV using a transmission electron microscope (TEM, H-7650, manufactured by Hitachi, Ltd.) after the sample was diluted from 200-fold to 500-fold and subjected to negative staining with phosphotungstic acid.

Synthesis Example a1

(Synthesis of Terminal Branched Copolymer (T))

According to the following procedure (for example, refer to Synthesis Example 2 of Japanese Unexamined Patent Publication No. 2006-131870), a terminal epoxy group-containing ethylene polymer (E) was synthesized. 1000 ml of heptane was charged at room temperature in an autoclave made of stainless steel having an internal volume of 2000 ml which had been sufficiently purged with nitrogen, and the temperature was raised to 150° C. Subsequently, the inside of the autoclave was pressurized to 30 kg/cm$^2$G with ethylene, and the temperature was maintained. 0.5 ml (0.5 mmol) (1.00 mmol/ml in terms of aluminum atom) of a hexane solution of MMAO (manufactured by Tosoh Finechem Corporation) was injected at pressure, and then, 0.5 ml (0.0001 mmol) of a toluene solution (0.0002 mmol/ml) of a compound represented by the following General Formula (6) was injected at pressure to initiate polymerization. In an ethylene gas atmosphere, polymerization was performed at 150° C. for 30 minutes, and by injecting a small amount of methanol at pressure, the polymerization was stopped. The obtained polymer solution was added to 3 liter methanol including a small amount of hydrochloric acid to precipitate a polymer. After washing with methanol, the resulting product was dried under reduced pressure at 80° C. for 10 hours, whereby a one terminal double bond-containing ethylene-based polymer (P) was obtained.

(6)

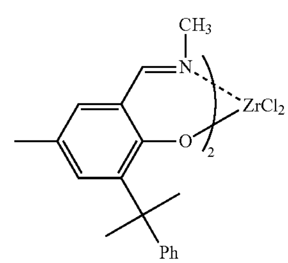

100 g (as Mn 850, 108 mmol of a vinyl group) of the above one terminal double bond-containing ethylene-based polymer (P), 300 g of toluene, 0.85 g (2.6 mmol) of $Na_2WO_4$, 0.60 g (1.3 mmol) of $CH_3(nC_8H_{17})_3NHSO_4$, and 0.11 g (1.3 mmol) of phosphoric acid were put into a 500 ml separable flask, and the resulting product was heated to reflux for 30 minutes while being stirred, to completely dissolve the polymer. After the internal temperature was set to 90° C., 37 g (326 mmol) of 30% hydrogen peroxide water was added dropwise thereto over a period of 3 hours, and the resulting product was stirred at an internal temperature of 90° C. to 92° C. for 3 hours. Thereafter, 34.4 g (54.4 mmol) of a 25% sodium thiosulfate aqueous solution was added thereto while maintaining at 90° C., followed by stirring for 30 minutes, and it was confirmed that the peroxide in the reaction system had been completely degraded using a peroxide test paper. Next, 200 g of dioxane was added thereto at an internal temperature of 90° C., then, the product was crystallized, and the solid was collected by filtration and washed with dioxane. The obtained solid was stirred in a 50% methanol aqueous solution at room temperature, and the solid was collected by filtration and washed with methanol. The solid was further stirred in 400 g of methanol, collected by filtration, and washed with methanol. By drying the resulting product at room temperature under a reduced pressure of 1 to 2 hPa, 96.3 g of a terminal epoxy group-containing ethylene polymer (E) was obtained as a white solid (yield of 99%, olefin conversion ratio of 100%). The obtained terminal epoxy group-containing ethylene polymer (E) had Mw of 2058, Mn of 1118, and Mw/Mn of 1.84 (GPC) (terminal epoxy group content: 90 mol %, $^1$H-NMR: $\delta(C_2D_2Cl_4)$ 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H), melting point (Tm) of 121° C.)

84 parts by weight of the terminal epoxy group-containing ethylene polymer (E), 39.4 parts by weight of diethanolamine, and 150 parts by weight of toluene were put into a 1000 mL flask, followed by stirring at 150° C. for 4 hours. Thereafter, acetone was added while cooling, and as a result, a reaction product was precipitated, and the solid collected by filtration. After the obtained solid was stirred and washed once with an acetone aqueous solution and three times with acetone, the solid was collected by filtration. Thereafter, by drying the resulting product at room temperature under a reduced pressure, a polymer (I) (Mn=1223, in General Formula (7), A: a group formed by polymerization of ethylene (Mn=1075), $R^1$=$R^2$=hydrogen atom, one of $Y^1$ and $Y^2$ is a hydroxyl group, and the other is bis(2-hydroxyethyl)amino group) was obtained ($^1$H-NMR: $\delta$ ($C_2D_2Cl_4$) 0.88 (t, 3H, J=6.6 Hz), 0.95-1.92 (m), 2.38-2.85 (m, 6H), 3.54-3.71 (m, 5H), melting point (Tm) of 121° C.).

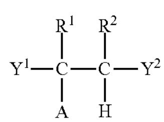

(7)

20.0 parts by weight of the polymer (I) and 100 parts by weight of toluene were put into a 500 mL flask provided with a nitrogen inlet tube, a thermometer, a cooling tube, and a stirrer, and the resulting product was heated in an oil bath at 125° C. while being stirring, and as a result, the solid was completely dissolved. After being cooled to 90° C., 0.323 parts by weight of 85% potassium hydroxide which had been dissolved in 5.0 parts by weight of water in advance was added to the flask, and the resulting product was mixed for 2 hours under a reflux condition. Thereafter, while slowly raising the temperature inside the flask to 120° C., water and toluene were distilled off. The inside of the flask was depressurized while supplying a slight amount of nitrogen into the flask, and after raising the internal temperature to 150° C., while maintaining the state for 4 hours, the water and toluene in the flask were further distilled off. After being cooled to room temperature, the solid solidified in the flask was broken up and taken out.

18.0 parts by weight of the obtained solid and 200 parts by weight of dehydrated toluene were put into a 1.5 L pressurized reactor made of stainless steel provided with a heater, a stirrer, a thermometer, a pressure gauge, and a safety valve, and after replacing the gas phase with nitrogen, the mixture was heated 130° C. while being stirred. After 30 minutes, 18.0 parts by weight of ethylene oxide was added thereto, and the resulting product was maintained at 130° C. for 5 hours and cooled to room temperature, whereby a reaction product was obtained. The solvent was removed from the obtained reaction product by drying, whereby a purified polyolefin-based terminal branched copolymer (T) was obtained (Mn=2446, in General Formula (1), A: a group (Mn=1075) formed by polymerization of ethylene, $R^1$=$R^2$=hydrogen atom, any one of $X^1$ and $X^2$ is a groups represented by General Formula (1e) ($X^{11}$=polyethylene glycol group), and the other is a group represented by General Formula (1d) ($Q^1$=$Q^2$=ethylene group, $X^9$=$X^{10}$ polyethylene glycol group)) ($^1$H-NMR: $\delta$ ($C_2D_2Cl_4$) 0.88 (3H, t, J=6.8 Hz), 1.06-1.50 (m), 2.80-3.20 (m), 3.33-3.72 (m), melting point (Tm) 27° C. (polyethylene glycol), 118° C.)

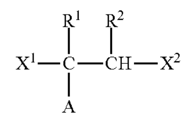

(1)

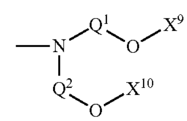

(1d)

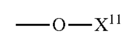

(1e)

Reference Production Example a1

100 g of the polyolefin-based terminal branched copolymer (T) obtained in Synthesis Example 1 was dispersed in 400 g of water, and while stirring at a speed of 800 rpm using an autoclave, the temperature was raised to 135 degrees, followed by heating for 30 minutes. 20 g of Dowex50×8 (manufactured by Sigma-Aldrich Co. LLC.) which is a strong acid ion exchange resin was added to 500 g of the aqueous solution obtained by cooling, followed by stirring overnight, and the ion exchange resin was removed using a pressure filter. Then, 10 g of AmberiteIR4005 which is a basic ion exchange resin washed with 1 N sodium hydroxide aqueous solution and activated in advance was added thereto, followed by stirring for 3 hours, and the ion exchange resin was removed using a pressure filter, whereby a purified polyolefin-based terminal branched copolymer (T) aqueous solution could be obtained.

Reference Production Example a2

The purified polyolefin-based terminal branched copolymer (T) aqueous solution obtained in Reference Production Example a1 was frozen using a freezer and freeze-dried using a freeze drying apparatus FDU-1200 manufactured by TOKYO RIKAKIKAI CO., LTD. and water was removed. An operation of freeze drying was repeated two times, whereby a purified polyolefin-based terminal branched copolymer (T) could be obtained as a white powder.

Production Example a1

200 g (9.4 mmol) of a purified polyolefin-based terminal branched copolymer (T) aqueous solution obtained in Reference Production Example a1 was put into a reactor provided with a stirrer, and 1.61 g of benzyl bromide (manufactured by Sigma-Aldrich Co. LLC.) was added thereto, followed by stirring at room temperature for 24 hours. After reaction, the resulting product was heated at 60 degrees for 6 hours using an oil bath, whereby a quaternary ammonium polyolefin chloride-based terminal branched copolymer aqueous solution was obtained. The reaction mass was frozen using a freezer and freeze-dried using a freeze drying apparatus FDU-1200 manufactured by TOKYO RIKAKIKAI CO., LTD. and water was removed. An operation of freeze drying was repeated two times, whereby a quaternary ammonium polyolefin chloride-based terminal branched copolymer (N) could be obtained as a white powder. yield of 35 g.

The identification data of the obtained compound are shown below.

$^1$H-NMR: δ ($CDCl_3$)

0.90 (3H, t), 1.06-1.50 (m), 2.80-3.20 (m), 3.33-3.72 (m), 4.48 (2H, S), 7.50 (3H, S), 7.76 (2H, S)

[Thickening Speed Measurement]

Comparative Example a1

2.73 g (55 parts by weight) of a mixture of 2,5-bis(isocyanatomethyl)bicyclo-[2.2.1]-heptane and 2,6-bis (isocyanatomethyl)bicyclo-[2.2.1]-heptane (hereinafter referred to as norbornene diisocyanate composition) and 0.25 g (5 parts by weight) of the purified polyolefin-based terminal branched copolymer (T) obtained in Reference Production Example a2 was added to 2.73 g (55 parts by weight) of a norbornene diisocyanate composition, followed by stirring for 1 hour, and 10 mg (5000 ppm) of Zelec-UN (manufactured by Stephan Company) and 1.17 g (23 parts by weight) of pentaerythritol tetrakis 3-mercaptopropionic ester were added thereto, followed by stirring for 30 minutes. 1.10 g (22 parts by weight) of 4-mercaptomethyl-1,8-dimercapto-3,6-dithiaoctane was added to this solution, followed by stirring. The time of addition was set to 0 minute, and using an E type viscometer (manufactured by Brookfield AMETEK), changes in viscosity during stirring were examined.

The viscosity when 30 minutes elapsed was 3649 kPa·s, and the viscosity after 1 hour or longer was not measurable.

Comparative Example a2

Viscosity measurement was performed in the same manner as in Comparative Example a1 except that the amount of Zelec-UN added was increased to 40 mg (20000 ppm). The viscosity after 1 hour was 481 kPa*s, the viscosity after 2 hours was 1521 kPa·s, and this viscosity was a viscosity at which casting to a mold was difficult.

In general, it was necessary to add a tin catalyst to proceed a reaction in polymerization of thiourethane, but the thickening speed was increased even in a state at which a catalyst was not added, and resinification by adding a catalyst was difficult.

Example a1

0.15 g (5 parts by weight) of a quaternary ammonium salt type polyolefin-based terminal branched copolymer (N) obtained in Production Example a1 was added to 1.67 g (55 parts by weight) of a norbornene diisocyanate composition, followed by stirring for 1 hour, and 4.5 mg (1500 ppm) of Zelec-UN and 0.70 g (23 parts by weight) of 4-mercaptomethyl-1,8-dimercapto-3,6-dithiaoctane were added thereto, followed by stirring for 30 minutes. To this solution, 0.66 g (22 parts by weight) of pentaerythritol tetrakis 3-mercaptopropionate and 1.8 mg (600 ppm) of dibutyltin dichloride were added, followed by stirring. The time of addition was set to 0 minute, and using an E type viscometer (DV1 viscometer manufactured by Brookfield AMETEK), changes in viscosity during stirring were examined.

The viscosity after 7 hours was 179 mPa·s, and even in the case of adding a block copolymer, it was possible to secure a sufficient castable time. The results are shown in Table 1.

Reference Example a2, Examples a3 to a5

Data of changes in viscosity were obtained in the same manner as in Example a1 except that the catalyst and the amount of quaternary ammonium salt type polyolefin-based terminal branched copolymer were changed. The results are shown in Table 1.

TABLE 1

| | Amount of catalyst DBC | Additive amount of block copolymer | Viscosity of composition (mPa · s) | | | |
|---|---|---|---|---|---|---|
| | (ppm) | (parts by weight) | 1 hour | 3 hours | 5 hours | 7 hours |
| Example a1 | 600 | 5 | 48 | 72 | 112 | 179 |
| Reference Example a2 | 600 | 0 | 26 | 44 | 72 | 117 |
| Example a3 | 600 | 10 | 59 | 132 | 338 | 720 |
| Example a4 | 1200 | 5 | 63 | 145 | 335 | 770 |
| Example a5 | 1800 | 5 | 84 | 284 | 1070 | — |

From the above, it was found that by using the quaternary ammonium salt type polyolefin-based terminal branched copolymer (N), viscosity increase is suppressed, handling properties become excellent, and it is possible to secure a sufficient casting time compared to the inventions in the related art.

[Photochromic Characteristics]

Measurement Method:

Measurement was performed by using a UV-VIS spectrometer (UV-1800 manufactured by Shimadzu Corporation) and a UV irradiation apparatus (gel imaging apparatus manufactured by ATTO Corporation). A dye was colored by irradiation with UV rays having a wavelength of 312 nm for 2 minutes using a gel imaging apparatus after UV-VIS spectrum of the resin was measured first. Spectra after 20 seconds, 2 minutes, 5 minutes, 10 minutes, and 15 minutes after irradiation were measured, and the following information was obtained from the measured spectra.

ΔT % max: the amount of changes in light transmittance at 550 nm before and after coloring F1/2: color fading half-life

Example a6

1.5 mg (500 ppm) of a naphthopyran-based photochromic dye (manufactured by Vivimed Labs Ltd., Reversacol Humber Blue (polydimethylsiloxane chain, naphthopyran-based chromophore) and 0.15 g (5 parts by weight) of a quaternary ammonium polyolefin chloride-based terminal branched copolymer (N) were added to 1.64 g (55 parts by weight) of a norbornene diisocyanate composition, followed by stirring to dissolve. To this solution, a mixture of 1.8 mg (600 ppm) of dibutyltin dichloride (manufactured by Sigma-Aldrich Co. LLC.), 4.5 mg (1500 ppm) of Zelec-UN (manufactured by Stephan Company), 0.66 g (22 parts by weight) of pentaerythritol tetrakis 3-mercaptopropionate, and 0.70 g (23 parts by weight) of 4-mercaptomethyl-1,8-dimercapto-3,6-dithiaoctane was added, followed by stirring. After being filtered through a 1 μm membrane filter, while being stirred, a decompressing and degassing operation was performed using a vacuum pump.

The prepared monomer was charged in a glass mold having a thickness of 2 mm, and resinification was performed by raising the temperature from room temperature to 120° C. in an oven, whereby a molded product was produced. The measurement results of the photochromic characteristics are shown in Table 2.

Examples a7 to a10

Resinification was performed in the same manner as in Example a6 except that, as shown in Table 2, the type of naphthopyran-based photochromic dye and the amount of quaternary ammoniated polyolefin-based terminal branched copolymer were changed, whereby a molded product was prepared. The measurement results of the photochromic characteristics are shown in Table 2. In Table 2, CR-173 is a naphthopyran-based photochromic dye.

Comparative Example a3

Resinification was performed in the same manner as in Example a6 except that the quaternary ammonium salt type polyolefin-based terminal branched copolymer was not added, whereby a molded product was prepared. The measurement results of the photochromic characteristics are shown in Table 2.

TABLE 2

| | Additive amount of block copolymer (parts by weight) | Photochromic dye | ΔT % max (%) | F1/2 (s) |
|---|---|---|---|---|
| Example a6 | 5 | Reversacol Humber Blue | 43 | 85 |
| Example a7 | 8 | Reversacol Humber Blue | 61 | 103 |
| Example a8 | 10 | Reversacol Humber Blue | 61 | 132 |
| Example a9 | 5 | CR-173 | 26 | 91 |
| Example a10 | 10 | CR-173 | 38 | 84 |
| Comparative Example a3 | — | Reversacol Humber Blue | 5 | — |

From the above results, it was found that the poly(thio) urethane resin molded product including a block copolymer can effectively exhibit a photochromic characteristics.

[Other Physical Properties (Mechanical Properties and the Like)]

The optical properties (refractive index, Abbe number), heat resistance, and strength of the resins produced in the examples and the comparative examples were evaluated by the following test methods.

Refractive index (ne) and Abbe number (νe): measurement was performed at 20° C. using a Pulfrich refractometer.

Heat resistance: the heat resistance was measured by a TMA penetration method (50 g of load, 0.5 mm at the tip of a pin, temperature rising rate of 10° C./min). The temperature of the intersection point of the tangent of the TMA curve at the time of thermal expansion and the tangent of the TMA curve at the time of decline was defined as a thermal deformation starting temperature.

Bending test: measured was performed using by AUTOGRAPH AGS-J manufactured by Shimadzu Corporation. Using a resin test piece having a thickness of 3.0 mm, a length of 75 mm, and a width of 25.0 mm, the bending elastic modulus (MPa) at the time of applying load to the test piece center at a lowering speed of 1.2 mm/min was measured.

TEM analysis: the cross section of a resin subjected to cutting work was colored with ruthenium oxide, and measurement was performed using a transmission electron microscope H-7650 (TEM) manufactured by Hitachi High-Technologies Corporation. The morphology of the polymer was confirmed from the photograph.

Example a11

76.6 g (55 parts by weight) of a norbornene diisocyanate composition, 70 mg (500 ppm) of a naphthopyran-based photochromic dye (Reversacol Humber Blue (polydimethylsiloxane chain, naphthopyran-based chromophore), 11.2 g (8 parts by weight) of a quaternary ammonium chlorinated polyolefin-based terminal branched copolymer (N), and 0.21 g (1500 ppm) of Zelec-UN (manufactured by Stephan Company) as an internal mold release agent were put into a 500 ml flask, followed by stirring for 30 minutes to dissolve. Next, 30.8 g (22 parts by weight) of pentaerythritol tetrakis 3-mercaptopropionate was added thereto, followed by stirring, and 32.6 g (23 parts by weight) of 4-mercaptomethyl-1,8-dimercapto-3,6-dithiaoctane in which 0.168 g (1200 ppm) of dibutyltin dichloride had been dissolved was added thereto, followed by stirring for 1 hour. After being filtered through a 300 micron PTFE membrane filter, a decompressing and degassing operation was performed using a vacuum pump for 1 hour.

The obtained photochromic composition was charged in a glass mold, and while raising the temperature from room temperature to 120° C. in an oven, heating and polymerization were performed, whereby a molded product was produced. The mechanical properties and the like of the obtained molded product were measured. The results are shown in Table 3. In addition, the results of TEM analysis are shown in FIG. 1.

Comparative Example a4

Polymerization was performed in the same manner as in Example all except that a quaternary ammoniated polyolefin-based terminal branched copolymer (N) of Example a11 was changed to polyethylene glycol monomethyl ether (manufactured by Sigma-Aldrich Co. LLC.: average molecular weight of 750) and the additive amount was 15 parts by weight, whereby a molded product was manufactured. The measurement results of the obtained mechanical properties and the like are shown in Table 3 below.

TABLE 3

| | Refractive index (Ne) | Abbe number (νe) | Heat resistance (° C.) | Bending elastic modulus (MPa) |
|---|---|---|---|---|
| Example a11 | 1.586 | 42 | 103 | $1.9 \times 10^3$ |
| Comparative Example a4 | 1.584 | 42 | 76 | $3.4 \times 10^3$ |

From the above results, it was found that the poly(thio) urethane resin molded product including a block copolymer had improved heat resistance while maintaining the refractive index and the Abbe number. The bending elastic modulus was also within an acceptable range, and the poly(thio) urethane resin molded product was excellent in balance between heat resistance and mechanical properties. In addition, from the TEM photograph shown in FIG. 1, it was possible to confirm a state in which particles of 50 nm or less having a microphase separation structure were uniformly dispersed in the resin.

Example b Using Polymer (Block Copolymer) of General Formula (2)

(Production Example b1) Production of Brominated Polyolefin-Based Terminal Branched Copolymer for Atom Transfer Radical (ATRP) Polymerization 1 g of the purified polyolefin-based terminal branched copolymer (T) obtained in Reference Production Example a2 and 0.16 ml (1.11 mmol) of triethylamine (manufactured by Sigma-Aldrich Co. LLC.) were put into a dry flask, and after dissolving the resulting product in 5 mL of dehydrated dichloromethane, 2 mL of a dichloromethane solution of 0.13 ml (1.07 mmol) of 2-bromoisobutyl bromide (manufactured by Sigma-Aldrich Co. LLC.) was slowly added thereto. After the reaction was continued at 0° C. for 1 hour, the resulting product was stirred at room temperature overnight. After the insoluble salts were removed by filtration, the filtrate was concentrated to be dry. About 1 g of a brominated polyolefin-based terminal branched copolymer was obtained as a viscous solid. The product was used in the next step without purification.

(Production Example b2) Production of Copolymer by ATRP Polymerization 100 mg of the compound synthesized in Production Example b1, 20 μl (0.094 mmol) of N,N,N',N",N"-pentamethyldiethylenetriamine (manufactured by Sigma-Aldrich Co. LLC.), 0.79 ml (4.68 mmol) of benzyl methacrylate purified by distillation, 56 μl (0.45 mmol) of 2-hydroxyethyl methacrylate purified by distillation, 13 mg (0.094 mmol) of copper (I) bromide, and 2 ml of anisole were put into a Schlenk flask. The mixture was subjected to an operation of freezing and melting three times while reducing the pressure using a vacuum pump, to degas. Nitrogen was charged into before final melting, and the mixture was melted at room temperature. Thereafter, the Schlenk flask was sealed, and heated at 70° C. for 13 hours. The reaction mass was exposed to air at room temperature, filtered using a small amount of silica gel, and concentrated under reduced pressure. The product was dispersed in a small amount of acetone, then, methanol was added thereto to precipitate, and filtration was performed under reduced pressure using a filter paper. 586 mg of the obtained white powdery solid was dried under reduced pressure.

(Production Example b3) Production of Block Copolymer by ATRP Polymerization 100 mg of the compound synthesized in Production Example b1, μl (0.094 mmol) of N,N,N',N",N"-pentamethyldiethylenetriamine (manufactured by Sigma-Aldrich Co. LLC.), 0.79 ml (4.68 mmol) of benzyl methacrylate purified by distillation, 13 mg (0.094 mmol) of copper (I) bromide, and 2 ml of anisole were put into a Schlenk flask. The mixture was subjected to an operation of freezing and melting three times while reducing the pressure using a vacuum pump, to degas. Nitrogen was charged into before final melting, and the mixture was melted at room temperature. Thereafter, the Schlenk flask was sealed, and heated at 70° C. for 13 hours. 56 μl (0.45 mmol) of 2-hydroxyethyl methacrylate purified by distillation was added thereto, and the reaction was continued at 70° C. After 6 hours, the reaction product was cooled to room temperature, exposed to air by opening the lid, filtered using a small amount of silica gel, and concentrated under reduced pressure. The product was dispersed in a small amount of acetone, then, methanol was added thereto to precipitate, and filtration was performed under reduced pressure using a filter paper. 776 mg of the obtained white powdery solid was dried under reduced pressure.

(Production Example b4) Production of Trithiocarbonated Polyolefin-Based Terminal Branched Copolymer for Reversible Addition-Fragmentation Chain-Transfer (RAFT) Polymerization 1 g of the compound synthesized in Reference Production Example a2, 412 mg (1.13 mmol) of 2-(dodecylthiothiocarbonylthio-2-methylpropionic acid (manufactured by Sigma-Aldrich Co. LLC.), 12 mg (0.094 mmol) of N,N'-dimethylaminopyridine (manufactured by Sigma-Aldrich Co. LLC.) were put into a Schlenk flask, and the resulting product was dissolved in 5 mL of dehydrated toluene. Subsequently, 233 mg (1.13 mmol) of N,N'-dicyclohexylcarbodiimide (manufactured by Sigma-Aldrich Co. LLC.) was added thereto, followed by stirring at room temperature for 15 hours. After the reaction mixture was filtered to remove the insoluble materials, the resulting product was concentrated and dried. The mixture was dissolved in dichloromethane, and washed and liquid-liquid-separated with water, a sodium hydrogen carbonate aqueous solution, and saturated saline. The dichloromethane layer was dried over magnesium sulfate, filtered using celite, concentrated, and dried. 950 mg of a yellow amorphous crystal was obtained.

(Production Example b5) Production of Block Copolymer by RAFT Polymerization 50 mg (0.047 mmol) of a trithiocarbonate body produced in Production Example b4 was put into a Schlenk tube, and 1 mL of toluene was added thereto, followed by dissolving. Subsequently, 790 mg (3.28 mmol) of 3-bromobenzyl acrylate purified by distillation and 24 μL of an AIBN 0.2M toluene solution (manufactured by Sigma-Aldrich Co. LLC.) were added thereto. Argon gas was bubbled through the solution for 30 minutes, and the Schlenk flask was sealed. The reactant was stirred at 70 degrees for 6 and a half hours, then, cooled to 0 degrees, and exposed to air by opening. The solution was dissolved in dichloromethane, and methanol was added thereto to precipitate a polymer. An operation of separating the polymer using a centrifuge, dissolving the separated polymer in dichloromethane again, adding methanol thereto to precipitate, and separating using a centrifuge was further repeated two times. The precipitate was dried overnight (50 degrees, 100 mbar) in a reduced pressure dryer, whereby 741 mg of a yellow polymer was obtained. For the second polymerization, 740 mg of the obtained polymer was dissolved in 5 mL of toluene, and 54 μl (0.47 mmol) of 2-hydroxyethyl acrylate purified by distillation and 24 μL of an AIBN 0.2 M toluene solution (manufactured by Sigma-Aldrich Co. LLC.) were added thereto. The solution was dried overnight (50 degrees, 100 mbar) in a reduced pressure dryer, and after bubbling through the colorless polymer for 5 minutes, the Schlenk flask was sealed. The reaction mixture was stirred at 70 degrees for 1.5 hours, then, cooled to 0 degrees, and exposed to air by opening. The reaction solution was dissolved in dichloromethane, and methanol was added thereto to precipitate a polymer. An operation of separating the polymer using a centrifuge, dissolving in dichloromethane again, adding methanol thereto to precipitate, and separating using a centrifuge was further repeated two times. The precipitate was dried overnight (50 degrees, 100 mbar) in a reduced pressure dryer, whereby 768 mg of a polymer considered to be the target substance was obtained. Finally, 768 mg of the obtained polymer was dissolved in 5 ml of THF, and 7 mg (0.024 mmol) of tris(2-carboxyethyl)phosphine hydrochloride (manufactured by Sigma-Aldrich Co. LLC.) and 77 μL (0.47 mmol) of octylamine (manufactured by Sigma-Aldrich Co. LLC.) were added thereto. The reaction mass was degassed by bubbling argon gas for 15 minutes, and stirred under an argon stream. After 1 hour, 108 μl (0.94 mmol) of 2-hydroxyethyl acrylate was added thereto, and bubbling of argon gas was performed for 15 minutes, followed by stirring overnight under an argon stream. The low-boiling components were distilled off under reduced pressure, and the polymer was purified by the following method. An operation of dissolving the polymer in dichloromethane, adding methanol thereto to precipitate, and separating using a centrifuge was repeated three times. The separated polymer was dried overnight (50 degrees, 100 mbar) in a reduced pressure dryer, whereby 750 mg of a colorless polymer was obtained as a rubbery amorphous solid.

(Production Example b6) Production of Block Copolymer by RAFT Polymerization 250 mg (0.92 mmol) of 3-(benzylthiothiocarbonylthio) propionic acid (manufactured by Sigma-Aldrich Co. LLC.) was put into a Schlenk tube, and 15 mL of toluene was added thereto, followed by dissolving. Subsequently, 11.06 g (45.9 mmol) of 3-bromobenzyl acrylate purified by distillation and 450 μL of an AIBN 0.2 M toluene solution (manufactured by Sigma-Aldrich Co. LLC.) were added thereto. Argon gas was bubbled through the solution for 15 minutes, and the Schlenk flask was sealed. The reactant was stirred at 70 degrees for 4 and half hours. 1.06 ml (9.2 mmol) of 2-hydroxyethyl acrylate purified by distillation degassed by bubbling argon gas in advance was added thereto, followed by stirring at 70 degrees for 2 hours. The reaction mixture was cooled to 0 degrees, and exposed to air by opening. The reaction solution was dissolved in dichloromethane, and methanol was added thereto to precipitate a polymer. An operation of separating the polymer using a centrifuge, dissolving in dichloromethane again, adding methanol thereto to precipitate, and separating using a centrifuge was further repeated two times. The precipitate was dried overnight (50 degrees, 100 mbar) in a reduced pressure dryer, then, the dried polymer was dissolved in 50 ml of tetrahydrofuran, and 52 mg (0.18 mmol) of tris(2-carboxyethyl) phosphine hydrochloride (manufactured by Sigma-Aldrich Co. LLC.) and 1.52 mL (9.2 mmol) of octylamine (manufactured by Sigma-Aldrich Co. LLC.) were added thereto. The reaction mass was degassed by bubbling argon gas for 20 minutes, and stirred for 1 hour under an argon stream. 2.11 ml (18.4 mmol) of 2-hydroxyethyl acrylate purified by distillation degassed by bubbling argon gas in advance was added thereto, followed by stirring overnight under an argon stream. The low-boiling components were distilled off under reduced pressure using a rotary evaporator, the polymer was dissolved in dichloromethane, methanol was added thereto to precipitate, and the polymer was separated from the solvent using a centrifuge. An operation of dissolving the polymer in dichloromethane, adding methanol thereto to precipitate, and separating using a centrifuge was further repeated two times. The precipitate was dried overnight (50 degrees, 100 mbar) in a reduced pressure dryer, whereby 10.3 g of poly(3-bromobenzylacrylate)-poly(2-hydroxyethylacrylate) block copolymer BBA was obtained as a colorless rubbery polymer.

Production Example b7

It was possible to obtain a poly(3-bromobenzylacrylate)-poly(2-hydroxyethylacrylate) block copolymer BBA-2 by changing the amount of the reagents in the same manner as in Production Example b6.

Production Example b8

It was possible to obtain a poly(benzylacrylate)-poly(2-hydroxyethylacrylate) block copolymer (BA) by changing 3-bromobenzyl acrylate to benzyl acrylate in the same manner as in Production Example b6.

Production Example b9

It was possible to obtain a poly(3-bromophenethylacrylate)-poly(2-hydroxyethylacrylate) block copolymer (BPEA) by changing 3-bromobenzyl acrylate to 3-bromophenethyl acrylate in the same manner as in Production Example b6.

[Thickening Speed Measurement]

Comparative Example b1

0.25 g (5 parts by weight) of the purified polyolefin-based terminal branched copolymer (T) obtained in Reference Production Example a2 was added to 2.73 g (55 parts by weight) of a norbornene diisocyanate composition, followed by stirring for 1 hour, and 10 mg (5000 ppm) of Zelec-UN and 1.17 g (23 parts by weight) of pentaerythritol tetrakis 3-mercaptopropionic ester were added thereto, followed by stirring for 30 minutes. 1.10 g (22 parts by weight) of 4-mercaptomethyl-1,8-dimercapto-3,6-dithiaoctane was added to this solution, followed by stirring. The time of addition was set to 0 minute, and using an E type viscometer (manufactured by Brookfield AMETEK), changes in viscosity during stirring were examined. The viscosity when 30 minutes elapsed was 3649 kPa s, and the viscosity after 1 hour or longer was not measurable.

Comparative Example b2

Measurement was performed in the same manner as in Comparative Example b1 except that the amount of Zelec-UN added was increased to 40 mg (20000 ppm). The viscosity after 1 hour was 481 kPa·s, the viscosity after 2 hours was 1521 kPa·s, and this viscosity was a viscosity at which casting to a mold was difficult.

In general, it was necessary to add a tin catalyst to proceed a reaction in polymerization of thiourethane, but the thickening speed was increased even in a state at which a catalyst was not added, and resinification by adding a catalyst was difficult.

Example b1

0.15 g (5 parts by weight) of the block copolymer produced in Production Example b5 and 4.5 mg (1500 ppm) of Zelec-UN were added to 1.62 g (54 parts by weight) of a norbornene diisocyanate composition, followed by stirring for 1 hour, and 0.72 g (24 parts by weight) of pentaerythritol tetrakis 3-mercaptopropionate was added thereto, followed by stirring for 30 minutes. Subsequently, a solution obtained by dissolving 1.1 mg (350 ppm) of dibutyltin dichloride in 0.77 g (26 parts by weight) of 4-mercaptomethyl-1,8-dimercapto-3,6-dithiaoctane was added thereto, followed by stirring. The time of addition was set to 0 minute, and using an E type viscometer (DV1 viscometer manufactured by Brookfield AMETEK), changes in viscosity during stirring were examined. The viscosity after 7 hours was 78 mPa·s, and even in the case of adding a block copolymer, it was possible to secure a sufficient castable time. The results are shown in Table 4.

Examples b2 and b3

Data of changes in viscosity were obtained by performing in the same manner as in Example b1 except that the amount of catalyst was changed as described in Table 4. The results are shown in Table 4.

TABLE 4

| | Amount of catalyst DBC (ppm) | Additive amount of block copolymer (parts by weight) | Viscosity of composition (mPa · s) 1 hour | 3 hours | 5 hours | 7 hours |
|---|---|---|---|---|---|---|
| Example b1 | 350 | 5 | 42 | 53 | 67 | 78 |
| Example b2 | 700 | 5 | 53 | 92 | 153 | 234 |
| Example b3 | 1400 | 5 | 88 | 354 | 1410 | — |

Examples b4 to b6

Data of changes in viscosity were obtained in the same conditions as in Example b1 except that the block copolymer was changed to BBA produced in Production Example b6, the additive amount was increased to 8 parts by weight, and the amount of catalyst was changed. The results are shown in Table 5.

TABLE 5

| | Amount of catalyst DBC (ppm) | Additive Amount of block copolymer BBA (parts by weight) | Viscosity of composition (mPa · s) 1 hour | 3 hours | 5 hours | 7 hours |
|---|---|---|---|---|---|---|
| Example b4 | 350 | 8 | 55 | 68 | 80 | 100 |
| Example b5 | 600 | 8 | 61 | 94 | 136 | 205 |
| Example b6 | 1200 | 8 | 76 | 206 | 523 | 1346 |

From the above results, it was found that by using the block copolymer produced in Production Example b5 or b6, viscosity increase is suppressed, handling properties become excellent, and it is possible to secure a sufficient casting time compared to the inventions in the related art.

Examples b7 to b9

Data of changes in viscosity were obtained in the same conditions as in Example b1 except that the block copolymer was changed to BPEA produced in Production Example b9, the additive amount was increased to 8 parts by weight, and the amount of catalyst was changed. The results are shown in Table 6.

TABLE 6

| | Amount of catalyst DBC (ppm) | Additive Amount of block copolymer BPEA (parts by weight) | Viscosity of composition (mPa · s) 1 hour | 3 hours | 5 hours | 7 hours |
|---|---|---|---|---|---|---|
| Example b7 | 350 | 8 | 54 | 67 | 83 | 107 |
| Example b8 | 600 | 8 | 59 | 93 | 136 | 215 |
| Example b9 | 1200 | 8 | 73 | 203 | 552 | 1466 |

From the above results, it was found that by using the block copolymer produced in Production Example b9, viscosity increase is suppressed, handling properties become excellent, and it is possible to secure a sufficient casting time compared to the inventions in the related art.

[Photochromic Characteristics]

Measurement Method:

Measurement was performed by using a UV-VIS spectrometer (UV-1800 manufactured by Shimadzu Corporation) and a UV irradiation apparatus (gel imaging apparatus manufactured by ATTO Corporation). A dye was colored by irradiation with UV rays having a wavelength of 312 nm for 2 minutes using a gel imaging apparatus after UV-VIS spectrum of the resin was measured first. Spectra after 20 seconds, 2 minutes, 5 minutes, 10 minutes, and 15 minutes after irradiation were measured, and the following information was obtained from the measured spectra.

ΔT % max: the amount of changes in light transmittance at 575 nm before and after coloring F1/2: color fading half-life

Example b10

1.5 mg (500 ppm) of a naphthopyran-based photochromic dye (Reversacol Humber Blue (polydimethylsiloxane chain, naphthopyran-based chromophore), 0.15 g (5 parts by weight) of the block copolymer produced in Production Example b5, and 4.5 mg (1500 ppm) of Zelec-UN (manufactured by Stephan Company) were added to 1.62 g (54 parts by weight) of a norbornene diisocyanate composition, followed by stirring to dissolve. 0.72 g (24 parts by weight) of pentaerythritol tetrakis 3-mercaptopropionate was added to this solution, followed by stirring for 30 minutes. A mixture obtained by dissolving 1.8 mg (600 ppm) of dibutyltin dichloride (manufactured by Sigma-Aldrich Co. LLC.) in 0.77 g (26 parts by weight) of 4-mercaptomethyl-1,8-dimercapto-3,6-dithiaoctane was added to this solution, followed by stirring for 30 minutes. After being filtered through a 1 m membrane filter, while being stirred, a decompressing and degassing operation was performed using a vacuum pump. The prepared monomer was charged in a glass mold having a thickness of 2 mm, and resinification was performed by raising the temperature from room temperature to 120° C. in an oven, whereby a resin molded product was produced. The measurement results of the photochromic characteristics are shown in Table 7.

Example b11

A resin molded product was manufacture in the same manner as in Example b10 except that, as described in Table 7, the block copolymer BBA-2 produced in Production Example b7 as a block copolymer was used. The measurement results of the photochromic characteristics are shown in Table 7.

Examples b12 to b15

A resin molded product was prepared in the same manner as in Example b10 except that, as described in Table 7, the block copolymer BBA produced in Production Example b6 as a block copolymer was used, the amount of block copolymer was changed, and the type and the amount of naphthopyran-based photochromic dye were changed. The measurement results of the photochromic characteristics are shown in Table 7.

Example b16

A resin molded product was prepared in the same manner as in Example b10 except that, as described in Table 7, the block copolymer BA produced in Production Example b8 as a block copolymer was used and 700 ppm of CR-173 was added as a naphthopyran-based photochromic dye. The measurement results of the photochromic characteristics are shown in Table 7.

Examples b17 to b19

A resin molded product was prepared in the same manner as in Example b10 except that, as described in Table 7, the block copolymer BPEA produced in Production Example b9 as a block copolymer was used, the amount of block copolymer was changed, CR-173 was used as a naphthopyran-based photochromic dye, and the amount thereof was changed. The measurement results of the photochromic characteristics are shown in Table 7.

Comparative Example b3

A resin molded product was prepared in the same manner as in Example b10 except that, as described in Table 7, a block copolymer was not added. The measurement results of the photochromic characteristics are shown in Table 7.

TABLE 7

| | Type of block copolymer (parts by weight) | Photochromic dye (parts by weight) | ΔT % max (%) | F1/2 (s) |
|---|---|---|---|---|
| Example b10 | Production Example b5 (5 parts by weight) | Reversacol Humber Blue (500 ppm) | 55 | 264 |
| Example b11 | Production Example b7 (5 parts by weight) | Reversacol Humber Blue (500 ppm) | 63 | 408 |
| Example b12 | Production Example b6 (5 parts by weight) | CR-173 (700 ppm) | 39 | 192 |
| Example b13 | Production Example b6 (7 parts by weight) | CR-173 (700 ppm) | 55 | 312 |
| Example b14 | Production Example b6 (8 parts by weight) | CR-173 (800 ppm) | 60 | 300 |
| Example b15 | Production Example b6 (8 parts by weight) | Reversacol Pannie Green (500 ppm) | 62 | 408 |
| Example b16 | Production Example b8 (5 parts by weight) | CR-173 (700 ppm) | 41 | 120 |
| Example b17 | Production Example b9 (5 parts by weight) | CR-173 (700 ppm) | 45 | 180 |
| Example b18 | Production Example b9 (7 parts by weight) | CR-173 (700 ppm) | 45 | 180 |
| Example b19 | Production Example b9 (8 parts by weight) | CR-173 (800 ppm) | 58 | 210 |
| Comparative Example b3 | — | Reversacol Humber Blue (500 ppm) | 5 | — |

From the above results, it was found that the poly(thio) urethane resin molded product including a block copolymer can effectively exhibit a photochromic characteristics.

[Other Physical Properties (Mechanical Properties and the Like)]

The optical properties (refractive index, Abbe number), heat resistance, strength, and TEM analysis of the resins produced in the examples and the comparative examples were evaluated by the following test methods or analyzed in the same manner as in Example a.

Example b20

5.6 g (4 parts by weight) of the block copolymer produced in Production Example b5 and 70 mg (500 ppm) of a naphthopyran-based photochromic dye (Reversacol Humber Blue (polydimethylsiloxane chain, naphthopyran-based chromophore) were put into a 500 ml flask, and a small amount of dichloromethane was added thereto, followed by stirring to dissolve. The dichloromethane was distilled off under reduced pressure using a rotary evaporator, and 70.8 g (51 parts by weight) of a norbornene diisocyanate composition and 0.14 g (1000 ppm) of Zelec-UN (manufactured by Stephan Company) as an internal mold release agent were added thereto, followed by stirring for 30 minutes to dissolve. Next, 33.5 g (24 parts by weight) of pentaerythritol tetrakis 3-mercaptopropionate was added thereto, followed by stirring, and 35.7 g (25.5 parts by weight) of 4-mercaptomethyl-1,8-dimercapto-3,6-dithiaoctane in which 0.098 g (700 ppm) of dibutyltin dichloride had been dissolved was added thereto, followed by stirring for 1 hour. After being filtered through a 300 micron PTFE membrane filter, a decompressing and degassing operation was performed using a vacuum pump for 1 hour. The obtained photochromic composition was charged in a glass mold, and while raising the temperature from room temperature to 120° C. in an oven, heating and polymerization were performed. The mechanical properties of the obtained resin molded product were measured. The results are shown in the following Table 8.

Example b21

Figure 2:
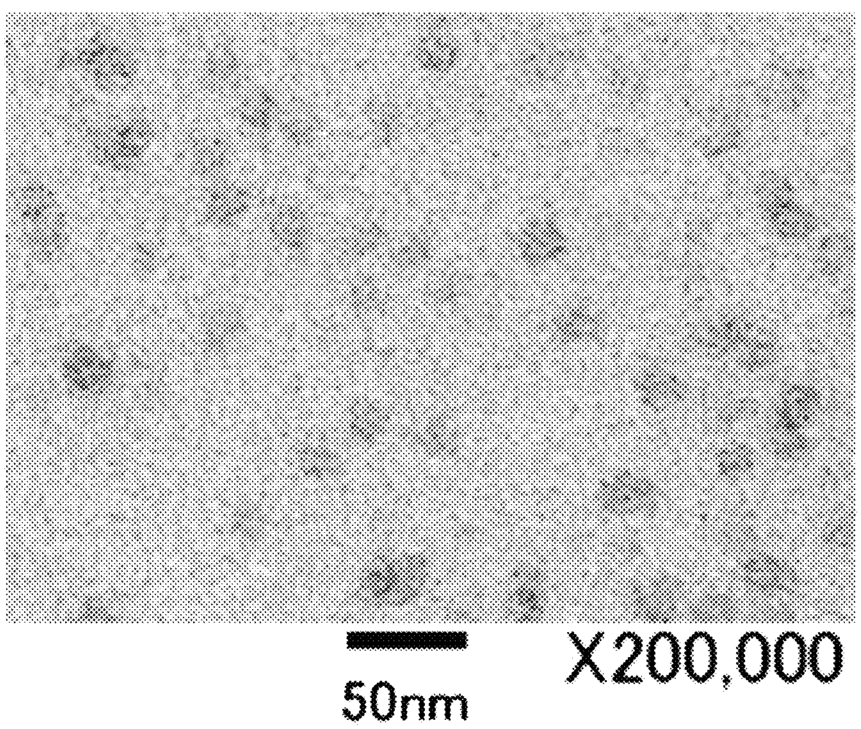
FIG. 2 is a TEM photograph of a molded product manufactured in Example b21.

A photochromic composition was prepared in the same manner as in Example b12, then, the obtained photochromic composition was charged in a glass mold, and while raising the temperature from room temperature to 120° C. in an oven, heating and polymerization were performed, whereby a resin molded product was manufactured. The mechanical properties and the like of the obtained resin molded product were measured. The results are shown in the following Table 8. In addition, the results of TEM analysis are shown in FIG. 2.

Example b22

Figure 3:
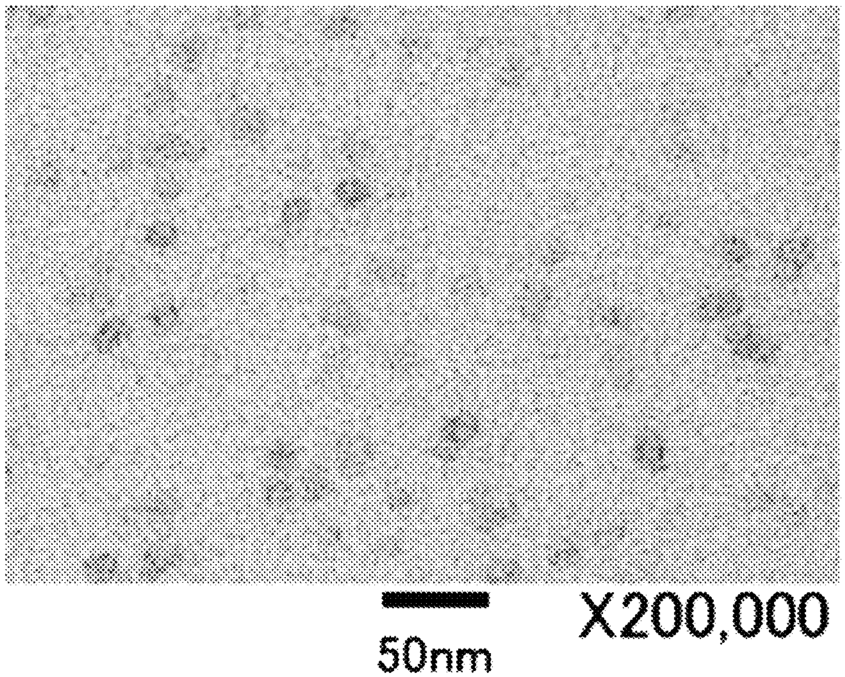
FIG. 3 is a TEM photograph of a molded product manufactured in Example b22.

A photochromic composition was prepared in the same manner as in Example b19, then, the obtained photochromic composition was charged in a glass mold, and while raising the temperature from room temperature to 120° C. in an oven, heating and polymerization were performed, whereby a resin molded product was manufactured. The mechanical properties and the like of the obtained resin molded product were measured. The results are shown in the following Table 8. In addition, the results of TEM analysis are shown in FIG. 3.

Comparative Example b4

A photochromic composition was prepared in the same manner as in Example b20 except that the block copolymer in Example b20 was changed to polyethylene glycol monomethyl ether (manufactured by Sigma-Aldrich Co. LLC.: average molecular weight of 750) and the additive amount was 15 parts by weight, and polymerization was performed, whereby a resin molded product was manufactured. The mechanical properties and the like of the obtained resin molded product were measured. The results are shown in the following Table 8.

TABLE 8

| | Refractive index (Ne) | Abbe number (νe) | Heat resistance (° C.) | Bending elastic modulus (MPa) |
|---|---|---|---|---|
| Example b20 | 1.596 | 40 | 112 | $3.1 \times 10^3$ |
| Example b21 | 1.598 | 40 | 115 | $2.4 \times 10^3$ |
| Example b22 | 1.597 | 40 | 115 | $2.8 \times 10^3$ |
| Comparative Example b4 | 1.584 | 42 | 76 | $3.4 \times 10^3$ |

From the above results, it was found that the poly(thio)urethane resin molded product including a block copolymer had improved heat resistance while maintaining the refractive index and the Abbe number. The bending elastic modulus was also within an acceptable range, and the poly(thio)urethane resin molded product was excellent in balance between heat resistance and mechanical properties. In addition, from the TEM photograph shown in FIGS. 2 and 3, it was possible to confirm a state in which particles of 50 nm or less having a microphase separation structure were uniformly dispersed in the resin.

Example c Using Polymer (Star Block Copolymer) of General Formula (3)

Synthesis Example c1

(Synthesis of Star Copolymer (T))

200 mg of dipentaerythritol hexakis(2-bromoisobutylacid) ester (manufactured by Sigma-Aldrich Co. LLC.), 10.56 ml of benzyl acrylate, 4 ml of anisole (manufactured by Sigma-Aldrich Co. LLC.), and 0.218 ml of N, N, N', N", N"-pentamethyldiethylenetriamine (manufactured by Sigma-Aldrich Co. LLC.) were put into a 50 ml Schlenk flask, followed by sealing. An operation of freezing, vacuum drying, and melting was repeated three times on the mixture. 149.6 mg of copper (I) bromide was added under a nitrogen stream in a state of being frozen in liquid nitrogen, and an operation of decompressing and nitrogen purging was repeated 3 times using a vacuum pump, whereby the residual oxygen was removed. After the Schlenk flask was returned to room temperature, the resulting product was allowed to react by heating and stirring at 70 degrees for 50 minutes while flowing nitrogen, and the reaction was stopped by cooling in an ice water bath while exposing to air. After a minimum amount of acetone was added thereto, the liquid was transferred to a 50 ml conical tube, then, methanol is added thereto until the liquid amount became 45 ml, and centrifugation was performed for 20 minutes at 12000 rpm. The supernatant was removed, then, methanol was added to the viscous high viscosity polymer again, and the resulting product was purified by centrifugation. The obtained polymer was dispersed in acetone again, and the excessive amount of copper was filtered through basic alumina or silica gel, whereby a pale yellow solution was obtained. The acetone was distilled off under reduced pressure, and methanol was added thereto to precipitate. The solvent was removed by centrifugation, and the resulting product was dried under reduced pressure while being heated to 40 degrees for 12 hours, whereby 3.8 g of a star polymer (P(BzA)) could be obtained.

(Terminal-Functionalization of Star Copolymer)

3.0 g of the star polymer (P(BzA)) synthesized by the above method was put into a 50 ml Schlenk flask, and the star polymer was dispersed by adding 10 ml of anisole (manufactured by Sigma-Aldrich Co. LLC.). 0.34 ml of N,N,N',N'',N''-pentamethyldiethylenetriamine (manufactured by Sigma-Aldrich Co. LLC.) and 1.25 ml of octenediol (manufactured by Sigma-Aldrich Co. LLC.) were added thereto, followed by sealing. This mixture was repeatedly subjected to an operation of freezing, decompressing and degassing, and melting three times, and 235 mg of copper (I) bromide and 50 mg of a copper powder were added thereto while nitrogen-purging in a state of being immersed in a liquid nitrogen bath. Sealing was performed again, and an operation of decompressing and degassing and nitrogen substitution was performed three times, whereby the residual oxygen was removed. The Schlenk flask was returned to room temperature, then, nitrogen was charged thereinto, and heating was performed at 50° C. for 12 hours while stirring. After the reaction, the reaction was stopped by exposing to air for 30 minutes while cooling in an ice water bath, and the liquid was transferred to a 50 ml conical tube using a minimum amount of THF solvent. Methanol was added thereto until the total quantity became 45 ml, and centrifugation was performed for 20 minutes at a speed of 12000 rpm. After the supernatant was removed, methanol was added to the viscous high viscosity residue, then, centrifugation was performed again to remove the solvent, and purification was performed. The obtained polymer was dispersed in a THF solvent again, and the excessive amount of copper was filtered through a DowexMarathonMSCH ion exchange resin and basic alumina or a silica gel column, whereby a pale yellow solution was obtained. The THF solution was concentrated using an evaporator, and methanol was added thereto to precipitate. The supernatant was removed after separation by centrifugal separation, and drying was performed for 12 hours using a pressure reduced oven heated to 50° C., whereby a target star poly(benzyl acrylate)-octanediol (P(BzA)$OH_{12}$) was obtained.

[Thickening Speed Measurement]

Comparative Example c1

0.25 g (5 parts by weight) of the purified polyolefin-based terminal branched copolymer (T) obtained in Reference Production Example a2 was added to 2.73 g (55 parts by weight) of a norbornene diisocyanate composition, followed by stirring for 1 hour, and 10 mg (5000 ppm) of Zelec-UN and 1.17 g (23 parts by weight) of pentaerythritol tetrakis 3-mercaptopropionic ester were added thereto, followed by stirring for 30 minutes. 1.10 g (22 parts by weight) of 4-mercaptomethyl-1,8-dimercapto-3,6-dithiaoctane was added to this solution, followed by stirring. The time of addition was set to 0 minute, and using an E type viscometer (manufactured by Brookfield AMETEK), changes in viscosity during stirring were examined.

The viscosity when 30 minutes elapsed was 3649 kPa·s, and the viscosity after 1 hour or longer was not measurable.

Comparative Example c2

Measurement was performed in the same manner as in Comparative Example c1 except that the amount of Zelec-UN added was increased to 40 mg (20000 ppm). The viscosity after 1 hour was 481 kPa·s, the viscosity after 2 hours was 1521 kPa·s, and this viscosity was a viscosity at which casting to a mold was difficult.

In general, it was necessary to add a tin catalyst to proceed a reaction in polymerization of thiourethane, but the thickening speed was increased even in a state at which a catalyst was not added, and resinification by adding a catalyst was difficult.

Example c1

0.55 g (5 parts by weight) of the purified terminal-functionalized star copolymer (P(BzA) $OH_{12}$) obtained in Synthesis Example c1 was added to 5.38 g (49 parts by weight) of a norbornene diisocyanate composition, followed by stirring for 1 hour, and 11 mg (1000 ppm) of Zelec-UN and 2.42 g (22 parts by weight) of pentaerythritol tetrakis 3-mercaptopropionate were added thereto, followed by stirring at room temperature for 30 minutes. A mixture obtained by dissolving 3.9 mg (350 ppm) of dibutyltin dichloride in 2.67 g (24 parts by weight) of 4-mercaptomethyl-1,8-dimercapto-3,6-dithiaoctane was added to this solution, followed by stirring. The time of addition was set to 0 minute, and using an E type viscometer (DV1 viscometer manufactured by Brookfield AMETEK), changes in viscosity of the polymerizable composition during stirring were examined.

The viscosity after 7 hours was 267 mPa·s, and even in the case of adding a block copolymer, it was possible to secure a sufficient castable time. The results are shown in Table 9.

Examples c2 and c3

A polymerizable composition was prepared in the same manner as in Example c1 except that the amount of catalyst was changed as shown in Table 9, and data of changes in viscosity were obtained. The results are shown in Table 9.

TABLE 9

| | Amount of catalyst DBC (ppm) | Additive Amount of star block copolymer (parts by weight) | Viscosity of composition (mPa · s) 1 hour | 3 hours | 5 hours | 7 hours |
|---|---|---|---|---|---|---|
| Example c1 | 350 | 5 | 52 | 84 | 144 | 267 |
| Example c2 | 730 | 5 | 63 | 124 | 211 | 411 |
| Example c3 | 1090 | 5 | 82 | 227 | 614 | 1803 |

From the above results, it was found that by using the star block copolymer produced in Synthesis Example c1, viscosity increase is suppressed, handling properties become excellent, and it is possible to secure a sufficient casting time compared to the inventions in the related art.

[Photochromic Characteristics]

The photochromic characteristics were measured in the same manner as in Example b.

Example c4

Firstly, 77.2 mg (700 ppm) of a naphthopyran-based photochromic dye (CR-173) and 5.52 g (5 parts by weight) of the terminal-functionalized star copolymer (P(BzA) $OH_{12}$)) were added to 53.8 g (49 parts by weight) of a norbornene diisocyanate composition, followed by stirring to dissolve. Subsequently, 0.11 g (1000 ppm) of Zelec-UN (manufactured by Stephan Company) and 24.17 g (22 parts by weight) of pentaerythritol tetrakis 3-mercaptopropionate were added to this solution, followed by stirring for 30 minutes. 26.74 g (24 parts by weight) of 4-mercaptomethyl- 1,8-dimercapto-3,6-dithiaoctane in which 39 mg (350 ppm) of dibutyltin dichloride (manufactured by Sigma-Aldrich Co. LLC.) had been dissolved was added thereto, followed by stirring for 30 minutes. After the resulting product was filtered through a 1 μm membrane filter, decompressing was performed to 133 to 400 Pa using a vacuum pump while stirring, and a decompressing and degassing operation was performed for 1 hour until foams were no longer generated. The prepared monomer was charged in a glass mold having a thickness of 2 mm, and resinification was performed by raising the temperature from room temperature to 120° C. in an oven, whereby a molded product was produced. The measurement results of the photochromic characteristics are shown in Table 10.

TABLE 10

| | Additive amount of star block copolymer (parts by weight) | Photochromic dye | ΔT % max (%) | F1/2 (s) |
|---|---|---|---|---|
| Example c4 | 5 | CR-173 | 40 | 196 |

From the above results, it was found that the poly(thio) urethane resin molded product including a star block copolymer can effectively exhibit a photochromic characteristics.

[Other Physical Properties (Mechanical Properties and the Like)]

The optical properties (refractive index, Abbe number), heat resistance, and strength of the resins produced in the examples and the comparative examples were measured in the same manner as in Example a.

Example c5

Preparation of a monomer was performed in the same manner as in Example c4, then, the obtained photochromic composition was charged in a glass mold, and while raising the temperature from room temperature to 120° C. in an oven, heating and polymerization were performed. The mechanical properties and the like of the obtained resin molded product were measured. The measurement results are shown in Table 11.

Comparative Example c3

Polymerization was performed in the same manner as in Example c4 except that the terminal-functionalized star copolymer ($P(BzA)OH^{12}$)) was changed to polyethylene glycol monomethyl ether (manufactured by Sigma-Aldrich Co. LLC.: average molecular weight of 750) and the additive amount was 15 parts by weight, whereby a resin molded product was manufactured. The mechanical properties and the like of the obtained resin molded product were measured. The measurement results are shown in Table 11.

TABLE 11

| | Refractive index (Ne) | Abbe number (ve) | Heat resistance (° C.) | Bending elastic modulus (MPa) |
|---|---|---|---|---|
| Example c5 | 1.595 | 40.5 | 113 | $1.8 \times 10^3$ |
| Comparative Example c3 | 1.584 | 42.4 | 76 | $3.4 \times 10^3$ |

From the above results, it was found that the poly(thio) urethane resin molded product including a block copolymer had improved heat resistance while maintaining the refractive index and the Abbe number. The bending elastic modulus was also within an acceptable range, and the poly(thio) urethane resin molded product was excellent in balance between heat resistance and mechanical properties.

Example d Using Polymer (Block Copolymer) of General Formula (4a)

[Thickening Speed Measurement]

Comparative Example d1

0.25 g (5 parts by weight) of the purified polyolefin-based terminal branched copolymer (T) obtained in Reference Production Example a2 was added to 2.73 g (55 parts by weight) of a norbornene diisocyanate composition, followed by stirring for 1 hour, and 10 mg (5000 ppm) of Zelec-UN and 1.17 g (23 parts by weight) of pentaerythritol tetrakis 3-mercaptopropionic ester were added thereto, followed by stirring for 30 minutes. 1.10 g (22 parts by weight) of 4-mercaptomethyl-1,8-dimercapto-3,6-dithiaoctane was added to this solution, followed by stirring. The time of addition was set to 0 minute, and using an E type viscometer (manufactured by Brookfield AMETEK), changes in viscosity during stirring were examined.

The viscosity when 30 minutes elapsed was 3649 kPa·s, and the viscosity after 1 hour or longer was not measurable.

Comparative Example d2

Measurement was performed in the same manner as in Comparative Example d1 except that the amount of Zelec-UN added was increased to 40 mg (20000 ppm). The viscosity after 1 hour was 481 kPa·s, the viscosity after 2 hours was 1521 kPa·s, and this viscosity was a viscosity at which casting to a mold was difficult.

In general, it was necessary to add a tin catalyst to proceed a reaction in polymerization of thiourethane, but the thickening speed was increased even in a state at which a catalyst was not added, and resinification by adding a catalyst was difficult.

Example d1

0.36 g (8 parts by weight) of PLURONIC F127 (manufactured by BASF Corp.) and 3.4 mg (750 ppm) of Zelec-UN (manufactured by Stephan Company) were added to 2.32 g (52 parts by weight) of a norbornene diisocyanate composition, followed by stirring for 1 hour, and 1.06 g (23 parts by weight) of pentaerythritol tetrakis 3-mercaptopropionate was added thereto, followed by stirring for minutes. 1.13 g (25 parts by weight) of 4-mercaptomethyl-1,8-dimercapto-3,6-dithiaoctane and 2.7 mg (600 ppm) of dibutyltin dichloride were added to this solution, followed by stirring. The time of addition was set to 0 minute, and using an E type viscometer (DV1 viscometer manufactured by Brookfield AMETEK), changes in viscosity during stirring were examined.

The viscosity after 7 hours was 771 mPa·s, and even in the case of adding a block copolymer, it was possible to secure a sufficient castable time. The measurement results are shown in Table 12.

Examples d2 and d3

Data of changes in viscosity were obtained in the same manner as in Example d1 except that the amount of catalyst was changed as described in Table 12. The measurement results are shown in Table 12.

TABLE 12

| | Amount of catalyst DBC (ppm) | Additive amount of block copolymer (parts by weight) | Viscosity of composition (mPa · s) | | | | |
|---|---|---|---|---|---|---|---|
| | | | 1 hour | 2.5 hours | 4 hours | 5.5 hours | 7 hours |
| Example d1 | 600 | 8 | 110 | 147 | 250 | 452 | 771 |
| Example d2 | 800 | 8 | 121 | 167 | 298 | 520 | 792 |
| Example d3 | 1200 | 8 | 140 | 212 | 347 | 662 | 1218 |

From the above results, it was found that by using the block copolymer represented by General Formula (4a), viscosity increase is suppressed, handling properties become excellent, and it is possible to secure a sufficient casting time compared to the inventions in the related art.

[Photochromic Characteristics]

The photochromic characteristics were measured in the same manner as in Example b.

Example d4

22.5 mg (500 ppm) of a naphthopyran-based photochromic dye (Reversacol Pannie Green (polydimethylsiloxane chain, naphthopyran-based chromophore), 3.6 g (8 parts by weight) of PLURONIC F127 (manufactured by BASF Corp.), and 33.8 mg (750 ppm) of Zelec-UN (manufactured by Stephan Company) were added to 23.19 g (52 parts by weight) of a norbornene diisocyanate composition, followed by stirring to dissolve at 70° C. for 1 hour. Subsequently, 10.55 g (23 parts by weight) of pentaerythritol tetrakis 3-mercaptopropionate was added to this solution, followed by stirring for 30 minutes. After the resulting product was cooled to room temperature, 11.26 g (25 parts by weight) of 4-mercaptomethyl-1,8-dimercapto-3,6-dithiaoctane in which 27 mg (600 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 30 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven, whereby a molded product was produced. The measurement results of the photochromic characteristics are shown in Table 13.

Examples d5 to d7

A resin molded product was prepared in the same manner as in Example d4 except that, as shown in Table 13, the type and the amount of naphthopyran-based photochromic dye were changed. The measurement results of the photochromic characteristics are shown in Table 13. In Table 13, CR-49 and CR-173 are naphthopyran-based photochromic dyes.

TABLE 13

| | Photochromic dye | Additive amount of dye (ppm) | ΔT % max (%) | F1/2 (s) |
|---|---|---|---|---|
| Example d4 | Reversacol Pannie Green | 500 | 63 | 53 |
| Example d5 | CR-49 | 800 | 44 | 120 |
| Example d6 | CR-173 | 500 | 50 | 54 |
| Example d7 | CR-173 | 800 | 47 | 54 |

From the above results, it was found that the poly(thio) urethane resin molded product including a block copolymer can effectively exhibit a photochromic characteristics.

[Other Physical Properties (Mechanical Properties and the Like)]

The optical properties (refractive index, Abbe number), heat resistance, strength, and TEM analysis of the resins produced in the examples and the comparative examples were measured or analyzed in the same manner as in Example a.

Example d8

Figure 4:
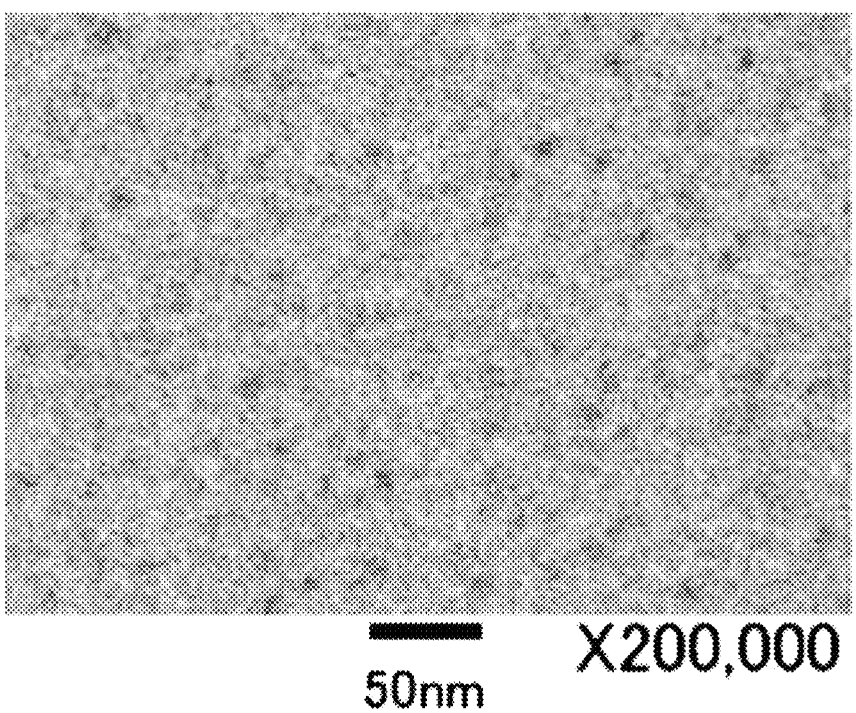
FIG. 4 is a TEM photograph of a molded product manufactured in Example d8.

Preparation of a monomer was performed in the same manner as in Example d7, then, the obtained photochromic composition was charged in a glass mold, and while raising the temperature from room temperature to 120° C. in an oven, heating and polymerization were performed. The mechanical properties and the like of the obtained resin molded product were measured. The measurement results are shown in Table 14. In addition, the results of TEM analysis are shown in FIG. 4.

Comparative Example d3

Polymerization was performed in the same manner as in Example d8 except that the PLURONIC F127 (manufactured by BASF Corp.) was changed to polyethylene glycol monomethyl ether (manufactured by Sigma-Aldrich Co. LLC.: average molecular weight of 750) and the additive amount was 15 parts by weight, whereby a resin molded product was manufactured. The mechanical properties and the like of the obtained resin molded product were measured. The measurement results are shown in the following Table 14.

TABLE 14

| | Refractive index (Ne) | Abbe number (νe) | Heat resistance (° C.) | Bending elastic modulus (MPa) |
|---|---|---|---|---|
| Example d8 | 1.588 | 42 | 108 | $2.4 \times 10^3$ |
| Comparative Example d3 | 1.584 | 42 | 76 | $3.4 \times 10^3$ |

From the above results, it was found that the poly(thio) urethane resin molded product including a block copolymer had improved heat resistance while maintaining the refractive index and the Abbe number. The bending elastic modulus was also within an acceptable range, and the poly(thio) urethane resin molded product was excellent in balance between heat resistance and mechanical properties. In addition, from the TEM photograph shown in FIG. 4, it was possible to confirm a state in which particles of 50 nm or less having a microphase separation structure were uniformly dispersed in the resin.

[Photochromic Characteristics]

The photochromic characteristics were measured in the same manner as in Example b.

Example d9

36 mg (800 ppm) of a naphthopyran-based photochromic dye (CR-173), 3.6 g (8 parts by weight) of PLURONIC PE4300 (manufactured by BASF Corp.), and 33.8 mg (750 ppm) of Zelec-UN (manufactured by Stephan Company) were added to 23.19 g (52 parts by weight) of a norbornene diisocyanate composition, followed by stirring for dissolution using a stirring apparatus. Subsequently, 10.55 g (23 parts by weight) of pentaerythritol tetrakis 3-mercaptopropionate was added to this solution, followed by stirring for 30 minutes. 11.26 g (25 parts by weight) of 4-mercaptomethyl-1,8-dimercapto-3,6-dithiaoctane in which 27 mg (600 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 30 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven to prepare a molded product. This block copolymer-added composition was able to be cast into a mold without having a rapid increase in viscosity in the middle of the process.

The kind and additive amount of the block copolymer and dye are shown in Table 15, and the measurement result of the photochromic characteristics is shown in Table 16.

Examples d10 to d51

Molded products were prepared under the same conditions as in Example d9, except that the kind and additive amount of the block copolymer and the dye were changed to the components and amounts added shown in Table 15. The compositions to which these block copolymers were added were able to be cast into a mold without having a rapid increase in viscosity in the middle of the process. The measurement results of the photochromic characteristics are shown in Table 16.

TABLE 15

| | Block Copolymer Component | | | Dye Component | |
|---|---|---|---|---|---|
| | Product Name | Manufacturer | Additive Amount (parts by weight) | Dye Name | Additive Amount (ppm) |
| Example d9 | Pluronic PE4300 | BASF | 8 | CR-173 | 800 |
| Example d10 | Pluronic PE4300 | BASF | 12 | CR-173 | 800 |
| Example d11 | Pluronic PE6100 | BASF | 8 | CR-173 | 800 |
| Example d12 | Pluronic PE6200 | BASF | 8 | CR-173 | 800 |
| Example d13 | Pluronic PE8100 | BASF | 8 | CR-173 | 800 |
| Example d14 | Pluronic PE9200 | BASF | 8 | CR-173 | 800 |
| Example d15 | Pluronic PE10100 | BASF | 8 | CR-173 | 800 |
| Example d16 | Pluronic PE10400 | BASF | 8 | CR-173 | 800 |
| Example d17 | Pluronic PE10500 | BASF | 8 | CR-173 | 800 |
| Example d18 | Pluronic RPE3110 | BASF | 8 | CR-173 | 800 |
| Example d19 | Pluronic RPE2520 | BASF | 8 | CR-173 | 800 |
| Example d20 | Pluronic RPE1050 | BASF | 8 | CR-173 | 800 |
| Example d21 | Pluronic RPE1720 | BASF | 8 | CR-173 | 800 |
| Example d22 | Pluronic RPE1740 | BASF | 8 | CR-173 | 800 |
| Example d23 | Pluronic RPE1740 | BASF | 12 | CR-173 | 800 |
| Example d24 | Pluronic F38 | BASF | 8 | CR-173 | 800 |
| Example ct25 | Pluronic F77 | BASF | 8 | CR-173 | 800 |
| Example d26 | Pluronic F87 | BASF | 8 | CR-173 | 800 |
| Example d27 | Pluronic P65 | BASF | 8 | CR-173 | 800 |
| Example d28 | Pluronic P85 | BASF | 8 | CR-173 | 800 |
| Example d29 | Pluronic 25R4 | BASF | 8 | CR-173 | 800 |
| Example d30 | Pluronic L35 | Aldrich | 8 | CR-173 | 800 |
| Example d31 | Pluronic L64 | Aldrich | 5 | CR-173 | 800 |
| Example d32 | Pluronic L64 | Aldrich | 8 | CR-173 | 800 |
| Example d33 | Pluronic L64 | Aldrich | 10 | CR-173 | 800 |
| Example d34 | Pluronic L64 | Aldrich | 2 | Reversacol Wembley Grey | 684 |
| | | | | Reversacol Heath Green | 376 |

TABLE 15-continued

| | Block Copolymer Component | | | Dye Component | |
|---|---|---|---|---|---|
| | Product Name | Manufacturer | Additive Amount (parts by weight) | Dye Name | Additive Amount (ppm) |
| Example d35 | Pluronic L64 | Aldrich | 4 | Reversacol Wembley Grey | 684 |
| | | | | Reversacol Heath Green | 376 |
| Example d36 | Pluronic L64 | Aldrich | 4 | Reversacol Wembley Grey | 342 |
| | | | | Reversacol Heath Green | 188 |
| Example d37 | Pluronic L64 | Aldrich | 8 | Reversacol Wembley Grey | 684 |
| | | | | Reversacol Heath Green | 376 |
| Example d38 | Pluronic L121 | Aldrich | 8 | CR-173 | 800 |
| Example d39 | Pluronic P123 | Aldrich | 8 | CR-173 | 800 |
| Example d40 | Pluronic F68 | Aldrich | 8 | CR-173 | 800 |
| Example d41 | Synperonic F108 | Aldrich | 8 | CR-173 | 800 |
| Example d42 | Synperonic PE/P84 | Aldrich | 8 | CR-173 | 800 |
| Example d43 | Pluronic L44 | Spectrum | 8 | CR-173 | 800 |
| Example d44 | Adeka Pluronic L31 | Adeka | 8 | CR-173 | 800 |
| Example d45 | Adeka Pluronic L44 | Adeka | 8 | CR-173 | 800 |
| Example d46 | Adeka Pluronic L61 | Adeka | 8 | CR-173 | 800 |
| Example d47 | Adeka Pluronic L62 | Adeka | 8 | CR-173 | 800 |
| Example d48 | Adeka Pluronic L71 | Adeka | 8 | CR-173 | 800 |
| Example d49 | Adeka Pluronic L72 | Adeka | 8 | CR-173 | 800 |
| Example d50 | Adeka Pluronic L101 | Adeka | 8 | CR-173 | 800 |
| Example d51 | Adeka Pluronic L102 | Adeka | 8 | CR-173 | 800 |

TABLE 16

| | ΔT % max (%) | F1/2 (s) |
|---|---|---|
| Example d9 | 52 | 300 |
| Example d10 | 64 | 180 |
| Example d12 | 51 | 109 |
| Example d16 | 52 | 89 |
| Example d17 | 50 | 91 |
| Example d20 | 27 | 600 |
| Example d22 | 49 | 420 |
| Example d23 | 58 | 240 |
| Example d30 | 50 | 600 |
| Example d31 | 52 | 101 |
| Example d32 | 56 | 93 |
| Example d33 | 55 | 91 |
| Example d34 | 70 | 80 |
| Example d35 | 73 | 82 |
| Example d36 | 67 | 75 |
| Example d37 | 75 | 78 |
| Example d42 | 56 | 96 |

From the above results, it was found that the poly(thio) urethane resin molded product including a block copolymer can effectively exhibit a photochromic characteristics.

Example d52

30.8 mg (684 ppm) of Reversacol Wembley Grey (manufactured by Vivimed) and 16.9 mg (376 ppm) of Reversacol Heath Green (manufactured by Vivimed) as photochromic compounds, 3.6 g (8 parts by weight) of Pluronic L64 (manufactured by Sigma-Aldrich Co. LLC.), and 45 mg (1000 ppm) of Zelec-UN (manufactured by Stefan) were added to 23.4 g (52 parts by weight) of metaxylylene diisocyanate, followed by stirring for dissolution using a stirring apparatus. Subsequently, 21.6 g (48 parts by weight) of 4-mercaptomethyl-1,8-dimercapto-3,6-dithiaoctane in which 7 mg (150 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 30 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven, whereby a molded product was produced. This block copolymer-added composition was able to be cast into a mold without having a rapid increase in viscosity in the middle of the process.

The measurement of the photochromic characteristics of the obtained resins was carried out. The result is shown in Table 17.

TABLE 17

| | ΔT % max (%) | F1/2 (s) |
|---|---|---|
| Example d52 | 74 | 86 |

From the above results, it was found that the poly(thio) urethane resin molded product including a block copolymer can effectively exhibit a photochromic characteristics.

Example d53

30.8 mg (684 ppm) of Reversacol Wembley Grey (manufactured by Vivimed) and 16.7 mg (376 ppm) of Reversacol Heath Green (manufactured by Vivimed) as photochromic compounds, 1.0 g (2 parts by weight) of Pluronic PE4300 (manufactured by BASF Corp.), and 150 mg (3000 ppm) of butoxyethyl acid phosphate were added to 20.35 g (40.7 parts by weight) of metaxylylene diisocyanate, followed by stirring for dissolution using a stirring apparatus. Subsequently, 24.65 g (49.3 parts by weight) of a composition containing 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 5.5 mg (110 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 40 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven to prepare a molded product. This block copolymer-added composition was able to be cast into a mold without having a rapid increase in viscosity in the middle of the process.

The kind and additive amount of block copolymer and dye are shown in Table 18, and the measurement result of the photochromic characteristics is shown in Table 20.

Examples d54 to d91

Resins were prepared under the same conditions as in Example d53, except that the kind and additive amount of the block copolymer and the dye were changed to the components and amounts added shown in Table 18 or Table 19. The compositions to which these block copolymers were added were able to be cast into a mold without having a rapid increase in viscosity in the middle of the process. The measurement results of the photochromic characteristics are shown in Table 20.

TABLE 18

| | Block Copolymer Component | | | Dye Component | |
|---|---|---|---|---|---|
| | Product Name | Manufacturer | Additive Amount (parts by weight) | Dye Name | Additive Amount (ppm) |
| Example d53 | Pluronic PE4300 | BASF | 2 | Reversacol Wembley Grey | 684 |
| | | | | Reversacol Heath Green | 376 |
| Example d54 | Pluronic PE6100 | BASF | 2 | ReversacolWembley Grey | 684 |
| | | | | Reversacol Heath Green | 376 |
| Example d55 | Pluronic PE6200 | BASF | 2 | Reversacol Wembley Grey | 547 |
| | | | | Reversacol Heath Green | 298 |
| Example d56 | Pluronic PE8100 | BASF | 2 | Reversacol Wembley Grey | 684 |
| | | | | Reversacol Heath Green | 376 |
| Example d57 | Pluronic PE9200 | BASF | 2 | Reversacol Wembley Grey | 684 |
| | | | | Reversacol Heath Green | 376 |
| Example d58 | Pluronic PE10100 | BASF | 2 | Reversacol Wembley Grey | 684 |
| | | | | Reversacol Heath Green | 376 |
| Example d59 | Pluronic PE10400 | BASF | 2 | Reversacol Wembley Grey | 684 |
| | | | | Reversacol Heath Green | 376 |
| Example d60 | Pluronic PE10500 | BASF | 2 | Reversacol Wembley Grey | 684 |
| | | | | Reversacol Heath Green | 376 |
| Example d61 | Pluronic RPE3110 | BASF | 2 | Reversacol Wembley Grey | 684 |
| | | | | Reversacol Heath Green | 376 |
| Example d62 | Pluronic RPE2520 | BASF | 2 | Reversacol Wembley Grey | 684 |
| | | | | Reversacol Heath Green | 376 |
| Example d63 | Pluronic RPE1050 | BASF | 2 | Reversacol Wembley Grey | 684 |
| | | | | Reversacol Heath Green | 376 |
| Example d64 | Pluronic RPE1720 | BASF | 2 | Reversacol Wembley Grey | 547 |
| | | | | Reversacol Heath Green | 298 |
| Example d65 | Pluronic RPE1740 | BASF | 2 | Reversacol Wembley Grey | 684 |
| | | | | Reversacol Heath Green | 376 |
| Example d66 | Pluronic F38 | BASF | 2 | Reversacol Wembley Grey | 684 |
| | | | | Reversacol Heath Green | 376 |
| Example d67 | Pluronic F77 | BASF | 2 | Reversacol Wembley Grey | 684 |
| | | | | Reversacol Heath Green | 376 |
| Example d68 | Pluronic F87 | BASF | 2 | Reversacol Wembley Grey | 684 |
| | | | | Reversacol Heath Green | 376 |
| Example d69 | Pluronic P65 | BASF | 2 | Reversacol Wembley Grey | 547 |
| | | | | Reversacol Heath Green | 298 |
| Example d70 | Pluronic P65 | BASF | 3 | Reversacol Wembley Grey | 547 |
| | | | | Reversacol Heath Green | 298 |
| Example d71 | Pluronic P85 | BASF | 2 | Reversacol Wembley Grey | 684 |
| | | | | Reversacol Heath Green | 376 |
| Example d72 | Pluronic 25R4 | BASF | 2 | Reversacol Wembley Grey | 547 |
| | | | | Reversacol Heath Green | 298 |
| Example d73 | Pluronic L35 | Aldrich | 2 | Reversacol Wembley Grey | 684 |
| | | | | Reversacol Heath Green | 376 |
| Example d74 | Pluronic L64 | Aldrich | 8 | Reversacol Wembley Grey | 684 |
| | | | | Reversacol Heath Green | 376 |

TABLE 18-continued

| | Block Copolymer Component | | | Dye Component | |
|---|---|---|---|---|---|
| | Product Name | Manufacturer | Additive Amount (parts by weight) | Dye Name | Additive Amount (ppm) |
| Example d75 | Pluronic L64 | Aldrich | 3 | Reversacol Wembley Grey | 547 |
| | | | | Reversacol Heath Green | 298 |
| Example d76 | Pluronic L64 | Aldrich | 2 | Reversacol Wembley Grey | 547 |
| | | | | Reversacol Heath Green | 298 |

TABLE 19

| | Block Copolymer Component | | | Dye Component | |
|---|---|---|---|---|---|
| | Product Name | Manufacturer | Additive Amount (Parts by weight) | Dye Name | Additive Amount (ppm) |
| Example d77 | Pluronic L64 | Aldrich | 2 | Reversacol Wembley Grey | 479 |
| | | | | Reversacol Heath Green | 260 |
| Example d78 | Pluronic L121 | Aldrich | 2 | Reversacol Wembley Grey | 684 |
| | | | | Reversacol Heath Green | 376 |
| Example d79 | Pluronic P123 | Aldrich | 2 | Reversacol Wembley Grey | 684 |
| | | | | Reversacol Heath Green | 376 |
| Example d80 | Pluronic F68 | Aldrich | 2 | Reversacol Wembley Grey | 547 |
| | | | | Reversacol Heath Green | 298 |
| Example d81 | Synperonic F108 | Aldrich | 2 | Reversacol Wembley Grey | 684 |
| | | | | Reversacol Heath Green | 376 |
| Example d82 | Synperonic PE/P84 | Aldrich | 2 | Reversacol Wembley Grey | 684 |
| | | | | Reversacol Heath Green | 376 |
| Example d83 | Pluronic L44 | Spectrum | 2 | Reversacol Wembley Grey | 684 |
| | | | | Reversacol Heath Green | 376 |
| Example d84 | Adeka Pluronic L31 | Adeka | 2 | Reversacol Wembley Grey | 684 |
| | | | | Reversacol Heath Green | 376 |
| Example d85 | Adeka Pluronic L44 | Adeka | 2 | Reversacol Wembley Grey | 684 |
| | | | | Reversacol Heath Green | 376 |
| Example d86 | Adeka Pluronic L61 | Adeka | 2 | Reversacol Wembley Grey | 547 |
| | | | | Reversacol Heath Green | 298 |
| Example d87 | Adeka Pluronic L62 | Adeka | 2 | Reversacol Wembley Grey | 547 |
| | | | | Reversacol Heath Green | 298 |
| Example d88 | Adeka Pluronic L71 | Adeka | 2 | Reversacol Wembley Grey | 684 |
| | | | | Reversacol Heath Green | 376 |
| Example d89 | Adeka Pluronic L72 | Adeka | 2 | Reversacol Wembley Grey | 547 |
| | | | | Reversacol Heath Green | 298 |
| Example d90 | Adeka Pluronic L101 | Adeka | 2 | Reversacol Wembley Grey | 684 |
| | | | | Reversacol Heath Green | 376 |
| Example d91 | Adeka Pluronic L121 | Adeka | 2 | Reversacol Wembley Grey | 684 |
| | | | | Reversacol Heath Green | 376 |

TABLE 20

| | ΔT % max (%) | F1/2 (s) |
|---|---|---|
| Example d53 | 56 | 156 |
| Example d55 | 63 | 93 |
| Example d60 | 76 | 144 |
| Example d63 | 55 | 210 |
| Example d64 | 60 | 104 |
| Example d65 | 66 | 192 |
| Example d66 | 44 | 228 |
| Example d67 | 76 | 180 |
| Example d68 | 75 | 180 |
| Example d69 | 78 | 198 |
| Example d70 | 69 | 144 |
| Example d71 | 78 | 156 |
| Example d72 | 65 | 113 |
| Example d73 | 67 | 276 |
| Example d74 | 74 | 83 |

TABLE 20-continued

| | ΔT % max (%) | F1/2 (s) |
|---|---|---|
| Example d75 | 70 | 107 |
| Example d76 | 79 | 186 |
| Example d77 | 62 | 119 |
| Example d80 | 66 | 258 |
| Example d81 | 80 | 186 |
| Example d83 | 72 | 222 |
| Example d86 | 31 | 96 |
| Example d87 | 73 | 168 |
| Example d89 | 75 | 96 |

[Other Physical Properties (Mechanical Properties and the Like)]

The optical properties (refractive index, Abbe number), heat resistance, strength, and TEM analysis of the resins produced in the examples and the comparative examples were measured or analyzed in the same manner as in Example a.

Example d92

Figure 5:
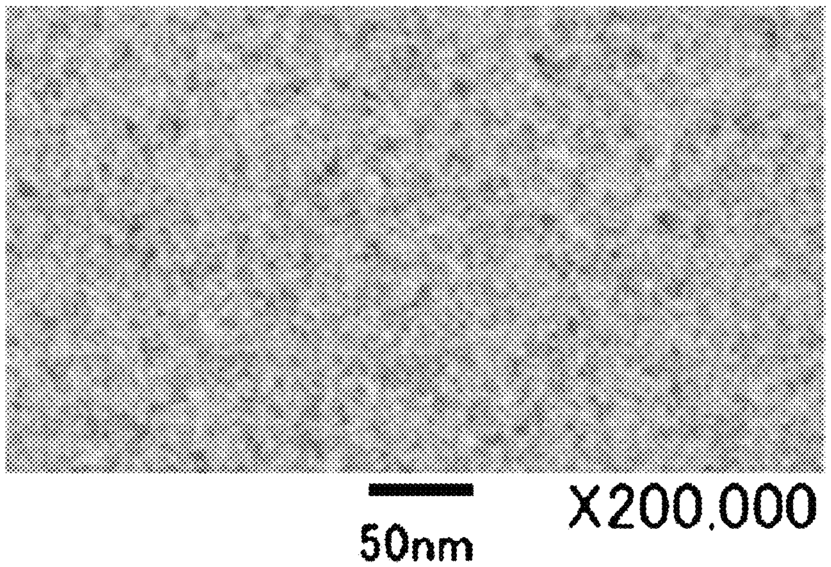
FIG. 5 is a TEM photograph of a molded product manufactured in Example d92.

Preparation of a monomer was performed in the same manner as in Example d32, then, the obtained photochromic composition was charged in a glass mold, and while raising the temperature from room temperature to 120° C. in an oven, heating and polymerization were performed. The TEM analysis of the obtained resin molded product was conducted. The results of TEM analysis is shown in FIG. 5.

Example d93

Preparation of a monomer was performed in the same manner as in Example d34, then, the obtained photochromic composition was charged in a glass mold, and while raising the temperature from room temperature to 120° C. in an oven, heating and polymerization were performed. The optical properties and heat resistance of the obtained resin molded product were measured. The measurement results are shown in Table 21.

Example d94

Preparation of a monomer was performed in the same manner as in Example d35, then, the obtained photochromic composition was charged in a glass mold, and while raising the temperature from room temperature to 120° C. in an oven, heating and polymerization were performed. The optical properties and heat resistance of the obtained resin molded product were measured. The measurement results are shown in Table 21.

Example d95

Preparation of a monomer was performed in the same manner as in Example d37, then, the obtained photochromic composition was charged in a glass mold, and while raising the temperature from room temperature to 120° C. in an oven, heating and polymerization were performed. The optical properties and heat resistance of the obtained resin molded product were measured. The measurement results are shown in Table 21.

Example d96

Preparation of a monomer was performed in the same manner as in Example d52, then, the obtained photochromic composition was charged in a glass mold, and while raising the temperature from room temperature to 120° C. in an oven, heating and polymerization were performed. The optical properties and heat resistance of the obtained resin molded product were measured. The measurement results are shown in Table 21.

Example d97

Preparation of a monomer was performed in the same manner as in Example d74, then, the obtained photochromic composition was charged in a glass mold, and while raising the temperature from room temperature to 120° C. in an oven, heating and polymerization were performed. The optical properties and heat resistance of the obtained resin molded product were measured. The measurement results are shown in Table 21.

TABLE 21

| | Refractive index (Ne) | Abbe Number (νe) | Heat resistance (° C.) |
|---|---|---|---|
| Example d93 | 1.594 | 41 | 110 |
| Example d94 | 1.592 | 41 | 109 |
| Example d95 | 1.586 | 42 | 105 |
| Example d96 | 1.647 | 32 | 81 |
| Example d97 | 1.650 | 33 | 93 |

From the above results, it was found that the poly(thio) urethane resin molded product including a block copolymer had improved heat resistance while maintaining the refractive index and the Abbe number. The bending elastic modulus was also within an acceptable range, and the poly(thio) urethane resin molded product was excellent in balance between heat resistance and mechanical properties. In addition, from the TEM photograph shown in FIG. 5, it was possible to confirm a state in which particles of 50 nm or less having a microphase separation structure were uniformly dispersed in the resin.

Example e Using One or Two or More of Polymer (Block Copolymer) of General Formula (4a)

[Photochromic Characteristics]
Measurement Method:

Measurement was performed by using a UV-VIS spectrometer (UV-1800 manufactured by Shimadzu Corporation) and a UV irradiation apparatus (gel imaging apparatus manufactured by ATTO Corporation). A dye was colored by irradiation with UV rays having a wavelength of 312 nm for 2 minutes using a gel imaging apparatus after UV-VIS spectrum of the resin was measured first. Spectra after 20 seconds, 2 minutes, 5 minutes, 10 minutes, and 15 minutes after irradiation were measured, and the following information was obtained from the measured spectra.

ΔT % max: the amount of changes in light transmittance at 575 nm before and after coloring F1/2: color fading half-life Example e1

24.6 mg (547 ppm) of Reversacol Wembley Grey (manufactured by Vivimed) and 13.3 mg (300 ppm) of Reversacol Heath Green (manufactured by Vivimed) as photochromic compounds, 0.75 g (1.5 parts by weight) of Pluronic L64 (manufactured by BASF Corp.), 0.25 g (0.5 parts by weight) of Pluronic P65 (manufactured by BASF Corp.), and 150 mg (3000 ppm) of butoxyethyl acid phosphate were added to 20.35 g (40.7 parts by weight) of metaxylylene diisocyanate, followed by stirring for dissolution using a stirring apparatus. Subsequently, 24.65 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 5.5 mg (110 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 40 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven to prepare a molded product. This block copolymer-added composition was able to be cast into a mold without having a rapid increase in viscosity in the middle of the process.

The kind and additive amount of block copolymer and the measurement results of photochromic characteristics are shown in Table 22.

Examples e2 to e22

Molded products were prepared under the same conditions as in Example e1, except that the kind and additive amount of the block copolymer and the dye were changed to those of the components and amounts added shown in Table 22. The compositions to which these block copolymers were added were able to be cast into a mold without having a rapid increase in viscosity in the middle of the process. The measurement results of the photochromic characteristics are shown in Table 22.

TABLE 22

| | Block Copolymer Component | | Additive | Photochromic Characteristics | |
|---|---|---|---|---|---|
| | Product Name | Manufacturer | Amount (Parts by weight) | ΔT % max (%) | F1/2 (s) |
| Example e1 | Pluronic L64 | Aldrich | 1.5 | 75 | 150 |
| | Pluronic P65 | BASF | 0.5 | | |
| Example a2 | Pluronic L64 | Aldrich | 1.0 | 76 | 162 |
| | Pluronic P65 | BASF | 1.0 | | |
| Example e3 | Pluronic L64 | Aldrich | 0.5 | 78 | 192 |
| | Pluronic P65 | BASF | 1.5 | | |
| Example e4 | Pluronic L64 | Aldrich | 1.0 | 75 | 162 |
| | Pluronic F68 | | 1.0 | | |
| Example e5 | Pluronic L64 | Aldrich | 1.5 | 74 | 144 |
| | Pluronic F68 | | 0.5 | | |
| Example e6 | Pluronic L61 | Adeka | 1.0 | 74 | 114 |
| | Pluronic P65 | BASF | 1.0 | | |
| Example e7 | Pluronic L61 | Adeka | 0.5 | 77 | 144 |
| | Pluronic P65 | BASF | 1.5 | | |
| Example e8 | Pluronic L72 | Adeka | 1.0 | 67 | 90 |
| | Pluronic P65 | BASF | 1.0 | | |
| Example e9 | Pluronic L72 | Adeka | 0.5 | 74 | 96 |
| | Pluronic P65 | BASF | 1.5 | | |
| Example e10 | Pluronic L72 | Adeka | 0.2 | 76 | 168 |
| | Pluronic P65 | BASF | 1.8 | | |
| Example e11 | Poloxamer 182 | Spectrum | 1.0 | 74 | 126 |
| | Pluronic P65 | BASF | 1.0 | | |
| Example e12 | Poloxamer 184 | Spectrum | 1.0 | 74 | 132 |
| | Pluronic P65 | BASF | 1.0 | | |
| Example e13 | Poloxamer 184 | Spectrum | 1.5 | 74 | 126 |
| | Pluronic P65 | BASF | 0.5 | | |
| Example e14 | Poloxamer 184 | Spectrum | 1.0 | 77 | 144 |
| | Pluronic F68 | Aldrich | 1.0 | | |
| Example e15 | Pluronic L64 | Spectrum | 1.5 | 76 | 144 |
| | Pluronic F68 | Aldrich | 0.5 | | |
| Example e16 | Pluronic L64 | Aldrich | 2 | 79 | 186 |
| Example e17 | Pluronic P65 | BASF | 2 | 78 | 198 |
| Example e18 | Pluronic F68 | Aldrich | 2 | 66 | 258 |

TABLE 22-continued

| | Block Copolymer Component | | Additive | Photochromic Characteristics | |
|---|---|---|---|---|---|
| | Product Name | Manufacturer | Amount (Parts by weight) | ΔT % max (%) | F1/2 (s) |
| Example e19 | Pluronic L61 | Adeka | 2 | 31 | 96 |
| Example e20 | Pluronic L72 | Adeka | 2 | 75 | 96 |
| Example e21 | Poloxamer 182 | Spectrum | 2 | 76 | 102 |
| Example e22 | Poloxamer 184 | Spectrum | 2 | 78 | 156 |

FIGS. 6 to 12 show graphs plotting the relationship between the block copolymer addition rate and the decoloring rate F1/2 based on the results of Examples e1 to e22. As shown in FIGS. 6 to 12, faster decoloring rate was observed in the case using two block copolymers than that in the case using one block copolymer.

Table 23 shows the numbers of Examples plotted in the graphs of the respective figures.

TABLE 23

Figure 6:
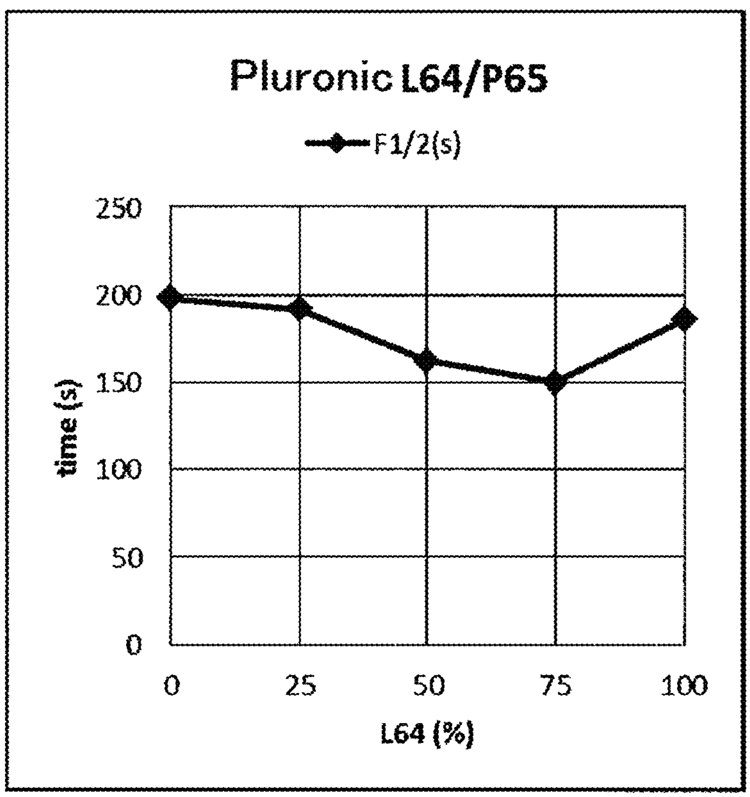
FIG. 6 is a graph plotting the relationship between the block copolymer addition rate and the decoloring rate F1/2 based on the results of Examples e1, e2, e3, e16, and e17.
Figure 7:
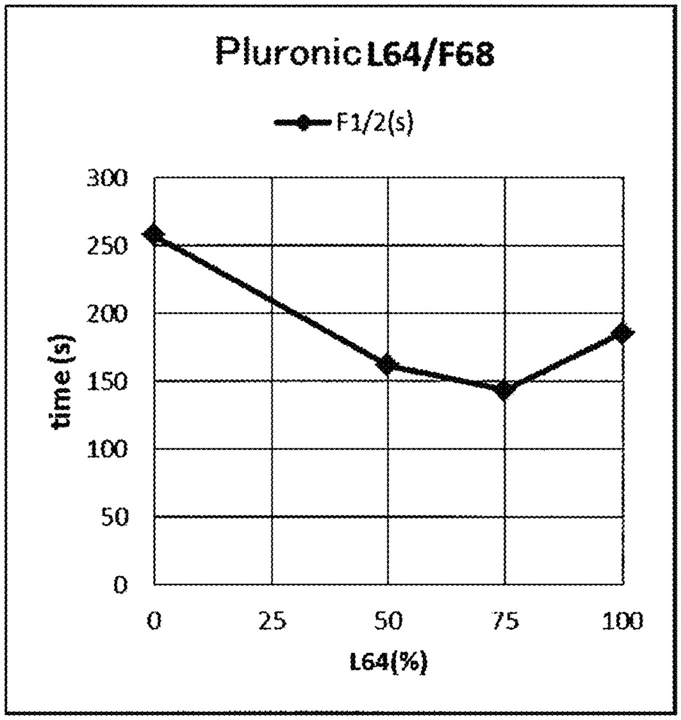
FIG. 7 is a graph plotting the relationship between the block copolymer addition rate and the decoloring rate F1/2 based on the results of Examples e4, e5, e16, and e18.
Figure 8:
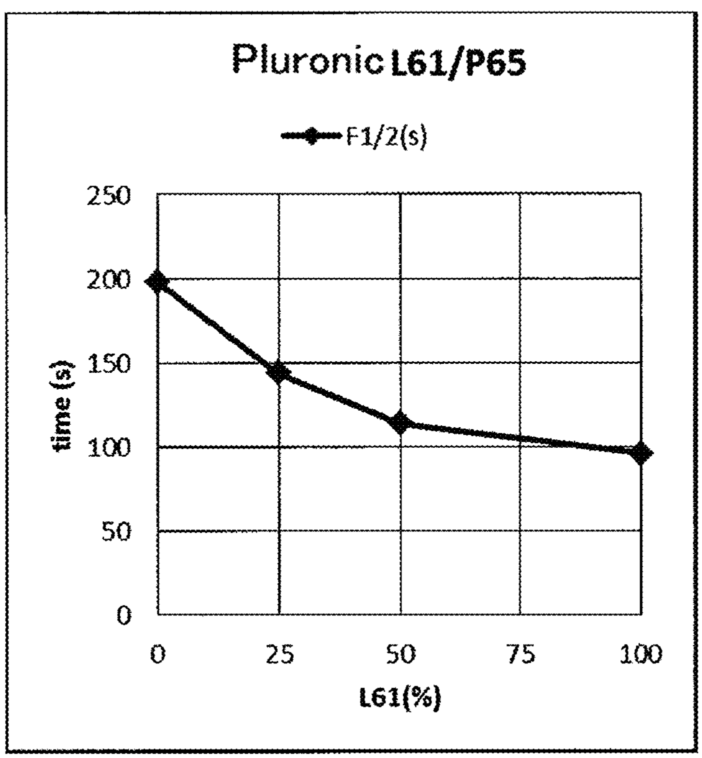
FIG. 8 is a graph plotting the relationship between the block copolymer addition rate and the decoloring rate F1/2 based on the results of Examples e6, e7, e17, and e19.
Figure 9:
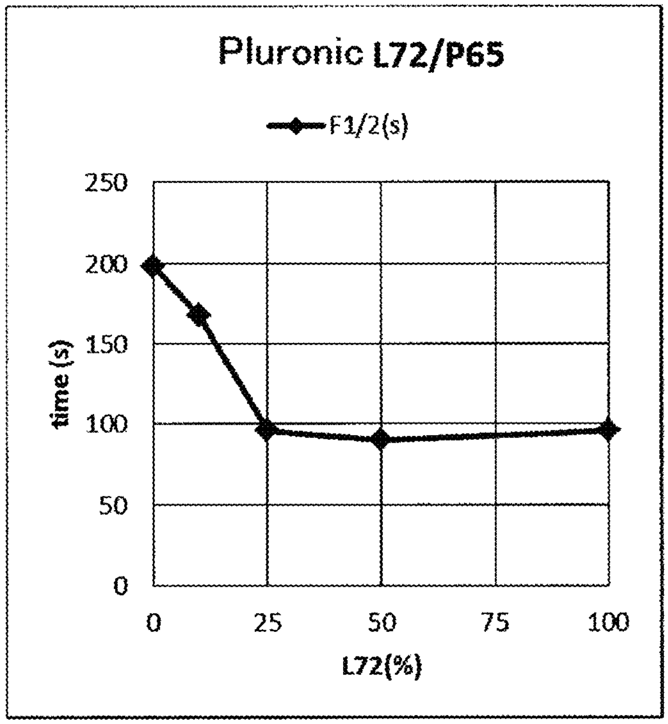
FIG. 9 is a graph plotting the relationship between the block copolymer addition rate and the decoloring rate F1/2 based on the results of Examples e8, e9, e10, e17, and e20.
Figure 10:
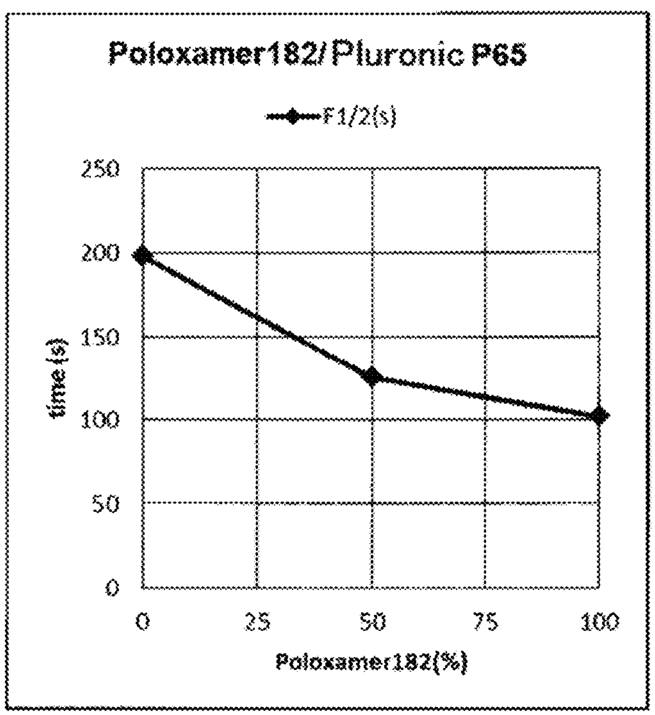
FIG. 10 is a graph plotting the relationship between the block copolymer addition rate and the decoloring rate F1/2 based on the results of Examples e11, e17, and e21.
Figure 11:
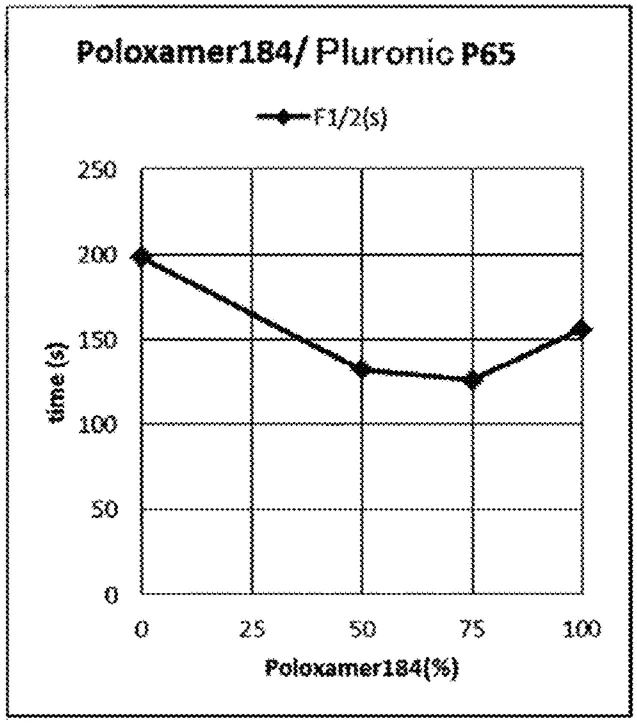
FIG. 11 is a graph plotting the relationship between the block copolymer addition rate and the decoloring rate F1/2 based on the results of Examples e12, e13, e17, and e22.
Figure 12:
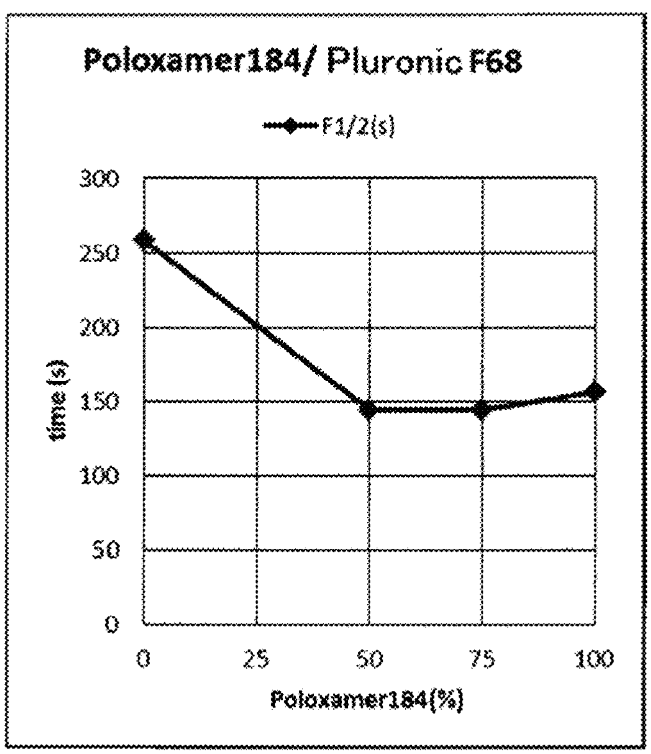
FIG. 12 is a graph plotting the relationship between the block copolymer addition rate and the decoloring rate F1/2 based on the results of Examples e14, e15, e18, and e22.

| | Mixed Block Copolymer | Example Number |
|---|---|---|
| FIG. 6 | Pluronic L64<br>Pluronic P65 | e1, e2, e3, e16, e17 |
| FIG. 7 | Pluronic L64<br>Pluronic F68 | e4, e5, e16, e18 |
| FIG. 8 | Pluronic L61<br>Pluronic P65 | e6, e7, e17, e19 |
| FIG. 9 | Pluronic L72<br>Pluronic P65 | e8, e9, e10, e17, e20 |
| FIG. 10 | Poloxamer 182<br>Pluronic P65 | e11, e17, e21 |
| FIG. 11 | Poloxamer 184<br>Pluronic P65 | e12, e13, e17, e22 |
| FIG. 12 | Poloxamer 184<br>Pluronic F68 | e14, e15, e18, e22 |

As shown in FIGS. 6 to 12, from the results of Examples e1 to e22, enhancement of photochromic characteristics was observed by mixing two of the block copolymers.

Example f Using Polymer (Block Copolymer) of General Formulas (a-1) to (j)

Reference Production Example f1: Block Copolymer Obtained Through Michael Addition 5 g (2.5 mmol) of a diol type polypropylene glycol (manufactured by Wako Pure Chemical Industries, Ltd., weight-average molecular weight 2000), 0.13 g (0.75 mmol) of toluenesulfonic acid monohydrate (manufactured by Aldrich), and 25 ml of toluene were put into a 50 ml flask. 0.80 g (7.5 mmol) of β-mercaptopropionic acid was further put into thereto, and the mixture was dehydrated and condensed by heating under reflux for 16 hours at 130° C. oil temperature using a Dean-Stark tube and an oil bath. After the reaction, the solvent was distilled off using a rotary evaporator, and the obtained resultant was dissolved in dichloromethane, and the organic layer was separated by washing using 1% aqueous ammonia solution. After three times of washing liquid separation had been conducted, the organic layer was subsequently dried with magnesium sulfate, and filtrated with filter paper to remove the salts. Then, the solvent was distilled off with a rotary evaporator, and the residual solvent was removed with a vacuum pump, whereby obtaining 4.27 g of polypropylene glycol β-mercaptopropionate ester.

Subsequently, 2.18 g of polypropylene glycol β-mercaptopropionate ester, 0.90 g (2 mmol) of polyethylene glycol monomethacrylate (manufactured by Aldrich, weight-average molecular weight 450) and 10 ml of methanol were put into a 50 ml flask and stirred for mixing. 0.2 g (2 mmol) of trimethylamine (manufactured by Aldrich) was further put thereinto and stirred for 2 days at room temperature. The obtained resultant was subjected to distillation to remove the solvent with a rotary evaporator solvent, dissolved in dichloromethane, and washed with water three times, and then dried by adding magnesium sulfate into the organic layer. The obtained resultant was then further subjected to filtration to remove inorganic salts, to distillation to remove the solvent with a rotary evaporator, and to drying under reduced pressure with a vacuum pump, whereby obtaining 1.69 g of the desired Michael adduct polyethylene glycol-polypropylene glycol-polyethylene glycol block copolymer.

Reference Production Example f2: Thiol-Terminated Block Copolymer 5 g (1.7 mmol) of polyethylene glycol-polypropylene glycol-polyethylene glycol Pluronic L64 (manufactured by Aldrich, weight-average molecular weight 2900), 0.99 g (5.2 mmol) toluenesulfonyl chloride (manufactured by Aldrich), and 30 ml of dichloromethane were put into a 50 ml flask. 0.52 g (5.2 mmol) of trimethylamine (manufactured by Aldrich) was added dropwise into the flask which had been cool to 10° C. using an ice water bath, and the solution was stirred at room temperature overnight. The reaction mass was washed three times with water, dried with magnesium sulfate to remove the organic layer, and then filtrated to remove inorganic salts. The obtained resultant was then subjected to distillation to remove the solvent with a rotary evaporator, and dried under reduced pressure with a vacuum pump, whereby obtaining 5.28 g of toluenesulfonyl ester block copolymer. From the result of $^{1}$H-NMR analysis, it was confirmed that 64% of the hydroxyl groups were esterified.

Subsequently, 0.38 g (5.0 mmol) of thiourea (manufactured by Aldrich) and 20 g of water were added to the toluenesulfonate ester-terminated block copolymer, and the mixture was refluxed for 3 hours in an oil bath at an oil temperature of 110° C. using a reflux condenser. The mixture was cooled to 60° C. and 0.51 g of 25% ammonia water was added thereto, followed by stirring for an hour while heated. The resultant was cooled to the room temperature, and acidified by adding concentrated hydrochloric acid, and then dichloromethane-soluble component was extracted with dichloromethane. The organic layer was washed three times with water, dried over magnesium sulfate, and filtered to remove inorganic salts. The obtained resultant was then subjected to distillation to remove the solvent with a rotary evaporator, and dried under reduced pressure with a vacuum pump, whereby obtaining 3.35 g of thiol-terminated block copolymer. From the result of $^{1}$H-NMR analysis, it was confirmed that a block copolymer mixture of which 62% of the hydroxyl groups were esterified was obtained.

Reference Production Example β: Mercaptopropionate Ester-Terminated Block Copolymer 5 g (1.7 mmol) of polyethylene glycol-polypropylene glycol-polyethylene glycol Pluronic L64 (manufactured by Aldrich, weight-average molecular weight 2900), 0.04 g (0.2 mmol) of toluenesulfonyl chloride monohydrate (manufactured by Aldrich), 60 ml of toluene were put into a 100 ml flask. 0.43 g (4.7 mmol) of β-mercaptopropionic acid (manufactured by Aldrich) was put into the flask, and the mixture was heated to remove water under reflux for 16 hours using a Dean-Stark tube. After cooling the mixture to room temperature, 1% aqueous ammonia solution was added thereto for washing and liquid separation, and the organic layer of the mixture was distilled off with a rotary evaporator. The resultant was dissolved in dichloromethane, and washed and separated two times with water, dried by adding magnesium sulfate, and filtered to remove inorganic salts. The resultant obtained therefrom was then subjected to distillation to remove the solvent with a rotary evaporator, and dried under reduced pressure with a vacuum pump, whereby obtaining 5.13 g of β-mercaptopropionate ester block copolymer. From the result of $^{1}$H-NMR analysis, it was confirmed that a block copolymer of which 79% of the hydroxyl groups were esterified was obtained.

Reference Production Example f4: Glycidyl Ether-Terminated Block Copolymer 5 g (1.7 mmol) of polyethylene glycol-polypropylene glycol-polyethylene glycol Pluronic L64 (manufactured by Aldrich, weight-average molecular weight 2900), 0.2 g (5.1 mmol) of 60% sodium hydride (manufactured by Aldrich), and 20 ml of tetrahydrofuran were put into a 50 ml flask. The mixture was stirred for 5 hours using an oil bath while heated at 60° C., and cooled to room temperature, and then 0.63 g (6.8 mmol) of epichlorohydrin (manufactured by Aldrich) was added to the flask, and the mixture was stirred at room temperature for 2 days. After heating under reflux for 2 hours at 80° C., the solvent was distilled off with a rotary evaporator, and extraction with dichloromethane was carried out, and the resultant was washed and separated three times with water. The organic layer was dried by adding magnesium sulfate, and the remainder was filtered to remove inorganic salts, and then subjected to distillation to remove the solvent with a rotary evaporator, and dried under reduced pressure with a vacuum pump, whereby obtaining 5.21 g of glycidyl ether block copolymer. From the result of $^{1}$H-NMR analysis, it was confirmed that a block copolymer of which 54% of the hydroxyl groups were glycidyl-esterified was obtained.

Reference Production Example f5: Thioepoxy-Terminated Block Copolymer 3 g of the glycidyl ether-terminated block copolymer produced in Reference Production Example f4, 0.3 g (4 mmol) of thiourea (manufactured by Aldrich), and 30 ml of methanol were put into a 50 ml flask. After 4 days of stirring at room temperature, the solvent was distilled off with a rotary evaporator, and the resultant was washed with water and separated three times. The organic layer was dried by adding magnesium sulfate, and the remainder was filtered to remove inorganic salts, and then subjected to distillation to remove the solvent with a rotary evaporator, and dried under reduced pressure with a vacuum pump, whereby obtaining 2.17 g of thioepoxy-terminated block copolymer. From the result of $^{1}$H-NMR analysis, it was confirmed that a block copolymer of which 53% of the hydroxyl groups of Pluronic L64 were thioepoxypropane-etherified was obtained.

Reference Production Example f6: Glycolate-Terminated Block Copolymer 5 g (1.7 mmol) of polyethylene glycol-polypropylene glycol-polyethylene glycol Pluronic L64 (manufactured by Aldrich, weight-average molecular weight 2900), 0.41 g (10 mmol) of 60% sodium hydride (manufactured by Aldrich), 25 ml of dimethylformamide were put into a 50 ml flask. The mixture was stirred for 2 hours using an oil bath while heated at 60° C., and cooled to room temperature, and then 0.48 g (5 mmol) of chloroacetic acid (manufactured by Aldrich) was added to the flask and heated for 3 hours at 60° C., and the mixture was stirred for 2 days at room temperature. After adding concentrated hydrochloric acid, the resultant was discharged into water and extraction was carried out with dichloromethane. After three times of washing with water, the organic layer was dried over magnesium sulfate and filtered to remove inorganic salts. The obtained resultant was then subjected to distillation to remove the solvent with a rotary evaporator, and dried under reduced pressure with a vacuum pump, whereby obtaining 4.27 g of glycolate-terminated block copolymer. From the result of $^{1}$H-NMR analysis, it was confirmed that a block copolymer mixture of which 36% of the hydroxyl groups were glycolate-esterified was obtained.

Reference Production Example f7: Acrylate-Terminated Block Copolymer 0.75 g (6.9 mmol) of chloropropionic acid (manufactured by Tokyo Kasei), and 1.23 g (10 mmol) of thionyl chloride (manufactured by Aldrich) were put into a 50 ml flask. The mixture was stirred for 5 hours at 60° C. After cooling to room temperature, the unreacted thionyl chloride was distilled off, and then 5 g (1.7 mmol) of polyethylene glycol-polypropylene glycol-polyethylene glycol Pluronic L64 (manufactured by Aldrich, weight-average molecular weight 2900) and 25 ml of toluene was added to the flask. The mixture was stirred for 6 hours using an oil bath while heated at 110° C., and cooled to room temperature, and then subjected to distillation to remove the solvent. After extraction with dichloromethane, washing with water and separation was carried out three times. The obtained resultant was then subjected to distillation to remove the solvent with a rotary evaporator, and dried under reduced pressure with a vacuum pump, whereby obtaining 5.19 g of chloropropionate ester-terminated block copolymer. From the result of $^{1}$H-NMR analysis, it was confirmed that a block copolymer mixture of which 94% of the hydroxyl groups were chloropropionate-esterified was obtained.

5.19 g (1.7 mmol) of chloropropionate ester-terminated block copolymer was put into a 50 ml flask, and stirred and dissolved in 25 ml of acetone, and then the flask was cooled to 10° C. using an ice water bath. 0.69 g (6.8 mmol) of trimethylamine was added dropwise into the flask, and the solution was stirred at room temperature overnight. The obtained resultant was subjected to distillation to remove the solvent and, and extraction with dichloromethane and three times of washing with water were carried out. The resultant was further subjected to filtration to remove inorganic salts, to distillation to remove the solvent with a rotary evaporator after adding 1.5 mg of BHT as a stabilizer, and dried under reduced pressure with a vacuum pump, whereby obtaining 3.04 g of the desired substance of acrylate-terminated block copolymer. From the result of $^{1}$H-NMR analysis, it was confirmed that 88% of the hydroxyl groups were acrylate-esterified.

Reference Production Example f8: Tetronic 901 (Ammonium Salt 21.16 g (4.5 mmol) of Tetronic 901 (manufactured by BASF Corp.) was put into a round bottom flask containing a stirrer, and dispersed in 135 ml of water. 1.04 ml (9 mmol) of benzyl chloride (manufactured by Aldrich) was put into the flask, and the solution in the flask was stirred at room temperature for 24 hours. The flask was equipped with a reflux condenser, and the reaction was continued while stirring at 60° C. for 6 hours. 30 ml of saturated saline was put thereto and extraction was carried out with 100 ml and subsequently with 50 ml of dichloromethane. The organic layers were collected and dried over magnesium sulfate, and filtered through a filter paper to remove solids, followed by filtration through silica gel. After concentrating the organic layer, the organic layer was dried with a vacuum pump for several hours to obtain yellow oily modified Tetronic 901 (11.92 g).

$^{1}$H-NMR (Bruker 400 MHz, CDCl3): 1.14 (m), 2.07 (Br. S), 3.40 (m), 3.55 (m), 3.65 (m), 4.70 (s, PhCH2), 7.37 (m, Ar.)

Reference Production Example f9: Tetronic 904 (Ammonium Salt)

Yellow oily modified Tetronic 904 (19.39 g) was obtained in the same manner as in Reference Production Example f8 except that Tetronic 901 was replaced with 21.85 g of Tetronic 904.

$^{1}$H-NMR (Bruker 400 MHz, CDCl3): 1.14 (m), 2.07 (Br. S), 3.40 (m), 3.55 (m), 3.65 (m), 4.70 (s, PhCH2), 7.37 (m, CH arom.)

Reference Production Example f10: Tetronic 1301 (Ammonium Salt)

Yellow oily modified Tetronic 1301 (15.68 g) was obtained in the same manner as in Reference Production Example f8 except that Tetronic 901 was replaced with 21.14 g of Tetronic 1301.

$^{1}$H-NMR (Bruker 400 MHz, CDCl3): 1.14 (m), 2.16 (m), 2.56 (m), 3.40 (m), 3.55 (m), 3.65 (m), 4.70 (s, PhCH2), 7.37, (m, CH arom.)

Reference Production Example f11: Tetronic 1304 (Ammonium Salt)

Yellow paste-like modified Tetronic 1304 (14.68 g) was obtained in the same manner as in Reference Production Example f8 except that Tetronic 901 was replaced with 19.68 g of Tetronic 1304.

$^{1}$H-NMR (Bruker 400 MHz, CDCl3): 1.14 (m), 1.96 (m), 2.56 (m), 3.40 (m), 3.55 (m), 3.65 (m), 4.70 (s, PhCH 2), 7.37 (m, CH arom)

Reference Production Example f12: Tetronic 150R1 (Ammonium Salt)

Yellow oily modified Tetronic 150R1 (11.74 g) was obtained in the same manner as in Reference Production Example f8 except that Tetronic 901 was replaced with 20.87 g of Tetronic 150R1.

$^{1}$H-NMR (Bruker 400 MHz, CDCl3): 1.14 (m), 1.93 (Br. S), 3.40 (m), 3.55 (m), 3.65 (m), 4.70 (s, PhCH2), 7.37 (m, CH arom)

Reference Production Example f13: Tetronic 701 (Ammonium Salt)

Yellow oily modified Tetronic 701 (11.6 g) was obtained in the same manner as in Reference Production Example f8 except that Tetronic 901 was replaced with 20.6 g of Tetronic 701.

$^{1}$H-NMR (Bruker 400 MHz, CDCl3): 1.14 (m), 2.07 (m), 2.33 (m), 2.57 (m), 3.40 (m), 3.54 (m), 3.65 (m), 4.70 (s, PhCH2), 7.37 (m, CH arom)

Reference Production Example f14: Tetronic 90R4 (Ammonium Salt)

Yellow oily modified Tetronic 90R4 (14.36 g) was obtained in the same manner as in Reference Production Example f8 except that Tetronic 901 was replaced with 20.36 g of Tetronic 90R4.

$^{1}$H-NMR (Bruker 400 MHz, CDCl3): 1.14 (m), 2.11 (Br. S), 3.40 (m), 3.55 (m), 3.65 (m), 4.70 (s, PhCH2), 7.37 (m, CH arom).

The structures of the block copolymers used in the Examples are summarized in Table 24 below.

TABLE 24

| Block Copolymer Component | General Formula | Polyethylene Glycol Chain Average Unit Number | Polypropylene Glycol Chain Average Unit Number |
|---|---|---|---|
| Pluronic L64 | (a-1) | 26.4 | 30.0 |
| Jeffamine M1000 | (e) | 19.0 | 3.0 |
| Glycerol Polypropylene Oxide-Block-Polyethylene oxide | (b-1) | 30.9 | 19.5 |
| Tetronic 90R4 | (c-1) | 64.0 | 72.0 |
| Reference Production Example f1 | (j) | 16.5 | 34.4 |
| Reference Production Example f2 | (f-2) | 26.4 | 30.0 |
| Reference Production Example f3 | (f-1) | 26.4 | 30.0 |
| Reference Production Example f4 | (g-1) | 26.4 | 30.0 |
| Reference Production Example f5 | (g-2) | 26.4 | 30.0 |
| Reference Production Example f6 | (h) | 26.4 | 30.0 |
| Reference Production Example f7 | (i-1) | 26.4 | 30.0 |
| Reference Production Example f8 | (c-2) | 12.0 | 72.0 |
| Reference Production Example f9 | (c-2) | 60.0 | 72.0 |
| Reference Production Example f10 | (c-2) | 16.0 | 104.0 |
| Reference Production Example f11 | (c-2) | 96.0 | 104.0 |
| Reference Production Example f12 | (c-2) | 20.0 | 124.0 |
| Reference Production Example f13 | (c-2) | 8.0 | 56.0 |
| Reference Production Example f14 | (c-2) | 64.0 | 72.0 |

[Photochromic Characteristics]

The photochromic characteristics were measured in the same manner as in Example b.

Example f1

4 mg (800 ppm) of a naphthopyran-based photochromic dye (CR-173 manufactured by Corning), 0.25 g (5 parts by weight) of the block copolymer produced in Reference Production Example f3, and 7.5 mg (1500 ppm) of Zelec-UN (manufactured by Stephan Company) were added to 2.74 g (55 parts by weight) of a norbornene diisocyanate composition, followed by stirring for dissolution. To this solution, 1.10 g (22 parts by weight) of pentaerythritol tetrakis (3-mercaptopropionate) was added, and the solution was stirred for mixing, and then a mixture of 1.17 g (23 parts by weight) of 4-mercaptomethyl-1,8-dimercapto-3,6-dithiaoctane in which 3.0 mg (600 ppm) of dibutyltin dichloride (manufactured by Sigma-Aldrich Co. LLC.) had been dispersed was added, and the solution was subjected to decompressing and degassing using a vacuum pump under stirring.

The prepared monomer was charged in a glass mold having a thickness of 2 mm, and resinification was performed by raising the temperature from room temperature to 120° C. in an oven to prepare a molded product. The measurement results of the photochromic characteristics are shown in Table 25.

Examples f2 to f9

Resinifications were performed in the same manner as in Example f1 except that, as shown in Table 25, the kind and additive amount of naphthopyran-based photochromic dye and block copolymer component were changed so as to prepare molded products. The measurement results of the photochromic characteristics are also shown in Table 25.

Example f10

30.8 mg (684 ppm) of Reversacol Wembley Grey (manufactured by Vivimed) and 16.7 mg (376 ppm) of Reversacol Heath Green (manufactured by Vivimed) as photochromic compounds, 1.0 g (2 parts by weight) of glycerol polypropylene oxide-block-polyethylene oxide (manufactured by Aldrich), and 150 mg (3000 ppm) of butoxyethyl acid phosphate were added to 20.35 g (40.7 parts by weight) of metaxylylene diisocyanate, followed by stirring for dissolution using a stirring apparatus. Subsequently, 24.65 g of (49.3 parts by weight) a composition containing 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 5.5 mg (110 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 40 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven to prepare a molded product. This block copolymer-added composition was able to be cast into a mold without having a rapid increase in viscosity in the middle of the process.

The kind and additive amount of block copolymer, and the measurement result of the photochromic characteristics are shown in Table 25.

Examples f11 to f17

Resinification was performed in the same manner as in Example f10 except that, as shown in Table 25, the kind and additive amount of naphthopyran-based photochromic dye and block copolymer component were changed so as to prepare molded products. The measurement results of the photochromic characteristics are also shown in Table 25.

Comparative Example f1

Resinification was performed in the same manner as in Example f1 except that the block copolymer was not added, whereby a molded product was prepared. The measurement results of the photochromic characteristics are shown in Table 25.

TABLE 25

| | Block copolymer Component | | | Dye Component | | Photochromic characteristics | |
|---|---|---|---|---|---|---|---|
| | | | Additive Amount (parts by weight) | Dye Name | Additive Amount (ppm) | ΔT % max (%) | F1/2 (s) |
| Example f1 | Reference Production Example 3 | — | 5 | CR-173 | 800 | 44 | 92 |
| Example f2 | Pluronic L64 | Aldrich | 5 | CR-173 | 800 | 47 | 93 |
| Example f3 | Jeffamine M1000 | Aldrich | 8 | CR-173 | 800 | 50 | >900 |
| Example f4 | Reference Production Example f8 | — | 2 | Reversacol Wembley Grey<br>Reversacol Heath Green | 684<br>372 | 74 | 110 |
| Example f5 | Reference Production Example f9 | — | 2 | Reversacol Wembley Grey<br>Reversacol Heath Green | 684<br>372 | 70 | 122 |
| Example f6 | Reference Production Example f10 | — | 2 | Reversacol Wembley Grey<br>Reversacol Heath Green | 684<br>372 | 77 | 96 |
| Example f7 | Reference Production Example f11 | — | 2 | Reversacol Wembley Grey<br>Reversacol Heath Green | 684<br>372 | 73 | 82 |
| Example f8 | Reference Production Example f13 | — | 2 | Reversacol Wembley Grey<br>Reversacol Heath Green | 684<br>372 | 52 | 252 |
| Example f9 | Reference Production Example f14 | — | 2 | Reversacol Wembley Grey<br>Reversacol Heath Green | 684<br>372 | 51 | 168 |
| Example f10 | Glycerol polypropylene oxide-block-polyethylene oxide | Aldrich | 2 | Reversacol Wembley Grey<br>Reversacol Heath Green | 684<br>376 | 27 | 444 |
| Example f11 | Tetronic90R4 | Aldrich | 2 | Reversacol Wembley Grey<br>Reversacol Heath Green | 684<br>376 | 60 | 216 |
| Example f12 | Reference Production Example f8 | — | 2 | Reversacol Wembley Grey<br>Reversacol Heath Green | 684<br>376 | 75 | 204 |
| Example f13 | Reference Production Example f9 | — | 2 | Reversacol Wembley Grey<br>Reversacol Heath Green | 684<br>376 | 70 | 300 |
| Example f14 | Reference Production Example f10 | — | 2 | Reversacol Wembley Grey<br>Reversacol Heath Green | 547<br>300 | 80 | 138 |
| Example f15 | Reference Production Example f11 | — | 2 | Reversacol Wembley Grey<br>Reversacol Heath Green | 547<br>300 | 77 | 180 |
| Example f16 | Reference Production Example f12 | — | 2 | Reversacol Wembley Grey<br>Reversacol Heath Green | 547<br>300 | 68 | 84 |
| Example f17 | Reference Production Example f14 | — | 2 | Reversacol Wembley Grey<br>Reversacol Heath Green | 684<br>376 | 59 | 216 |
| Comparative Example f1 | — | — | — | CR-173 | 800 | 7 | >900 |

From the above results, it was found that the poly(thio) urethane resin molded product including a block copolymer can effectively exhibit a photochromic phenomenon, and has excellent photochromic characteristics.

Example f18

4 mg (800 ppm) of a naphthopyran-based photochromic dye (CR-173 manufactured by Corning), 62.5 mg (1.25 parts by weight) of the triphenylphosphine (manufactured by Aldrich), and 0.25 g (5 parts by weight) of the block copolymer produced in Reference Production Example f3, and 25 mg (5000 ppm) of Zelec-UN (manufactured by Stephan Company) were added to 1.75 g (35 parts by weight) of a mixture of 4-mercaptomethyl-1,8-dimercapto-3,6-dithiaoctane, followed by stirring for dissolution. To this solution, 3.25 g (65 parts by weight) of bisphenol A diglycidyl ether was added, and the solution was stirred for mixing, and subjected to decompressing and degassing using a vacuum pump under stirring.

The prepared monomer was charged in a glass mold having a thickness of 2 mm, and resinification was performed by raising the temperature from room temperature to 120° C. in an oven to prepare a molded product. The measurement results of the photochromic characteristics are shown in Table 26.

Example f19

Resinification was performed in the same manner as in Example f18 except that, as shown in Table 26, the kind and amount of block copolymer so as to prepare a molded product. The measurement results of the photochromic characteristics are shown in Table 26.

Comparative Example f2

Resinification was performed in the same manner as in Example f18 except that the block copolymer was not added, so as to prepare a molded product. The measurement results of the photochromic characteristics are in Table 26.

TABLE 26

| | Block Copolymer Component | | Additive Amount (parts by weight) | Dye Component | | Photochromic Characteristics | |
|---|---|---|---|---|---|---|---|
| | | | | Dye Name | Additive Amount (ppm) | ΔT % max (%) | F1/2 (s) |
| Example f18 | Reference Production Example f3 | — | 5 | CR-173 | 800 | 64 | >900 |
| Example f19 | Reference Production Example f5 | — | 5 | CR-173 | 800 | 35 | >900 |
| Comparative Example f2 | — | — | — | CR-173 | 800 | 7 | >900 |

From the above results, it was found that the poly(thio) epoxy-poly(thi)ol resin molded product including a block copolymer can effectively exhibit a photochromic phenomenon, and has excellent photochromic characteristics.

Example f20

4 mg (800 ppm) of a naphthopyran-based photochromic dye (CR-173 manufactured by Corning), 15 mg (3000 ppm) of azobisisobutyronitrile (AIBN) (manufactured by Aldrich), and 0.25 g (5 parts by weight) of polyethylene glycol-polypropylene glycol-polyethylene glycol (Pluronic L64, manufactured by Aldrich, weight average molecular weight 2900) were added to 1.25 g (25 parts by weight) of divinylbenzene (manufactured by Aldrich), followed by stirring for dissolution. To this solution, 3.75 g (75 parts by weight) of bisphenol A glycerol dimethacrylate was added, and the solution was stirred for mixing, and the solution was subjected to decompressing and degassing using a vacuum pump under stirring.

The prepared monomer was charged in a glass mold having a thickness of 2 mm, and resinification was performed by raising the temperature from room temperature to 120° C. in an oven to prepare a molded product. The measurement results of the photochromic characteristics are shown in Table 27.

Examples f21 to f27

Resinification was performed in the same manner as in Example f20 except that, as shown in Table 27, the kind and amount of block copolymer component were changed so as to prepare molded products. The measurement results of the photochromic characteristics are shown in Table 27.

Comparative Example f3

Resinification was performed in the same manner as in Example f20 except that the block copolymer was not added, so as to prepare molded products. The measurement results of the photochromic characteristics are in Table 27.

TABLE 27

| | Block Copolymer Component | | | | | | |
|---|---|---|---|---|---|---|---|
| | | | Additive Amount (parts by weight) | Dye Component | | Photochromic Characteristics | |
| | | | | Dye Name | Additive Amount (ppm) | ΔT % max (%) | F1/2 (s) |
| Example f20 | Pluoric L64 | Aldrich | 5 | CR-173 | 800 | 55 | 231 |
| Example f21 | Reference Production Example f1 | — | 5 | CR-173 | 800 | 53 | 272 |
| Example f22 | Reference Production Example f2 | — | 5 | CR-173 | 800 | 49 | 179 |
| Example r23 | Reference Production Example f3 | — | 5 | CR-173 | 800 | 53 | 360 |
| Example f24 | Reference Production Example f4 | — | 5 | CR-173 | 800 | 52 | 252 |
| Example f25 | Reference Production Example f5 | — | 5 | CR-173 | 800 | 50 | 244 |
| Example f26 | Reference Production Example f6 | — | 5 | CR-173 | 800 | 54 | 248 |
| Example f27 | Reference Production Example f7 | — | 5 | CR-173 | 800 | 51 | 286 |
| Comparative Example f3 | — | — | — | CR-173 | 800 | 42 | >900 |

From the above results, it was found that the poly(meth) acryl-polyalkene resin molded product including a block copolymer can effectively exhibit a photochromic phenomenon, and has excellent photochromic characteristics.

Example g Using Polymer (Block Copolymer) of General Formulas (k) to (v)

Reference Production Example g1: Synthesis of PEG Polyacrylic Ester Block Copolymer m1

1 equivalent of polyethylene glycol methyl ether (Mn: 5400)-4-cyano-4-dodecyl trithiocarbonate-pentanoic acid ester was added to a dried flask and dissolved in 2 ml of dry toluene. Subsequently, 100 equivalents of benzyl acrylate and a 0.1 M toluene solution of azobisisobutyronitrile (0.1 equivalent) were added. The mixed solution was degassed, and nitrogen bubbling was carried out for 15 minutes. Subsequently, the flask was sealed, and heated and stirred at 70° C. for 6 hours. Further, the reaction mixture was cooled to 0° C. before concentrating under reduced pressure, a mixed solution of diethyl ether and hexane (50/50) was added, and the solvent was slowly distilled off under reduced pressure until a yellow solid precipitated. The remaining yellow solid was dissolved in 5 ml of dry tetrahydrofuran and degassing operation was carried out by blowing nitrogen for 15 minutes. Subsequently, 10 equivalents of octylamine and 0.5 equivalents of tris(2-carboxyethyl) phosphine hydrochloride were added, and the mixture was reacted overnight under an argon stream. The reaction mixture was concentrated to dryness and a 50/50 mixed solvent of diethyl ether and hexane was added thereto. Further, the solvent was slowly distilled off under reduced pressure until a white solid precipitated. The obtained solid was dispersed in diethyl ether, subjected to filtration with filter paper to remove undissolved substance, and washed with diethyl ether so as to obtain the desired block copolymer as a white solid. 833 mg of PEG(Mn: 5400)-block-polybenzyl acrylate could be obtained from 300 mg of polyethylene glycol methyl ether-4-cyano-4-dodecyl trithiocarbonate-pentanoate ester. $^1$H-NMR (CDCl3): 1.4-1.9 (CH2-CH), 2.35 (CH2-CH), 3.6-3.7 (PEG), 4.97 (CH2Ph), 7.2-7.3 (aromatic ring)

Reference Production Example g2: Synthesis of PEG Polyacrylic Ester Block Copolymer m2

806 mg of the desired block copolymer was obtained from 500 mg of the raw material by carrying out the production in the same manner as Reference Production Example g1, except that RAFT initiator as the raw material was changed to polyethylene glycol methyl ether (Mn: 10000)-4-cyano-4-dodecyl trithiocarbonate-pentanoate ester. $^1$H-NMR (CDCl3): 1.4-1.9 (CH2-CH), 2.35 (CH2-CH), 3.6-3.7 (PEG), 4.97 (CH2Ph), 7.2-7.3 (aromatic ring)

Reference Production Example g3: Polycaprolactone Diol Bissuccinate Ester 10 g (5 mmol) of polycaprolactone diol (Mn: 2000) was added to a dried flask and dissolved in 100 ml of dichloro methane. Subsequently, 1.5 g (15 mmol) of succinic anhydride (manufactured by Aldrich), 2.1 ml (15 mmol) of trimethylamine (manufactured by Aldrich), and 244 mg (2 mmol) of dimethylaminopyridine (manufactured by Aldrich) were added thereto. The reaction was carried out at 35° C. under nitrogen for 3 hours, and 2.5 ml of polyethylene glycol monoethyl ether (Mn: 550) was added to react the excessive succinic anhydride. The reaction mixture was further reacted for 1 hour, cooled to room temperature, and concentrated to dryness to remove the solvent. The crude product was dispersed in diethyl ether and the organic layer was washed three times with 1 N hydrochloric acid and washed once with saturated sarine, and further subjected to drying over magnesium sulfate, to filtration through silica gel, and to concentration to dryness to obtain 10 g of white waxy material. $^{1}$H-NMR (CDCl3): 1.36-1.42 (m, CH2), 1.63-1.67 (m, CH2), 2.31 (t, CH2), 2.62-2.67 (m, CH2-CH2-COOH), 4.06 (t, CH2)

Reference Production Example g4: Synthesis of PEG-Block-Polycaprolactone-Block-PEG Dimethyl Ether n1

Step 1: 1 g (0.5 mmol) of polycaprolactone disuccinic acid (the compound of Reference Production Example g3) was added to a dried flask, and dissolved in 10 ml of dry dichloromethane. A small amount of dimethylformamide was added dropwise and 0.21 ml (2.5 mmol) of oxalyl acid was added thereto. The reaction mixture was stirred for 3 hours, and concentrated under reduced pressure to obtain polycaprolactone disuccinic acid chloride. The product was used in the next step without purification.

Step 2: 10 equivalents of polyethylene glycol monomethyl ether (Mn: 550) was added into a dried flask, and dissolved in 20 ml of dry dichloromethane and 0.21 ml (3 equivalents) of triethylamine. The reaction mass was cooled to 0° C., and a solution of polycaprolactone disuccinic acid chloride (the compound of Step 1) dissolved in 5 ml of dry dichloromethane was added dropwise while maintaining the nitrogen atmosphere. After completion of the dropwise addition, the temperature was raised to room temperature and stirring was continued overnight. Dichloromethane was additionally put into, and then washed three times with water, followed by washing once with saturated sarine. The organic layer was dried over magnesium sulfate, filtered, and concentrated under reduced pressure, and the solvent was distilled off to obtain 1.44 g of the desired product as a waxy polymer.

$^{1}$H-NMR (acetone-d6): 1.39-1.44 (m, CH2), 1.62-1.68 (m, CH2), 2.33 (t, CH2), 3.60 (PEG), 4.06 (t, CH2)

Reference Production Example g5: Synthesis of PEG-Block-Polycaprolactone-Block-PEG Compound n2

Synthesis was carried out in the same manner as in Reference Production Example g4, except that polyethylene glycol monomethyl ether was changed to polyethylene glycol (Mn: 200) to obtain 0.86 g of the desired diol compound as a waxy polymer.

$^{1}$H-NMR (acetone-d6): 1.39-1.44 (m, CH2), 1.62-1.68 (m, CH2), 2.33 (t, CH2), 3.60 (PEG), 4.06 (t, CH2)

Reference Production Example g6: Synthesis of PEG-Block-Polycaprolactone-Block-PEG Compound n3

Synthesis was carried out in the same manner as in Reference Production Example g4, except that polyethylene glycol monomethyl ether was changed to polyethylene glycol (Mn: 600) to obtain 1.44 g of the desired diol compound as a waxy polymer.

$^{1}$H-NMR (acetone-d6): 1.39-1.44 (m, CH2), 1.62-1.68 (m, CH2), 2.33 (t, CH2), 3.60 (PEG), 4.06 (t, CH2)

Reference Production Example g7: Synthesis of PEG-Block-Polycaprolactone-Block-PEG Compound n4

Synthesis was carried out in the same manner as in Reference Production Example g4, except that polyethylene glycol monomethyl ether was changed to polyethylene glycol (Mn: 1000) to obtain 2.39 g of the desired diol compound as a waxy polymer.

$^{1}$H-NMR (acetone-d6): 1.39-1.44 (m, CH2), 1.62-1.68 (m, CH2), 2.33 (t, CH2), 3.60 (PEG), 4.06 (t, CH2)

Reference Production Example g8: Synthesis of Lactate Ester-Terminated Block Copolymer v1

10 g (3.45 mmol) of Pluronic L64 (manufactured by BASF Corp.), 67 mg (0.35 mmol) of p-toluenesulfonic acid monohydrate (manufactured by Aldrich), and 1.28 ml (17.35 mmol) of (DL)-lactic acid (manufactured by Aldrich) were put into a flask equipped with a Dean-Stark tube and a cooling tube, and dispersed in 40 ml of benzene. The mixture was refluxed under nitrogen for 6 hours. After cooling to room temperature, the organic layer was diluted with 20 ml of dichloromethane and washed with saturated aqueous solution of sodium hydrogen carbonate (20 ml), water (20 ml), and saturated sarine. The organic layer was dried over magnesium sulfate, filtered, concentrated and dried to obtain 9.38 g of the desired compound.

$^{1}$H-NMR (CDCl3): 1.44 (d, CH3), 1.53 (m, PPO), 3.41 (m, PPO), 3.55 (m, PPO), 3.66 (m, PEG), 4.34 (m, CH)

The structures of the block copolymers used in the Examples are summarized in Tables 28, 29, and 30 below.

TABLE 28

| Compound | Block Copolymer Component | General Formula | Manufacturer | Polyethylene Glycol Chain Average Unit Number | Polymer Chain other than Polyethylene Glycol Chain | Average Unit Number of Polymer Chain other than Polyethylene Glycol Chain |
|---|---|---|---|---|---|---|
| k1 | Poly(ethylene glycol)methyl ether-block-poly(ε-caprolactone) | (k-1) | Aldrich | 113.5 | Polycaprolactone chain | 43.8 |
| k2 | Poly(ethylene glycol)methyl ether-block-poly(ε-caprolactone) | (k-1) | Aldrich | 113.5 | Polycaprolactone chain | 113.9 |
| k3 | Poly(ethylene glycol)methyl ether-block-poly(ε-caprolactone) | (k-1) | Aldrich | 113.5 | Polycaprolactone chain | 219.0 |
| k4 | Poly(ethylene glycol)methyl ether-block-poly(ε-caprolactone) | (k-1) | Aldrich | 113.5 | Polycaprolactone chain | 280.4 |
| k5 | Poly(ethylene glycol)methyl ether-block-poly(ε-caprolactone) | (k-1) | Polymer Source | 45.4 | Polycaprolactone chain | 8.8 |
| k6 | Poly(ethylene glycol)methyl ether-block-poly(ε-caprolactone) | (k-1) | Polymer Source | 45.4 | Polycaprolactone chain | 43.8 |

TABLE 28-continued

| Compound | Block Copolymer Component | General Formula | Manufacturer | Polyethylene Glycol Chain Average Unit Number | Polymer Chain other than Polyethylene Glycol Chain | Average Unit Number of Polymer Chain other than Polyethylene Glycol Chain |
|---|---|---|---|---|---|---|
| k7 | Poly(ethylene glycol)methyl ether-block-poly(ε-caprolactone) | (k-1) | Polymer Source | 45.4 | Polycaprolactone chain | 22.8 |
| k8 | Amino ethyl-Poly(ethylene glycol)-block-poly(ε-caprolactone) | (k-2) | Polymer Source | 90.8 | Polycaprolactone chain | 28.0 |
| k9 | Mercapt ethyl-Poly(ethylene glycol)-block-poly(ε-caprolactone) | (k-3) | Polymer Source | 56.8 | Polycaprolactone chain | 65.7 |
| l1 | Poly(ethylene glycol) methyl ether-block-poly(lactide-co-glycolide) | (l) | Aldrich | 113.5 | Polylactic acid<br>Poly glycolic acid | 48.6<br>60.3 |
| m1 | Reference Production Example g1 | (m) | — | 122.6 | Polybenzyl acrylate chain | 98.6 |
| m2 | Reference Production Example g2 | (m) | — | 227.0 | Polybenzyl acrylate chain | 98.6 |
| n1 | Reference Production Example g4 | (n-2) | — | 25.0 | Polycaprolactone chain | 17.5 |
| n2 | Reference Production Example g5 | (n-1) | — | 9.1 | Polycaprolactone chain | 17.5 |
| n3 | Reference Production Example g6 | (n-1) | — | 27.2 | Polycaprolactone chain | 17.5 |
| n4 | Reference Production Example g7 | (n-1) | — | 45.4 | Polycaprolactone chain | 17.5 |
| p1 | Poly(ethylene glycol) methyl ether-block-poly(propylene glycol) | (p-1) | Polymer Source | 68.1 | Polypropylene glycol chain | 60.3 |
| p2 | Poly(ethylene glycol) methyl ether-block-poly(propylene glycol) | (p-1) | Polymer Source | 90.8 | Polypropylene glycol chain | 60.3 |
| p3 | Poly(ethylene glycol) methyl ether-block-poly(propylene glycol) | (p-1) | Polymer Source | 45.4 | Polypropylene glycol chain | 31.0 |
| p4 | Poly(ethylene glycol) methyl ether-block-poly(butylene glycol) | (p-2) | Polymer Source | 43.1 | Polybutylene glycol chain | 11.1 |
| p5 | Poly(ethylene glycol) methyl ether-block-poly(butylene glycol) | (p-2) | Polymer Source | 45.4 | Polybutylene glycol chain | 19.4 |
| q1 | Poly(methyleneindane)-block-poly(ethylene glycol) | (q-1) | Polymer Source | 113.5 | Polymethylene indane chain | 11.5 |
| q2 | Poly(styrene)-block-poly(ethyleneglycol) | (q-2) | Polymer Source | 70.4 | Polystyrene chain | 22.1 |
| q3 | Poly(ethylene glycol)-block-poly(styrene)-block-poly(ethylene glycol) | (q-3) | Polymer Source | 99.9 | Polystyrene chain | 14.8 |
| r1 | Poly(ethylene glycol) methyl ether-block-poly(propionylaziridin) | (r-1) | Polymer Source | 113.5 | Polypropionyl aziridine chain | 63.6 |
| s1 | Poly(ethylene glycol) methyl ether-block-poly(dimethylsiloxane) | (s-1) | Polymer Source | 47.7 | Polydimethylsiloxane chain | 13.5 |
| s2 | Poly(ethylene glycol) methyl ether-block-poly(dimethylsiloxane)-block-poly(ethylene glycol) methyl ether | (s-2) | Polymer Source | 90.8 | Polydimethylsiloxane chain | 27.0 |
| t1 | Poly(ethylene glycol) methyl ether-block-poly(propylene glycol)-block-poly(ethylene glycol) | (t) | Polymer Source | 172.5 | Polypropylene glycol chain | 68.9 |
| v1 | Reference Production Example g8 | (v) | — | 26.4 | Polypropylene glycol chain | 30.0 |

TABLE 29

| | Block Copolymer Component | General Formula | Manufacturer | Polystyrene Chain Average Unit Number | Polyacrylic Acid Chain Average Unit Number |
|---|---|---|---|---|---|
| o1 | Polystyrene-block-poly(acrylic acid) | (o) | Aldrich | 291.9 | 105.5 |

TABLE 30

| | Block Copolymer Component | General Formula | Manufacturer | Polyethylene Glycol Chain Average Unit Number | Polypropylene Glycol Chain Average Unit Number | Polyethylene Glycol Chain Average Unit Number |
|---|---|---|---|---|---|---|
| u1 | Poly(ethylene glycol)-block-poly(propylene glycol)-block-poly(ethylene glycol)diglycidyl ether | (u) | Polymer Source | 6.8 | 32.7 | 13.6 |

[Photochromic Characteristics]

The photochromic characteristics were measured in the same manner as in Example b.

Example g1

2.7 mg (547 ppm) of a naphthopyran-based photochromic dye (Reversacol Wembley Grey), 1.5 mg (300 ppm) of a naphthopyran-based photochromic dye (Reversacol Heath Green), 0.10 g (2 parts by weight) of polyethylene glycol methyl ether (Mn: 5000)-block-poly ε-caprolactone (Mn:

13000) (manufactured by Aldrich), and 7.5 mg (1500 ppm) of Zelec-UN (manufactured by Stephan Company) were added to 2.74 g (55 parts by weight) of a norbornene diisocyanate composition, followed by stirring for dissolution. To this solution, 1.10 g (22 parts by weight) of pentaerythritol tetrakis (3-mercaptopropionate) was added, and the solution was stirred for mixing, and then a mixture of 1.17 g (23 parts by weight) of 4-mercaptomethyl-1,8-dimercapto-3,6-dithiaoctane in which 3.0 mg (600 ppm) of dibutyltin dichloride (manufactured by Sigma-Aldrich Co. LLC.) had been dispersed was added, and the solution was subjected to decompressing and degassing using a vacuum pump under stirring.

The prepared monomer was charged in a glass mold having a thickness of 2 mm, and resinification was performed by raising the temperature from room temperature to 120° C. in an oven to prepare a molded product. The measurement result of the photochromic characteristics are shown in Table 31.

Examples g2 to g26

Resinification was performed in the same manner as in Example g1 except that, as shown in Table 31, the kind and additive amount of naphthopyran-based photochromic dye and block copolymer component were changed so as to prepare molded products. The measurement results of the photochromic characteristics are also shown in Table 31.

Example g27

27.4 mg (547 ppm) of Reversacol Wembley Grey (manufactured by Vivimed) and 15.0 mg (300 ppm) of Reversacol Heath Green (manufactured by Vivimed) as photochromic compounds, 1.0 g (2 parts by weight) of polyethylene glycol methyl ether (Mn: 5000)-block-poly ε-caprolactone (Mn: 5000) (manufactured by Aldrich), and 150 mg (3000 ppm) of butoxyethyl acid phosphate were added to 20.35 g (40.7 parts by weight) of metaxylylene diisocyanate, followed by stirring for dissolution using a stirring apparatus. Subsequently, 24.65 g (49.3 parts by weight) of a composition containing 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane was added thereto and mixed, followed by continuous stirring. 5.0 g (10 parts by weight) of metaxylylene diisocyanate in which 5.5 mg (110 ppm) of dibutyltin dichloride (manufactured by Sigma-Aldrich Co. LLC.) had been dissolved was added thereto, followed by stirring for 1 hour. After decompressing and degassing was performed in a degree of decompression of 133 to 400 Pa for 40 minutes using a vacuum pump, filtration through a 1 μm membrane filter was performed, and while stirring, a decompressing and degassing operation was performed for 2 hours until foams disappeared using a vacuum pump. The prepared monomer was charged in a glass mold having a thickness of 2 mm, and resinification was performed by raising the temperature from room temperature to 120° C. in an oven to prepare a molded product. This block copolymer-added composition was able to be cast into a mold without having a rapid increase in viscosity in the middle of the process.

The kind and additive amount of dye and block copolymer, and the measurement result of the photochromic characteristics are shown in Table 32.

Examples g28 to g36

Resinification was performed in the same manner as in Example g27 except that, as shown in Table 32, the kind and additive amount of naphthopyran-based photochromic dye and block copolymer component were changed so as to prepare molded products. The measurement results of the photochromic characteristics are also shown in Table 32.

Comparative Example g1

Resinification was performed in the same manner as in Example g1 except that Duranol T5651 (manufactured by Asahi Kasei Corporation) was used as the block copolymer to prepare a molded product. The measurement result of the photochromic characteristics is in Table 32.

Comparative Examples g2 to g7

Resinification was performed in the same manner as in Comparative Example g1 except that, as shown in Table 32, the kind and additive amount of naphthopyran-based photochromic dye and polymer polyol component were changed so as to prepare molded products. The measurement results of the photochromic characteristics are also shown in Table 32.

The resins of Comparative Examples g3 and g4 were cloudy, and unsuitable for optical materials.

TABLE 31

| | Block Copolymer Component | | | Dye Component | | Photochromic Characteristics | |
|---|---|---|---|---|---|---|---|
| | | | Additive Amount (parts by weight) | Dye | Additive Amount (ppm) | ΔT % max (%) | F1/2 (s) |
| Example g1 | k2 | Aldrich | 2 | Reversacol Wembley Grey | 547 | 73 | 84 |
| | | | | Reversacol Heath Green | 300 | | |
| Example g2 | k2 | Aldrich | 8 | CR-173 | 600 | 49 | 96 |
| Example g3 | k3 | Aldrich | 2 | Reversacol Wembley Grey | 547 | 48 | 72 |
| | | | | Reversacol Heath Green | 300 | | |

TABLE 31-continued

| | Block Copolymer Component | | Additive Amount (parts by weight) | Dye Component: Dye | Dye Component: Additive Amount (ppm) | Photochromic Characteristics: ΔT % max (%) | Photochromic Characteristics: F1/2 (s) |
|---|---|---|---|---|---|---|---|
| Example g4 | k4 | Aldrich | 2 | Reversacol Wembley Grey | 547 | 30 | 66 |
| | | | | Reversacol Heath Green | 300 | | |
| Example g5 | k5 | Polymer Source | 2 | Reversacol Wembley Grey | 684 | 18 | >900 |
| | | | | Reversacol Heath Green | 376 | | |
| Example g6 | k6 | Polymer Source | 2 | Reversacol Wembley Grey | 684 | 59 | 66 |
| | | | | Reversacol Heath Green | 376 | | |
| Example g7 | k7 | Polymer Source | 2 | Reversacol Wembley Grey | 684 | 30 | 408 |
| | | | | Reversacol Heath Green | 376 | | |
| Example g8 | k8 | Polymer Source | 2 | Reversacol Wembley Grey | 684 | 32 | 240 |
| | | | | Reversacol Heath Green | 376 | | |
| Example g9 | k9 | Polymer Source | 2 | Reversacol Wembley Grey | 684 | 71 | 78 |
| | | | | Reversacol Heath Green | 376 | | |
| Example g10 | l1 | Aldrich | 2 | Reversacol Wembley Grey | 547 | 63 | 126 |
| | | | | Reversacol Heath Green | 300 | | |
| Example g11 | m1 | Reference Production Example g1 | 2 | Reversacol Wembley Grey | 547 | 75 | 102 |
| | | | | Reversacol Heath Green | 300 | | |
| Example g12 | m2 | Reference Production Example g2 | 2 | Reversacol Wembley Grey | 547 | 71 | 78 |
| | | | | Reversacol Heath Green | 300 | | |
| Example g13 | m2 | Reference Production Example g2 | 4 | CR-173 | 600 | 41 | 84 |
| Example g14 | p1 | Polymer Source | 2 | Reversacol Wembley Grey | 684 | 76 | 84 |
| | | | | Reversacol Heath Green | 376 | | |
| Example g15 | p2 | Polymer Source | 2 | Reversacol Wembley Grey | 684 | 73 | 72 |
| | | | | Reversacol Heath Green | 376 | | |
| Example g16 | p3 | Polymer Source | 2 | Reversacol Wembley Grey | 684 | 79 | 96 |
| | | | | Reversacol Heath Green | 376 | | |
| Example g17 | p4 | Polymer Source | 2 | Reversacol Wembley Grey | 684 | 20 | 846 |
| | | | | Reversacol Heath Green | 376 | | |
| Example g18 | p5 | Polymer Source | 2 | Reversacol Wembley Grey | 684 | 66 | 60 |
| | | | | Reversacol Heath Green | 376 | | |
| Example g19 | q1 | Polymer Source | 2 | Reversacol Wembley Grey | 684 | 77 | 126 |
| | | | | Reversacol Heath Green | 376 | | |
| Example g20 | q2 | Polymer Source | 2 | Reversacol Wembley Grey | 684 | 80 | 198 |
| | | | | Reversacol Heath Green | 376 | | |
| Example g21 | q3 | Polymer Source | 2 | Reversacol Wembley Grey | 684 | 69 | 90 |
| | | | | Reversacol Heath Green | 376 | | |

TABLE 31-continued

| | Block Copolymer Component | | Additive Amount (parts by weight) | Dye Component: Dye | Dye Component: Additive Amount (ppm) | Photochromic Characteristics: ΔT % max (%) | Photochromic Characteristics: F1/2 (s) |
|---|---|---|---|---|---|---|---|
| Example g22 | r1 | Polymer Source | 2 | Reversacol Wembley Grey | 684 | 11 | >600 |
| | | | | Reversacol Heath Green | 376 | | |
| Example g23 | s1 | Polymer Source | 2 | Reversacol Wembley Grey | 684 | 65 | 78 |
| | | | | Reversacol Heath Green | 376 | | |
| Example g24 | s2 | Polymer Source | 2 | Reversacol Wembley Grey | 684 | 57 | 66 |
| | | | | Reversacol Heath Green | 376 | | |
| Example g25 | t1 | Polymer Source | 2 | Reversacol Wembley Grey | 684 | 81 | 114 |
| | | | | Reversacol Heath Green | 376 | | |
| Example g26 | u1 | Polymer Source | 2 | Reversacol Wembley Grey | 684 | 69 | 90 |
| | | | | Reversacol Heath Green | 376 | | |

TABLE 32

| | Block Copolymer Component | | | Dye Component | | Photochromic Characteristics | |
|---|---|---|---|---|---|---|---|
| Example g27 | k1 | Aldrich | 2 | Reversacol Wembley Grey | 547 | 66 | 78 |
| | | | | Reversacol Heath Green | 300 | | |
| Example g28 | l1 | Aldrich | 2 | Reversacol Wembley Grey | 547 | 49 | 150 |
| | | | | Reversacol Heath Green | 300 | | |
| Example g29 | m1 | Reference Production Example g1 | 2 | Reversacol Wembley Grey | 547 | 57 | 240 |
| | | | | Reversacol Heath Green | 300 | | |
| Example g30 | m2 | Reference Production Example g2 | 2 | Reversacol Wembley Grey | 547 | 47 | 210 |
| | | | | Reversacol Heath Green | 300 | | |
| Example g31 | n1 | Reference Production Example g4 | 2 | Reversacol Wembley Grey | 547 | 63 | 168 |
| | | | | Reversacol Heath Green | 300 | | |
| Example g32 | n2 | Reference Production Example g5 | 2 | Reversacol Wembley Grey | 547 | 66 | 192 |
| | | | | Reversacol Heath Green | 300 | | |
| Example g33 | n3 | Reference Production Example g6 | 2 | Reversacol Wembley Grey | 547 | 65 | 258 |
| | | | | Reversacol Heath Green | 300 | | |
| Example g34 | n4 | Reference Production Example g7 | 2 | Reversacol Wembley Grey | 547 | 63 | 162 |
| | | | | Reversacol Heath Green | 300 | | |
| Example g35 | o1 | Aldrich | 2 | Reversacol Wembley Grey | 547 | 23 | 228 |
| | | | | Reversacol Heath Green | 300 | | |
| Example g36 | v1 | Reference Production Example g8 | 2 | Reversacol Wembley Grey | 479 | 77 | 174 |
| | | | | Reversacol Heath Green | 263 | | |

TABLE 32-continued

| | Block Copolymer Component | | | Dye Component | | Photochromic Characteristics | |
|---|---|---|---|---|---|---|---|
| Comparative Example g1 | Duranol T5651 | Asahi Kasei Corporation | 2 | Reversacol Wembley Grey<br>Reversacol Heath Green | 547<br>300 | 16 | >600 |
| Comparative Example g2 | Duranol T5651 | Asahi Kasei Corporation | 5 | CR-173 | 800 | 14 | >900 |
| Comparative Example g3 | Duranol T5652 | Asahi Kasei Corporation | 2 | Reversacol Wembley Grey<br>Reversacol Heath Green | 547<br>300 | 55 | 78 |
| Comparative Example g4 | Duranol T5652 | Asahi Kasei Corporation | 5 | CR-173 | 800 | 4 | 139 |
| Comparative Example g5 | Tergitol Min Foam 1x | Aldrich | 2 | Reversacol Wembley Grey<br>Reversacol Heath Green | 547<br>300 | 16 | >900 |
| Comparative Example g6 | Ucion HTF 14 | Aldrich | 2 | Reversacol Wembley Grey<br>Reversacol Heath Green | 547<br>300 | 14 | >600 |
| Comparative Example g7 | PEG8000 | Aldrich | 5 | CR-173 | 800 | 18 | >900 |

The compounds in the table are as follows.

Duranol T5651: polycarbonate diol (Mn: 1000) manufactured by Asahi Kasei Corporation Duranol T5652: polycarbonate diol (Mn: 2000) manufactured by Asahi Kasei Corporation Tergitol: PEG, PPG copolymer manufactured by Aldrich Ucon™ HTF 14: PEG, PPG random copolymer manufactured by Aldrich PEG 8000: Polyethylene glycol (Mn: 8000) manufactured by Aldrich From the above results, it was found that the poly(thio) urethane resin molded product including a block copolymer can effectively exhibit a photochromic phenomenon, and has excellent photochromic characteristics.

Priority is claimed based on Japanese patent application No. 2016-200259 filed on Oct. 11, 2016, Japanese patent application No. 2017-368 filed on Jan. 5, 2017, Japanese patent application No. 2017-86907 filed on Apr. 26, 2017, and Japanese application No. 2017-102427 filed on May 24, 2017, the disclosure of which is incorporated herein in its entirety.

The present invention may also take the following aspects.

[a1] A polymerizable composition for optical materials, including a polymer (a) comprised of one or more compounds selected from compounds represented by the following General Formulas (1) to (4a), a compound (b) of which light absorption characteristics vary by sensing changes in environment, and a polymerization reactive compound (c), (1)

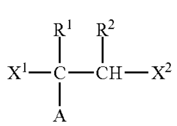

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are the same as or different from each other, and represented by any one of General Formula (1a) or (1c), $$\text{-E-X}^3 \quad (1a)$$

wherein, in General Formula (1a), E represents an oxygen atom or a sulfur atom, and $X^3$ represents a polyalkylene glycol group or a group represented by General Formula (1b), $$—R^3\text{-}(G)_m \quad (1b)$$

wherein, in General Formula (1b), $R^3$ represents an m+1 valent hydrocarbon group, G's are the same as or different from each other, and are groups represented by —$OX^4$ or —N+R $X^5X^6Q^{1-}$ ($X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion.), m is the number of bonds between $R^3$ and G, and represents an integer of 1 to 10, (1c)

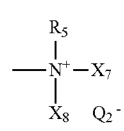

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2$ represents a halogen ion, a carboxylate anion, or an anion of an inorganic acid, (2)

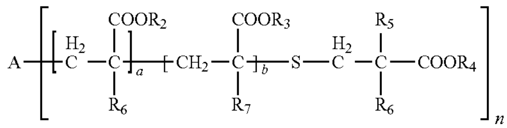

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other, (3)

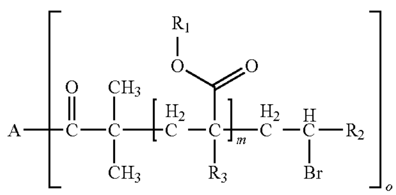

wherein, in General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, (4a)

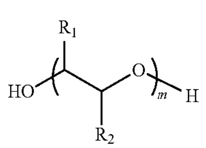

wherein, in General Formula (4a), $R_1$ and $R_2$ each represent a hydrogen atom or an alkyl group having 1 to 18 carbon atoms, at least one of $R_1$ and $R_2$ is a hydrogen atom, and m represents an integer of 30 to 500, a plurality of $R_1$'s and $R_2$'s may be the same as or different from each other.

[a2] The polymerizable composition for optical materials according to [a1], in which the compound (b) is a chromic compound.

[a3] The polymerizable composition for optical materials according to [a2], in which the chromic compound is a photochromic compound.

[a4] The polymerizable composition for optical materials according to [a3], in which the photochromic compound is a naphthopyran derivative.

[a5] The polymerizable composition for optical materials according to any one of [a1] to [a4], in which the polymerization reactive compound (c) includes one or two or more compounds selected from a polyiso(thio)cyanate compound, a (thio)epoxy compound, an oxetanyl compound, a thietanyl compound, a (meth)acryloyl compound, a (meth)allyl compound, an alkene compound, an alkyne compound, a di- or higher functional active hydrogen compound, and an acid anhydride.

[a6] The polymerizable composition for optical materials according to [a5], in which the polymerization reactive compound (c) includes the polyiso (thio) cyanate compound and the di- or higher functional active hydrogen compound, and the polyiso(thio)cyanate compound is an aliphatic polyiso(thio)cyanate compound, an alicyclic polyiso(thio)cyanate compound, or an aromatic polyiso(thio)cyanate compound.

[a7] A cured body, including a microphase-separated structural body of a polymer (a) comprised of one or more compounds selected from compounds represented by the following General Formulas (1) to (4a), a compound (b) of which light absorption characteristics vary by sensing changes in environment, and a resin obtained by polymerization of a polymerization reactive compound (c), (1)

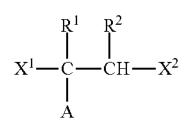

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are the same as or different from each other, and represented by any one of General Formula (1a) or (1c), $$-E-X^3 \quad (1a)$$

wherein, in General Formula (1a), E represents an oxygen atom or a sulfur atom, and $X^3$ represents a polyalkylene glycol group or a group represented by General Formula (1b), $$—R^3-(G)_m \quad (1b)$$

wherein, in General Formula (1b), $R^3$ represents an m+1 valent hydrocarbon group, G's are the same as or different from each other, and are groups represented by $—OX^4$ or $—N^+R^4X^5X^6Q^{1-}$ ($X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion.), m is the number of bonds between $R^3$ and G, and represents an integer of 1 to 10,

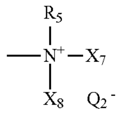

(1c)

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid,

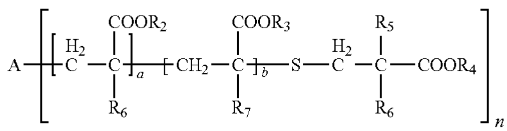

(2)

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other,

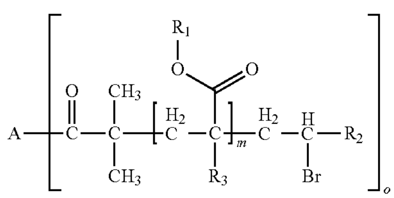

(3)

wherein, in General Formula (3), A is derived from a polyol compound having two or more hydroxyl groups and shows a group which forms an ester bond by being bonded to C(=O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other,

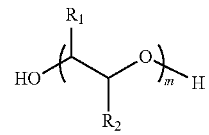

(4a)

wherein, in General Formula (4a), $R_1$ and $R_2$ each represent a hydrogen atom or an alkyl group having 1 to 18 carbon atoms, at least one of $R_1$ and $R_2$ is a hydrogen atom, and m represents an integer of 30 to 500, a plurality of $R_1$'s and $R_2$'s may be the same as or different from each other.

[a8] A molded product obtained by curing the polymerizable composition for optical materials according to any one of [a1] to [a6].

[a9] The molded product according to [a8], including a microphase-separated structural body of a polymer (a).

[a10] An optical material comprised of the molded product according to [a8] or [a9].

[a11] A plastic lens comprised of the molded product according to [a8] or [a9].

[a12] A production method of a polymerizable composition for optical materials, including a step of mixing a polymer (a) comprised of one or more compounds selected from compounds represented by the following General Formulas (1) to (4a), a compound (b) of which light absorption characteristics vary by changes in environment, and a polymerization reactive compound (c),

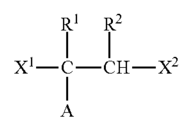

(1)

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are the same as or different from each other, and represented by any one of General Formula (1a) or (1c), $$-E-X^3 \quad (1a)$$

wherein, in General Formula (1a), E represents an oxygen atom or a sulfur atom, and $X^3$ represents a polyalkylene glycol group or a group represented by General Formula (1b), $$—R^3-(G)_m \quad (1b)$$

wherein, in General Formula (1b), $R^3$ represents an m+1 valent hydrocarbon group, G's are the same as or different from each other, and are groups represented by $—OX^4$ or $—N^+R^4X^5X^6Q^{1-}$ ($X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion.), m is the number of bonds between $R^3$ and G, and represents an integer of 1 to 10, (1c)

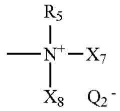

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid, (2)

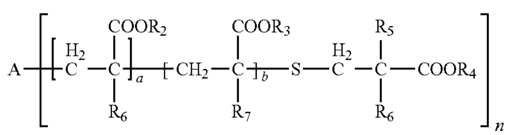

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other, (3)

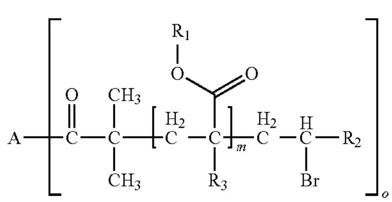

wherein, in General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, (4a)

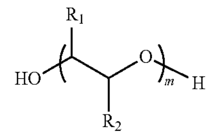

wherein, in General Formula (4a), $R_1$ and $R_2$ each represent a hydrogen atom or an alkyl group having 1 to 18 carbon atoms, at least one of $R_1$ and $R_2$ is a hydrogen atom, and m represents an integer of 30 to 500, a plurality of $R_1$'s and $R_2$'s may be the same as or different from each other.

[a13] The production method of a polymerizable composition for optical materials according to [a12], in which the step of mixing the polymer (a), the compound (b), and the polymerization reactive compound (c) includes a step of forming polymer particles including the polymer (a) and the compound (b), and a step of mixing the polymerization reactive compound (c) with the polymer particles.

[a14] The production method of a polymerizable composition for optical materials according to [a12], in which the polymerization reactive compound (c) contains two or more compounds, the step of mixing the polymer (a), the compound (b), and the polymerization reactive compound (c) includes a step of mixing the polymer (a), the compound (b), and some of the polymerization reactive compound (c), and a step of mixing the remaining polymerization reactive compound (c) with the mixture obtained in the above step.

[a15] The production method of a polymerizable composition for optical materials according to any one of [a12] to [a14], in which the compound (b) is a chromic compound.

[a16] The production method of a polymerizable composition for optical materials according to [a15], in which the chromic compound is a photochromic compound.

[a17] The production method of a polymerizable composition for optical materials according to [a16], in which the photochromic compound is a naphthopyran derivative.

[a18] A production method of a cured body, including a step of polymerizing and curing the polymerizable composition for optical materials according to any one of [a1] to [a6], in which the step includes a step of forming a resin by polymerization of the polymerization reactive compound (c), and forming a microphase-separated structural body by the polymer (a) to form a cured body comprised of the resin, the microphase-separated structural body, and a compound (b).

[a19] A production method of a plastic lens, including a step of forming a lens substrate by cast-polymerizing the polymerizable composition for optical materials according to any one of [a1] to [a6].

[a20] The production method of a plastic lens according to [a19], in which the step of forming a lens substrate includes a step of forming a resin by polymerization of a polymerization reactive compound (c), and forming a microphase-separated structural body by a polymer (a) to form a lens substrate comprised of the resin, the microphase-separated structural body, and a compound (b).

[b1] A polymerizable composition for optical materials, including a polymer (a) comprised of one or more compounds selected from a compound represented by the following General Formula (4), a compound (b) of which light absorption characteristics vary by sensing changes in environment, and a polymerization reactive compound (c), $$R_1 \text{+} A_1\text{-}R_2\text{-}A_2\text{-}R_3]_n \quad (4)$$

wherein, in General Formula (4), $A_1$ and $A_2$ represent polyalkylene oxide chains each different from each other, $R_1$ is an n-valent organic group, $R_2$ is a linking group that links two kinds of polyalkylene oxide chains, and $R_3$ is an organic group, n is an integer of 1 to 6.

[b2] The polymerizable composition for optical materials according to [b1], in which the compound (b) is a chromic compound.

[b3] The polymerizable composition for optical materials according to [b2], in which the chromic compound is a photochromic compound.

[b4] The polymerizable composition for optical materials according to [b3], in which the photochromic compound is a naphthopyran derivative.

[b5] The polymerizable composition for optical materials according to any one of [b1] to [b4], in which the polymerization reactive compound (c) includes one or two or more compounds selected from a polyiso(thio)cyanate compound, a (thio)epoxy compound, an oxetanyl compound, a thietanyl compound, a (meth)acryloyl compound, a (meth)allyl compound, an alkene compound, an alkyne compound, a di- or higher functional active hydrogen compound, and an acid anhydride.

[b6] The polymerizable composition for optical materials according to [b5], in which the polymerization reactive compound (c) includes the polyiso (thio) cyanate compound and the di- or higher functional active hydrogen compound, and the polyiso(thio)cyanate compound is an aliphatic polyiso(thio)cyanate compound, an alicyclic polyiso(thio)cyanate compound, or an aromatic polyiso(thio)cyanate compound.

[b7] A cured body, including a microphase-separated structural body of a polymer (a) comprised of one or more compounds selected from compounds represented by the following General Formula (4), a compound (b) of which light absorption characteristics vary by sensing changes in environment, and a resin obtained by polymerization of a polymerization reactive compound (c).

$$R_1 \text{+} A_1\text{-}R_2\text{-}A_2\text{-}R_3]_n \quad (4)$$

wherein, in General Formula (4), $A_1$ and $A_2$ represent polyalkylene oxide chains each different from each other, $R_1$ is an n-valent organic group, $R_2$ is a linking group that links two kinds of polyalkylene oxide chains, and $R_3$ is an organic group, n is an integer of 1 to 6.

[b8] A molded product obtained by curing the polymerizable composition for optical materials according to any one of [b1] to [b6].

[b9] The molded product according to [b8], including a microphase-separated structural body of a polymer (a).

[b10] An optical material comprised of the molded product according to [b8] or [b9].

[b11] A plastic lens comprised of the molded product according to [b8] or [b9].

[b12] A production method of a polymerizable composition for optical materials, including a step of mixing a polymer (a) comprised of one or more compounds selected from a compound represented by the following General Formula (4), a compound (b) of which light absorption characteristics vary by changes in environment, and a polymerization reactive compound (c).

$$R_1 \text{+} A_1\text{-}R_2\text{-}A_2\text{-}R_3]_n \quad (4)$$

wherein, in General Formula (4), $A_1$ and $A_2$ represent polyalkylene oxide chains each different from each other, $R_1$ is an n-valent organic group, $R_2$ is a linking group that links two kinds of polymer chains, and $R_3$ is an organic group, n is an integer of 1 to 6.

[b13] The production method of a polymerizable composition for optical materials according to [b12], in which the step of mixing the polymer (a), the compound (b), and the polymerization reactive compound (c) includes a step of forming polymer particles including the polymer (a) and the compound (b), and a step of mixing the polymerization reactive compound (c) with the polymer particles.

[b14] The production method of a polymerizable composition for optical materials according to [b12], in which the polymerization reactive compound (c) contains two or more compounds, the step of mixing the polymer (a), the compound (b), and the polymerization reactive compound (c) includes a step of mixing the polymer (a), the compound (b), and some of the polymerization reactive compound (c), and a step of mixing the remaining polymerization reactive compound (c) with the mixture obtained in the above step.

[b15] The production method of a polymerizable composition for optical materials according to any one of [b12] to [b14], in which the compound (b) is a chromic compound.

[b16] The production method of a polymerizable composition for optical materials according to [b15], in which the chromic compound is a photochromic compound.

[b17] The production method of a polymerizable composition for optical materials according to [b16], in which the photochromic compound is a naphthopyran derivative.

[b18] A production method of a cured body, including a step of polymerizing and curing the polymerizable composition for optical materials according to any one of [b1] to [b6], in which the step includes a step of forming a resin by polymerization of the polymerization reactive compound (c), and forming a microphase-separated structural body by the polymer (a) to form a cured body comprised of the resin, the microphase-separated structural body, and a compound (b).

[b19] A production method of a plastic lens, including a step of forming a lens substrate by cast-polymerizing the polymerizable composition for optical materials according to any one of [b1] to [b6].

[b20] The production method of a plastic lens according to [b19], in which the step of forming a lens substrate includes a step of forming a resin by polymerization of a polymerization reactive compound (c), and forming a microphase-separated structural body by a polymer (a) to form a lens substrate comprised of the resin, the microphase-separated structural body, and a compound (b).

The invention claimed is:

1. A polymerizable composition for optical materials, comprising:

a polymer (a) comprised of one or more compounds selected from compounds represented by the following General Formulas (1), (2), (3), (a-1), (a-2), (b-1), (b-2), (c-1), (c-2), (f-1), (f-2), (g-1), (g-2), (h), (i-1), (i-2), (j), (k-1), (k-3), (1), (m), (n-1), (n-2), (o), (p-1), (p-2), (q-1), (q-2), (q-3), (r), (s-1), (s-2), (t), (u) and (v);

a compound (b) of which light absorption characteristics vary by sensing changes in environment; and a polymerization reactive compound (c);

wherein the polymerization reactive compound (c) includes:

(i) a polyiso(thio)cyanate compound, the polyiso(thio) cyanate compound being an aliphatic polyiso(thio)

cyanate compound, an alicyclic polyiso(thio)cyanate compound, or an aromatic polyiso(thio)cyanate compound, and (ii-1) a polythiol compound having two or more mercapto groups or (ii-2) a polycarboxylic acid compound having two or more carboxyl groups, wherein the polymer (a) and polymerization reactive compound (c) are sole polymerizable components in the polymerizable composition, (1)

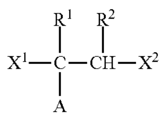

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, X1 is a group represented by General Formula (1a) and X2 is a group represented by General Formula (1c), or X1 is a group represented by General Formula (1c) and X2 is a group represented by General Formula (1a)

$$—E\text{-}X^3 \quad (1a)$$

wherein, in General Formula (1a), E represents an oxygen atom or a sulfur atom, and $X^3$ represents a polyalkylene glycol group or a group represented by General Formula (1b), $$—R^3\text{-}(G)_m \quad (1b)$$

wherein, in General Formula (1b), $R^3$ represents an m+1 valent hydrocarbon group, G's are the same as or different from each other, and are groups represented by $—OX^4$ or $—N^+R^4X^5X^6Q^{1-}$, wherein $X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion, m is the number of bonds between $R^3$ and G, and represents an integer of 1 to 10, (1c)

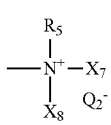

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid, (2)

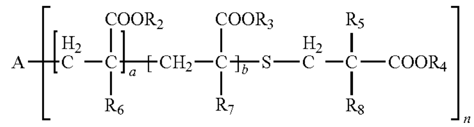

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other, (3)

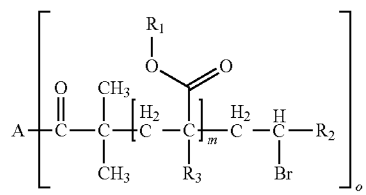

wherein, in General Formula (3), A is derived from a polyol compound having two or more hydroxyl groups and shows a group which forms an ester bond by being bonded to C(═O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, (a-1)

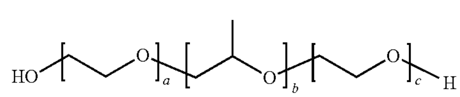

wherein, in General Formula (a-1), a, b, and c each represent a unit number, and each independently are an integer of 3 to 300, (a-2)

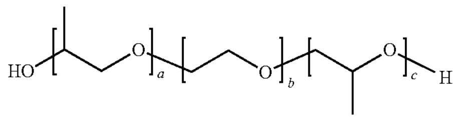

wherein, in General Formula (a-2), a, b, and c each represent a unit number, and each independently are an integer of 3 to 300, (b-1)

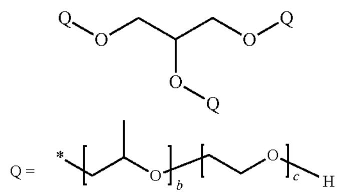

wherein, in General Formula (b-1), b and c each represent a unit number and each independently are an integer of 3 to 300, and the mark * represents a bonding hand, (b-2)

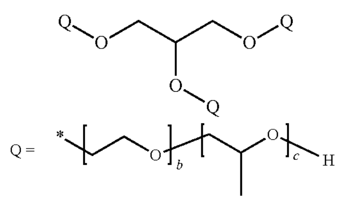

wherein, in General Formula (b-2), b and c each represent a unit number and each independently are an integer of 3 to 300, and the mark * represents a bonding hand, (c-1)

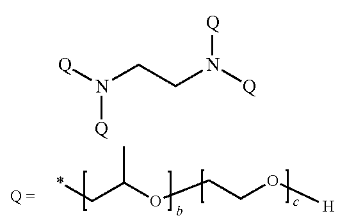

wherein, in General Formula (c-1), b and c each represent a unit number and each independently are an integer of 3 to 300, and the mark * represents a bonding hand, (c-2)

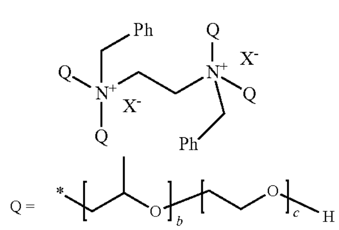

wherein, in General Formula (c-2), b and c each represent a unit number and each independently are an integer of 3 to 300, X represents a halogen ion, a carboxylate anion, or an inorganic acid anion, and the mark * represents a bonding hand, (f-1)

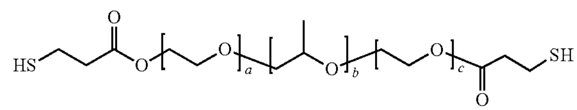

wherein, in General Formula (f-1), a, b and c each represent a unit number and each independently are an integer of 3 to 300, (f-2)

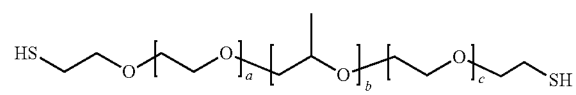

wherein, in General Formula (f-2), a, b, and c each represent a unit number and each independently are an integer of 3 to 300, (g-1)

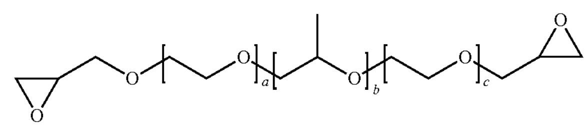

wherein, in General Formula (g-1), a, b, and c each represent a unit number and each independently are an integer of 3 to 300, (g-2)

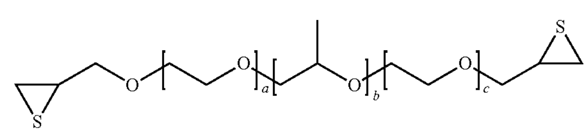

wherein, in General Formula (g-2), a, b, and c each represent a unit number and each independently are an integer of 3 to 300, (h)

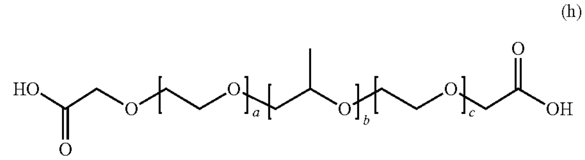

wherein, in General Formula (h), a, b, and c each represent a unit number and each independently are an integer of 3 to 300, (i-1)

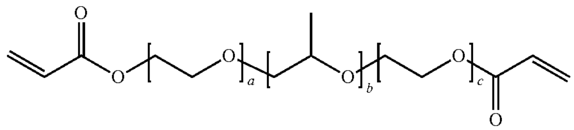

wherein, in General Formula (i-1), a, b, and c each represent a unit number and each independently are an integer of 3 to 300, (i-2)

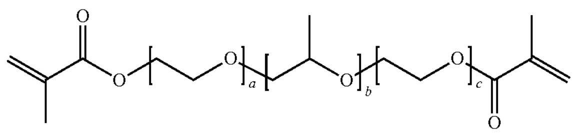

wherein, in General Formula (i-2), a, b, and c each represent a unit number and each independently are an integer of 3 to 300, (j)

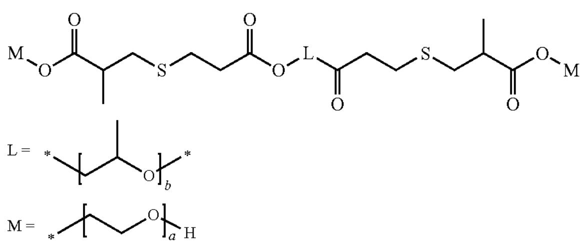

wherein, in General Formula (j), a and b each represent a unit number and each independently are an integer of 3 to 300, and the mark * represents a bonding hand, (k-1)

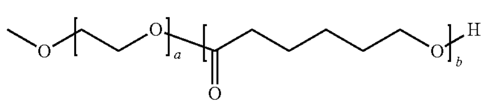

wherein, in General Formula (k-1), a and b each represent a unit number and each independently are an integer of 3 to 500, (k-3)

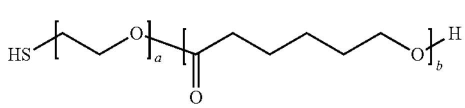

wherein, in General Formula (k-3), a and b each represent a unit number and each independently are an integer of 3 to 500, (1)

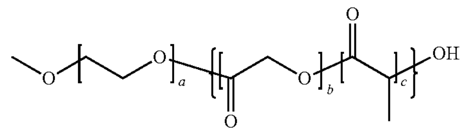

wherein, in General Formula (1), a, b, and c each represent a unit number and each independently are an integer of 3 to 300, (m)

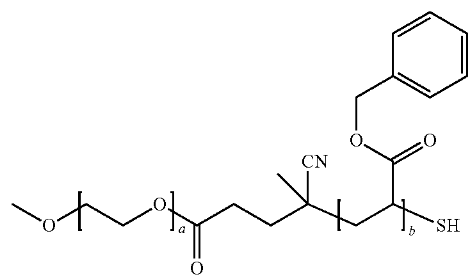

wherein, in General Formula (m), a and b each represent a unit number, and each independently are an integer of 3 to 300, (n-1)

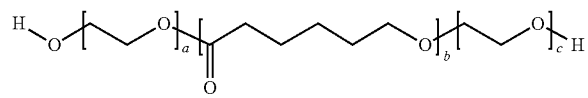

wherein, in General Formula (n-1), a, b, and c each represent a unit number, and each independently are an integer of 3 to 300, (n-2)

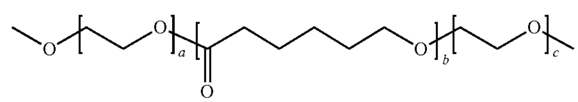

(o)

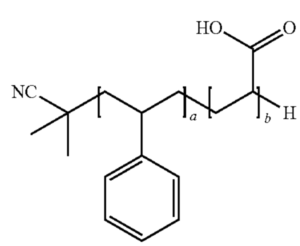

wherein, in General Formula (o), a and b each represent a unit number, and each independently are an integer of 3 to 500, (p-1)

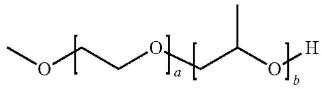

wherein, in General Formula (p-1), a and b each represent a unit number, and each independently are an integer of 3 to 300, (p-2)

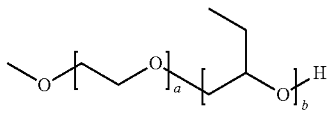

wherein, in General Formula (p-2), a and b each represent a unit number, and each independently are an integer of 3 to 300, (q-1)

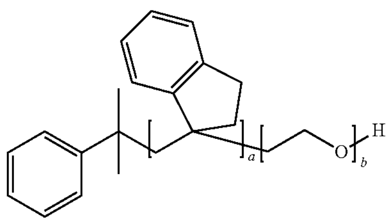

wherein, in General Formula (q-1), a and b each represent a unit number, and each independently are an integer of 3 to 300, (q-2)

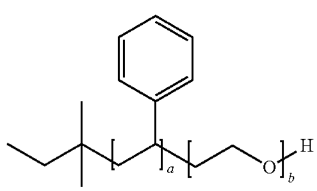

wherein, in General Formula (q-2), a, b, and c each represent a unit number, and each independently are an integer of 3 to 300, (q-3)

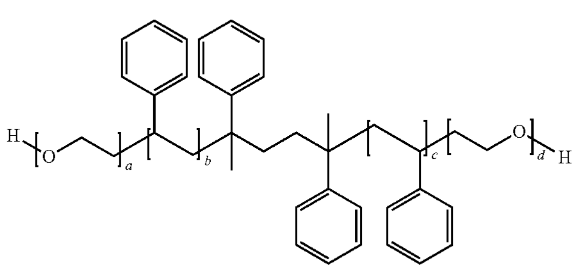

wherein, in General Formula (q-3), a, b, c, and d each represent a unit number, and each independently are an integer of 3 to 300, (r)

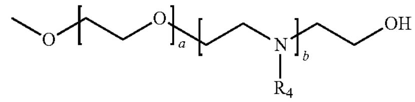

wherein, in General Formula (r), a, b, and c each represent a unit number, and each independently are an integer of 3 to 300, (s-1)

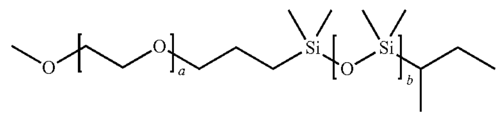

wherein, in General Formula (s-1), a and b each represent a unit number, and each independently are an integer of 3 to 300, (s-2)

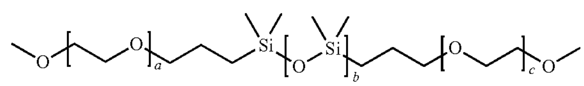

wherein, in General Formula (s-2), a, b, and c each represent a unit number, and each independently are an integer of 3 to 300, (t)

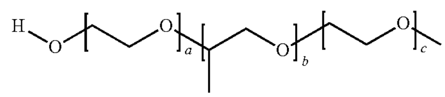

wherein, in General Formula (t), a, b, and c each represent a unit number, and each independently are an integer of 3 to 300, (u)

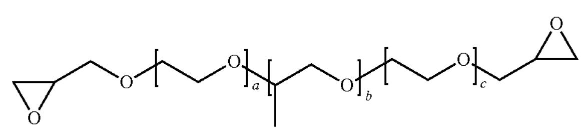

wherein, in General Formula (u), a, b, and c each represent a unit number, and each independently each independently are an integer of 3 to 300, (v)

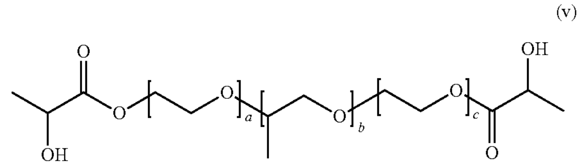

wherein, in General Formula (v), a, b, and c each represent a unit number, and each independently are an integer of 3 to 300.

2. The polymerizable composition for optical materials according to claim 1, wherein the compound (b) is a photochromic compound.

3. The polymerizable composition for optical materials according to claim 2, wherein the photochromic compound is a naphthopyran derivative.

4. The polymerizable composition for optical materials according to claim 1, further comprising a microphase-separated structural body of the polymer (a).

5. A cured body obtained by polymerizing and curing the polymerizable composition for optical materials according to claim 1.

6. A molded product obtained by curing the polymerizable composition for optical materials according to claim 1.

7. The molded product according to claim 6, comprising:

a microphase-separated structural body of a polymer (a).

8. An optical material comprised of the molded product according to claim 6.

9. A plastic lens comprised of the molded product according to claim 6.

10. A production method of a polymerizable composition for optical materials, comprising:

a step of mixing a polymer (a) comprised of one or more compounds selected from compounds represented by the following General Formulas (1), (2), (3), (a-1), (a-2), (b-1), (b-2), (c-1), (c-2), (f-1), (f-2), (g-1), (g-2), (h), (i-1), (i-2), (j), (k-1), (k-3), (1), (m), (n-1), (n-2), (o), (p-1), (p-2), (q-1), (q-2), (q-3), (r), (s-1), (s-2), (t), (u) and (v), a compound (b) of which light absorption characteristics vary by changes in environment, and a polymerization reactive compound (c), wherein the polymerization reactive compound (c) includes:

(i) a polyiso(thio)cyanate compound, the polyiso(thio)cyanate compound being an aliphatic polyiso(thio)cyanate compound, an alicyclic polyiso(thio)cyanate compound, or an aromatic polyiso(thio)cyanate compound, and (ii-1) a polythiol compound having two or more mercapto groups or (ii-2) a polycarboxylic acid compound having two or more carboxyl groups, wherein the polymer (a) and polymerization reactive compound (c) are sole polymerizable components in the polymerizable composition, (1)

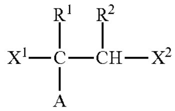

wherein, in General Formula (1), A represents a polyolefin chain, $R^1$ and $R^2$ each represent a hydrogen atom or an alkyl group having 1 to 18 carbon atoms, and at least one of $R^1$ and $R^2$ is a hydrogen atom, $X^1$ and $X^2$ are independently a combination of a group represented by General Formula (1a) and a group represented by General Formula (1c), $$-E-X^3 \quad (1a)$$

wherein, in General Formula (1a), E represents an oxygen atom or a sulfur atom, and $X^3$ represents a polyalkylene glycol group or a group represented by General Formula (1b), $$-R^3-(G)_m \quad (1b)$$

wherein, in General Formula (1b), $R^3$ represents an m+1 valent hydrocarbon group, G's are the same as or different from each other, and are groups represented by $-OX^4$ or $-N^+R^4X^5X^6Q^{1-}$, wherein $X^4$ to $X^6$ each represent a polyalkylene glycol group, $R^4$ represents a hydrogen atom, an alkyl group having 1 to 18 carbon atoms which optionally be substituted with a polyalkylene glycol group, or an aromatic alkyl group, $Q^{1-}$ represents a halogen ion, a carboxylate anion, or inorganic acid anion, m is the number of bonds between $R^3$ and G, and represents an integer of 1 to 10, (1c)

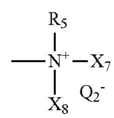

wherein, in General Formula (1c), $X_7$ and $X_8$ are the same as or different from each other and polyalkylene glycol groups or groups represented by General Formula (1b), $R_5$ is a hydrogen atom, an alkyl group having 1 to 18 carbon atoms which optionally be substituted with an alkylene glycol group, or an aromatic alkyl group having 6 to 18 carbon atoms, and $Q_2^-$ represents a halogen ion, a carboxylate anion, or an anion of an inorganic acid, (2)

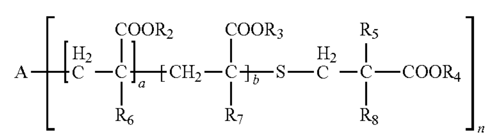

wherein, in General Formula (2), A represents an n-valent organic group, $R_2$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_3$ represents a hydrocarbon group having 1 to 20 carbon atoms which has a hydroxyl group or an alkyleneoxy group having 1 to 20 carbon atoms, $R_4$ represents an organic group having 1 to 20 carbon atoms which optionally have a hydroxyl group, $R_5$ represents a hydrogen atom or an organic group having 1 to 20 carbon atoms, $R_6$, $R_7$, and $R_8$ each independently represent a hydrogen atom or a methyl group, n represents an integer of 1 to 20, and a and b each independently represent an integer of 1 to 200, a plurality of $R_2$'s to $R_8$'s may be the same as or different from each other, (3)

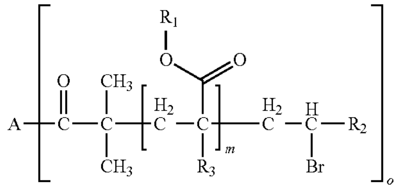

wherein, in General Formula (3), A is derived from a polyol compound having two or more hydroxyl groups and shows a group which forms an ester bond by being bonded to C(=O)— in the repeating unit, $R_1$ represents an alkyl group having 1 to 20 carbon atoms which optionally be substituted, an aralkyl group having 7 to 20 carbon atoms which optionally be substituted, or an aryl group having 6 to 20 carbon atoms which optionally be substituted, $R_2$ represents a hydrocarbon group having 1 to 20 carbon atoms which has a hydroxyl group or an alkyleneoxy group having 1 to 20 carbon atoms, $R_3$ represents a hydrogen atom or a methyl group, m represents an integer of 1 to 1000, and o shows a value equal to or less than the number of hydroxyl groups in the polyol compound configuring A, a plurality of $R_1$'s to $R_3$'s may be the same as or different from each other, (a-1)

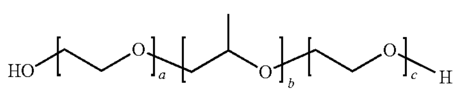

wherein, in General Formula (a-1), a, b, and c each represent a unit number, and each independently are an integer of 3 to 300, (a-2)

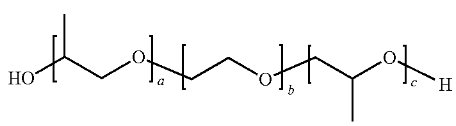

wherein, in General Formula (a-2), a, b, and c each represent a unit number, and each independently are an integer of 3 to 300, (b-1)

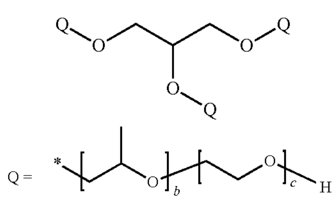

wherein, in General Formula (b-1), b and c each represent a unit number and each independently are an integer of 3 to 300, and the mark * represents a bonding hand, (b-2)

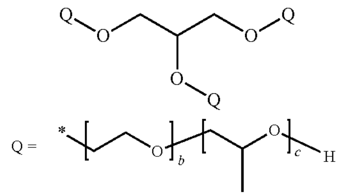

wherein, in General Formula (b-2), b and c each represent a unit number and each independently are an integer of 3 to 300, and the mark * represents a bonding hand, (c-1)

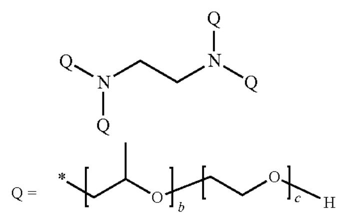

wherein, in General Formula (c-1), b and c each represent a unit number and each independently are an integer of 3 to 300, and the mark * represents a bonding hand, (c-2)

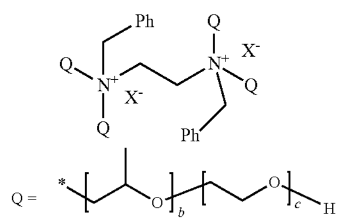

wherein, in General Formula (c-2), b and c each represent a unit number and each independently are an integer of 3 to 300, X represents a halogen ion, a carboxylate anion, or an inorganic acid anion, and the mark * represents a bonding hand, (f-1)

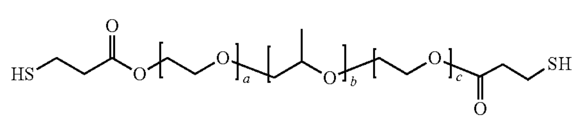

wherein, in General Formula (f-1), a, b and c each represent a unit number and each independently are an integer of 3 to 300, (f-2)

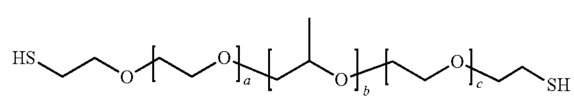

wherein, in General Formula (f-2), a, b, and c each represent a unit number and each independently are an integer of 3 to 300, (g-1)

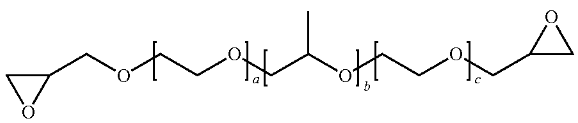

wherein, in General Formula (g-1), a, b, and c each represent a unit number and each independently are an integer of 3 to 300, (g-2)

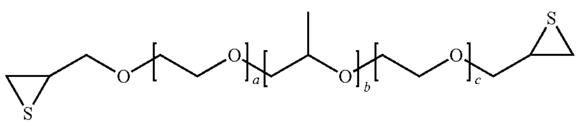

wherein, in General Formula (g-2), a, b, and c each represent a unit number and each independently are an integer of 3 to 300, (h)

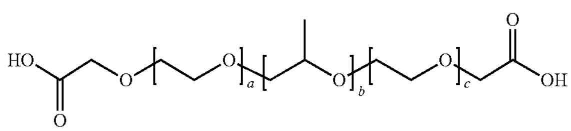

wherein, in General Formula (h), a, b, and c each represent a unit number and each independently are an integer of 3 to 300, (i-1)

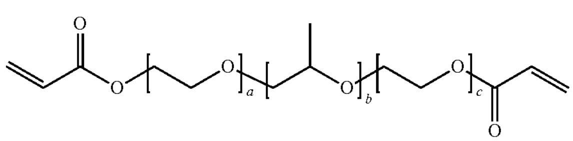

wherein, in General Formula (i-1), a, b, and c each represent a unit number and each independently are an integer of 3 to 300, (i-2)

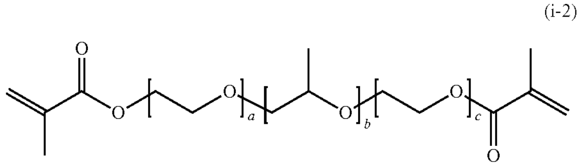

wherein, in General Formula (i-2), a, b, and c each represent a unit number and each independently are an integer of 3 to 300, (j)

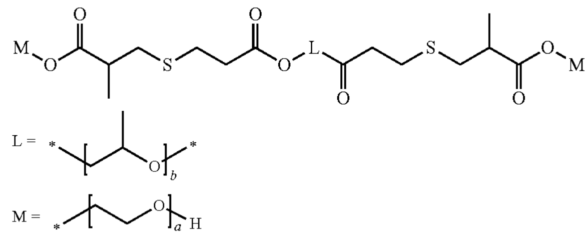

wherein, in General Formula (j), a and b each represent a unit number and each independently are an integer of 3 to 300, and the mark * represents a bonding hand, (k-1)

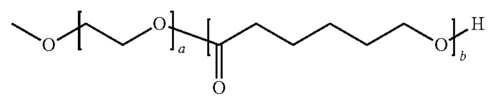

wherein, in General Formula (k-1), a and b each represent a unit number and each independently are an integer of 3 to 500, (k-3)

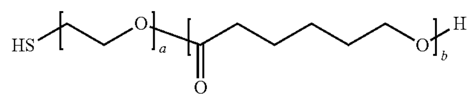

wherein, in General Formula (k-3), a and b each represent a unit number and each independently are an integer of 3 to 500, (1)

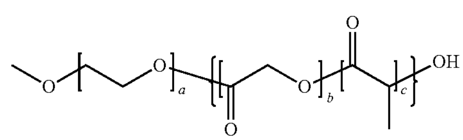

wherein, in General Formula (1), a, b, and c each represent a unit number and each independently are an integer of 3 to 300, (m)

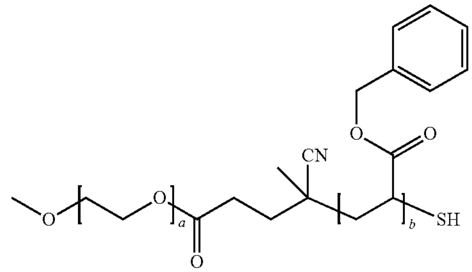

wherein, in General Formula (m), a and b each represent a unit number, and each independently are an integer of 3 to 300, (n-1)

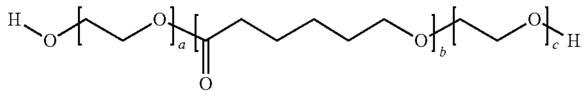

wherein, in General Formula (n-1), a, b, and c each represent a unit number, and each independently are an integer of 3 to 300, (n-2)

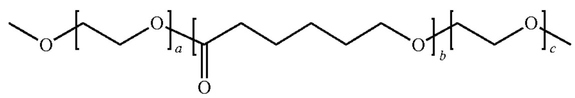

wherein, in General Formula (n-2), a, b, and c each represent a unit number, and each independently are an integer of 3 to 300, (o)

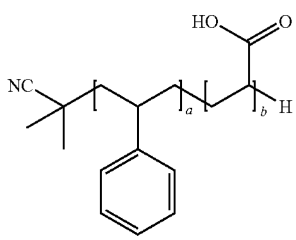

wherein, in General Formula (o), a and b each represent a unit number, and each independently are an integer of 3 to 500, (p-1)

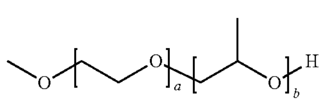

wherein, in General Formula (p-1), a and b each represent a unit number, and each independently are an integer of 3 to 300, (p-2)

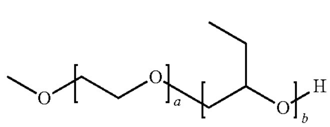

wherein, in General Formula (p-2), a and b each represent a unit number, and each independently are an integer of 3 to 300, (q-1)

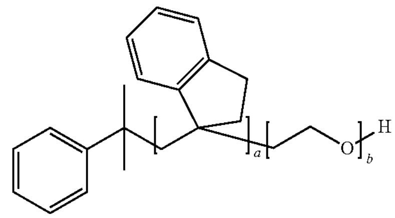

wherein, in General Formula (q-1), a and b each represent a unit number, and each independently are an integer of 3 to 300, (q-2)

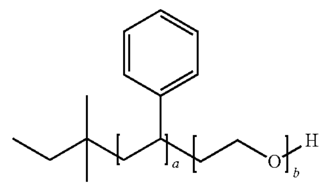

wherein, in General Formula (q-2), a, b, and c each represent a unit number, and each independently are an integer of 3 to 300, (q-3)

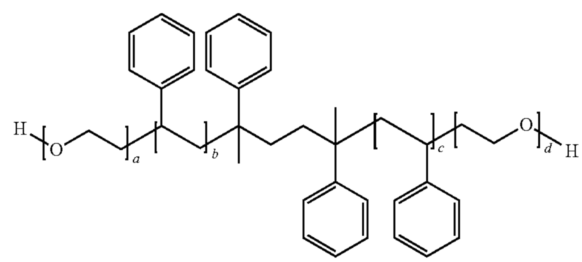

wherein, in General Formula (q-3), a, b, c, and d each represent a unit number, and each independently are an integer of 3 to 300, (r)

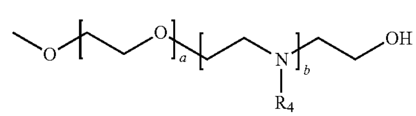

wherein, in General Formula (r), a, b, and c each represent a unit number, and each independently are an integer of 3 to 300, (s-1)

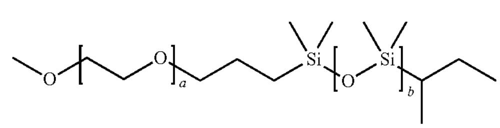

wherein, in General Formula (s-1), a and b each represent a unit number, and each independently are an integer of 3 to 300, (s-2)

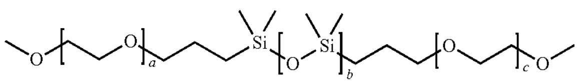

wherein, in General Formula (s-2), a, b, and c each represent a unit number, and each independently are an integer of 3 to 300, (t)

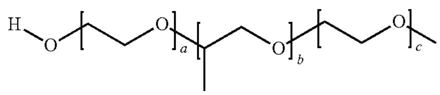

wherein, in General Formula (t), a, b, and c each represent a unit number, and each independently are an integer of 3 to 300, (u)

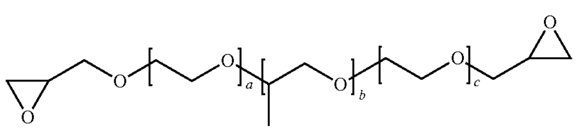

wherein, in General Formula (u), a, b, and c each represent a unit number, and each independently each independently are an integer of 3 to 300, (v)

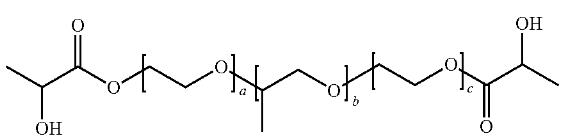

wherein, in General Formula (v), a, b, and c each represent a unit number, and each independently are an integer of 3 to 300.

11. The production method of a polymerizable composition for optical materials according to claim 10, wherein the step of mixing the polymer (a), the compound (b), and the polymerization reactive compound (c) includes a step of forming polymer particles including the polymer (a) and the compound (b), and a step of mixing the polymerization reactive compound (c) with the polymer particles.

12. The production method of a polymerizable composition for optical materials according to claim 10, wherein the polymerization reactive compound (c) contains two or more compounds, and the step of mixing the polymer (a), the compound (b), and the polymerization reactive compound (c) includes a step of mixing the polymer (a), the compound (b), and some of the polymerization reactive compound (c), and a step of mixing the remaining polymerization reactive compound (c) with the mixture obtained in the above step.

13. The production method of a polymerizable composition for optical materials according to claim 10, wherein the compound (b) is a photochromic compound.

14. The production method of a polymerizable composition for optical materials according to claim 13, wherein the photochromic compound is a naphthopyran derivative.

15. A production method of a plastic lens, comprising:

a step of forming a lens substrate by cast-polymerizing the polymerizable composition for optical materials according to claim 1.

16. An optical material comprised of the molded product according to claim 7.

17. A plastic lens comprised of the molded product according to claim 7.

* * * * *